United States Patent
McDonald et al.

(10) Patent No.: US 11,725,748 B2
(45) Date of Patent: Aug. 15, 2023

(54) APPARATUS AND METHOD FOR VACUUMIZING AND SEALING A PACKAGE

(71) Applicants: Cryovac, LLC, Charlotte, NC (US); Furukawa Mfg. Co., Ltd., Tokyo (JP)

(72) Inventors: Gregory E. McDonald, Duncan, SC (US); Gregory H. Grossman, Duncan, SC (US); Joe A. Price, Duncan, SC (US); Rod Hodgson, Duncan, SC (US); John L. King, Jr., Duncan, SC (US); Shuichi Nakamoto, Hiroshima (JP); Yoshitaka Nii, Hiroshima (JP); Silvio Rohrer, Stalden (CH); Joel Caillier, Cham (CH); Peter Schmalz, Hochdorf (CH)

(73) Assignees: Cryovac, LLC, Charlotte, NC (US); Furukawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 17/817,227

(22) Filed: Aug. 3, 2022

(65) Prior Publication Data
US 2022/0403955 A1 Dec. 22, 2022

Related U.S. Application Data

(63) Continuation of application No. 17/159,742, filed on Jan. 27, 2021, now abandoned, which is a
(Continued)

(51) Int. Cl.
*B65B 31/02* (2006.01)
*F16K 51/02* (2006.01)
(Continued)

(52) U.S. Cl.
CPC ............ *F16K 51/02* (2013.01); *B29C 65/223* (2013.01); *B29C 65/224* (2013.01); *B29C 65/38* (2013.01);
(Continued)

(58) Field of Classification Search
CPC ....... B65B 31/00; B65B 31/02; B65B 31/022; B65B 31/024; B65B 57/02; G01M 3/32;
(Continued)

(56) References Cited

U.S. PATENT DOCUMENTS 3,460,574 A   8/1969   Risher
3,648,430 A   3/1972   Roberts et al.
(Continued)

FOREIGN PATENT DOCUMENTS

CA   2193982 A1   1/1996
EP   0836996 A1   4/1998
(Continued)

OTHER PUBLICATIONS

Japanese Office Action for Application No. 2021-197417, dated Sep. 27, 2022, (6 pages), Japan Patent Office, Tokyo, Japan.
(Continued)

*Primary Examiner* — Andrew M Tecco
*Assistant Examiner* — Jacob A Smith
(74) *Attorney, Agent, or Firm* — Alston & Bird LLP

(57) ABSTRACT

An apparatus for vacuumizing and sealing a package includes a plurality of platens and vacuum chambers, each chamber adapted to mate with a dedicated one of the platens; a conveying system for conveying the platens and chambers along a generally angular path having a single axis of rotation; an automated loading assembly having a linear component and configured to load a package onto each of the platens; an automated unloading assembly having a linear portion and configured to unload a vacuumized, sealed package from each loaded platen onto an outfeed conveyor; and a vacuumizing/sealing system configured to cause relative movement of each chamber/platen pair, along a portion of the angular path, to form therebetween an
(Continued)

air-tight enclosure accommodating the package and effect vacuumization and sealing of the package.

10 Claims, 22 Drawing Sheets

Related U.S. Application Data continuation of application No. 15/762,491, filed as application No. PCT/US2016/053279 on Sep. 23, 2016, now Pat. No. 10,941,879.

(60) Provisional application No. 62/232,856, filed on Sep. 25, 2015.

(51) Int. Cl.
| | |
|---|---|
| *B65B 51/14* | (2006.01) |
| *F16K 3/02* | (2006.01) |
| *F16K 3/18* | (2006.01) |
| *B65B 25/06* | (2006.01) |
| *B29C 65/22* | (2006.01) |
| *B29C 65/00* | (2006.01) |
| *B29C 65/74* | (2006.01) |
| *B29C 65/38* | (2006.01) |
| *B29C 65/78* | (2006.01) |
| *G01F 17/00* | (2006.01) |
| *G01F 22/00* | (2006.01) |
| *B29L 31/00* | (2006.01) |

(52) U.S. Cl.
CPC ...... *B29C 65/7451* (2013.01); *B29C 65/7885* (2013.01); *B29C 66/00145* (2013.01); *B29C 66/1122* (2013.01); *B29C 66/244* (2013.01); *B29C 66/2442* (2013.01); *B29C 66/30621* (2013.01); *B29C 66/43121* (2013.01); *B29C 66/73921* (2013.01); *B29C 66/82421* (2013.01); *B29C 66/8322* (2013.01); *B29C 66/849* (2013.01); *B65B 25/067* (2013.01); *B65B 25/068* (2013.01); *B65B 31/022* (2013.01); *B65B 51/146* (2013.01); *F16K 3/029* (2013.01); *F16K 3/0254* (2013.01); *F16K 3/184* (2013.01); *B29C 66/71* (2013.01); *B29C 66/723* (2013.01); *B29C 66/7234* (2013.01); *B29C 66/72341* (2013.01); *B29L 2031/7128* (2013.01); *B65B 31/024* (2013.01); *G01F 17/00* (2013.01); *G01F 22/00* (2013.01)

(58) Field of Classification Search
CPC .. H02G 7/02; H02G 7/04; H02G 1/04; H02G 1/02
USPC ................... 53/434, 479, 510, 512
See application file for complete search history.

(56) References Cited

U.S. PATENT DOCUMENTS

| | | | |
|---|---|---|---|
| 3,958,391 A | 5/1976 | Kujubu | |
| 4,189,897 A | 2/1980 | Ailey, Jr. et al. | |
| 4,471,599 A | 9/1984 | Mugnai | |
| 4,494,363 A | 1/1985 | Rica et al. | |
| 4,580,393 A | 4/1986 | Furukawa | |
| 4,586,320 A | 5/1986 | Takai et al. | |
| 4,640,081 A | 2/1987 | Kawaguchi et al. | |
| 4,754,596 A * | 7/1988 | Yasumune | B65B 31/022 53/512 |
| 4,755,403 A | 7/1988 | Ferguson | |
| 4,765,857 A | 8/1988 | Ferguson | |
| 4,770,731 A | 9/1988 | Ferguson | |
| 4,845,927 A | 7/1989 | Rapparini | |
| 5,062,252 A * | 11/1991 | Kupcikevicius | B65B 31/022 53/512 |
| 5,209,043 A | 5/1993 | Kupcikevicius | |
| 5,752,369 A * | 5/1998 | Suga | B65B 31/022 53/76 |
| 6,374,580 B1 | 4/2002 | Kujubu et al. | |
| 6,383,537 B1 | 5/2002 | Brady et al. | |
| 6,499,274 B1 | 12/2002 | McDonald et al. | |
| 6,539,689 B1 | 4/2003 | Yoshimoto | |
| 6,790,468 B1 | 9/2004 | Mize, Jr. et al. | |
| 6,877,543 B2 | 4/2005 | Stevens | |
| 7,255,903 B1 | 8/2007 | Mudar et al. | |
| 7,296,390 B2 | 11/2007 | Koke et al. | |
| 7,464,521 B2 | 12/2008 | Koke et al. | |
| 7,670,657 B1 | 3/2010 | Depoorter et al. | |
| 7,891,159 B2 | 2/2011 | Iocco et al. | |
| 9,073,654 B2 | 7/2015 | Rothermel et al. | |
| 10,941,879 B2 | 3/2021 | McDoland et al. | |
| 2004/0035087 A1 * | 2/2004 | Kujubu | B65B 43/123 53/385.1 |
| 2004/0139701 A1 | 7/2004 | Cady et al. | |
| 2004/0144063 A1 | 7/2004 | Countz | |
| 2006/0096247 A1 | 5/2006 | Buchko | |
| 2006/0096838 A1 * | 5/2006 | Buchko | B65G 15/64 198/689.1 |
| 2006/0272291 A1 | 12/2006 | Koke et al. | |
| 2007/0221058 A1 | 9/2007 | Buchko | |
| 2008/0279702 A1 | 11/2008 | Kim | |
| 2009/0293430 A1 | 12/2009 | Iocco et al. | |
| 2013/0284214 A1 | 10/2013 | Häring et al. | |
| 2014/0360134 A1 | 12/2014 | Brinkman et al. | |
| 2015/0082754 A1 | 3/2015 | Jasiulek et al. | |
| 2015/0175288 A1 | 6/2015 | Alquati | |
| 2021/0164586 A1 | 6/2021 | McDonald et al. | |

FOREIGN PATENT DOCUMENTS

| | | |
|---|---|---|
| EP | 1388494 A2 | 2/2004 |
| JP | S54-131491 A | 10/1979 |
| JP | S59-133445 A | 7/1984 |
| JP | S62-182014 U | 8/1987 |
| JP | S63-25 A | 1/1988 |
| JP | H08-48310 A | 2/1996 |
| JP | H10-101005 A | 4/1998 |
| JP | 2001-151207 A | 6/2001 |
| JP | 311239 U | 6/2005 |
| JP | 2007-108162 A | 4/2007 |
| JP | 2014-118150 A | 6/2014 |
| WO | WO-96/00688 A1 | 1/1996 |

OTHER PUBLICATIONS

"File: Electric Motor with Slip Rings.svg", May 9, 2011, In Wikipedia, retrieved Jul. 22, 2015 from https://en.wikipedia.org/wiki/File:Electric_Motor_with_Slip)Rings.svg.

"Slip ring", n.d., In Wikipedia, retrieved on Jul. 22, 2015 from https://en.wikipedia.org/wiki/Slip_ring.

Australian Government, IP Australia, Examination Report No. 1 for Application No. 2016327589, dated Oct. 11, 2018, (4 pages), Australia.

Australian Government, IP Australia, Examination Report No. 2 for Application No. 2019203107, dated Aug. 19, 2020, (7 pages), Australia.

CP Packaging, "I VAC Vacuum Packer 1", Watts Meat Machinery, YouTube, <https://www.youtube.com/watch?v=2pQn1FLVuOo>, published Apr. 13, 2015.

CP Packaging, "I VAC Vacuum Packer 2", Watts Meat Machinery, YouTube, <https://www.youtube.com/watch?v=7VzzIPwbrwM>, published Apr. 13, 2015.

CP Packaging, "I VAC Vacuum Packer 3", Watts Meat Machinery, YouTube, <https://www.youtube.com/watch?v=zHpBE3Dusv4>, published Apr. 13, 2015.

CP Packaging, "I-Vac", Jan. 16, 2014 to Jun. 6, 2017, Internet Archive <https://web.archive.org/web/20140116015221/http://www.cppac.com/i-vac>, 2 pages.

(56) References Cited

OTHER PUBLICATIONS

CRYOVAC (Sealed Air), "8600E-18" Automatic Rotary Vacuum Sealing Machine (Brochure), Sealed Air Ltd., 2013 ©, retrieved from <http://www.cryovac.com/EU/EN/pdf/vr8600_18.pdf> on Mar. 16, 2018.
Extended European Search Report for European Patent Application No. 19191105.6, dated Nov. 20, 2019, (6 pages), European Patent Office, Munich, Germany.
Extended European Search Report for European Patent Application No. 20208154.3, dated Jan. 19, 2021, (6 pages), European Patent Office, Munich, Germany.
International Preliminary Examining Authority, International Preliminary Report on Patentability, including Applicant's Jul. 25, 2017 response to the Feb. 23, 2017 Written Opinion, for International Application PCT/US2016/053279, dated Feb. 2, 2018, 45 pages, European Patent Office, Germany.
International Preliminary Examining Authority, Written Opinion (second) for International Application No. PCT/US2016/053279, dated Dec. 8, 2017, 11 pages, European Patent Office, Germany.
International Preliminary Examining Authority, Written Opinion (second) for International Application No. PCT/US2016/053279, dated Oct. 11, 2017, 11 pages, European Patent Office, Germany.
International Searching Authority, International Search Report and Written Opinion for International Application No. PCT/US2016/053279, dated Feb. 23, 2017, 23 pages, European Patent Office, Netherlands.
International Searching Authority, Invitation to Pay Additional Fees and Where Applicable, Protest Fee for International Application No. PCT/US2016/053279, dated Jan. 2, 2017, 23 pages, European Patent Office, Netherlands.
Japanese Office Action for Application No. 2020-119601, dated Aug. 10, 2021, (4 pages), Japan Patent Office, Tokyo, Japan.
McLaren Stainless, "iSeries", Indelible, YouTube, <https://www.youtube.com/watch?v=qLa-uNzAj9E>, published Apr. 25, 2013.
McLaren Stainless, "Ivac 350", YouTube, <https://www.youtube.com/watch?v=1WunEu1Fvwo>, published Dec. 17, 2014.
McLaren Stainless, www.McLarenStainless.com, May 25, 2012 to Feb. 3, 2018, Internet Archive <https://web.archive.org/web/20120525200727/www.mclarenstainless.com/>, 4 pages.
Propac Alta Barrera Mexico, "Flexopack iVac", YouTube, <https://www.youtube.com/watch?v=4tRoAk0y02w>, published Jan. 13, 2014.
Rollstock LC, "Rollstock RC-300 Stainless Steel Rotary Chamber Machine", YouTube, <https://www.youtube.com/watch?v=5fh_JXEH1d8>, Oct. 23, 2009.
Rollstock, "RC-300 Rotary Chamber" (Brochure), Sep. 9, 2016, Internet Archive <https://web.archive.org/web/*/http://rollstock.com/wp-content/uploads/2014/01/RC-300-Rotary-Chamber.pdf>, 4 pages.
Rollstock, "Rollstock RC-300 Chamber Vacuum", Mckee, Steve, YouTube, <https://www.youtube.com/watch?v=ApckAQuSf00>, published May 11, 2013.
Rollstock, "Rollstock RC-300 Promo", Hollymatic Corp, YouTube, <https://www.youtube.com/watch?v=nfwKRW6vQYs>, published Apr. 17, 2013.
U.S. Appl. No. 62/147,317, "Method Of Positioning And Sealing A Bag In A Vacuum Chamber, Bag Positioning Apparatus, And Method Of Manufacturing A Patch Bag", Unpublished (filing date Apr. 14, 2015), Gregory E. McDonald, Inventor, Sealed Air Corporation, Assignee.
Chinese Office Action for Application No. 202111050059.8, dated Aug. 30, 2022, (16 pages), China National Intellectual Property Administration, Beijing, China.
U.S. Appl. No. 17/159,742, filed Jan. 27, 2021, 2021-0164586, Abandoned.
U.S. Appl. No. 15/762,491, filed Mar. 22, 2018, U.S. Pat. No. 10,941,879, Issued.
PCT/US2016/053279, filed Sep. 23, 2016, WO 2017/053682, Expired.

\* cited by examiner

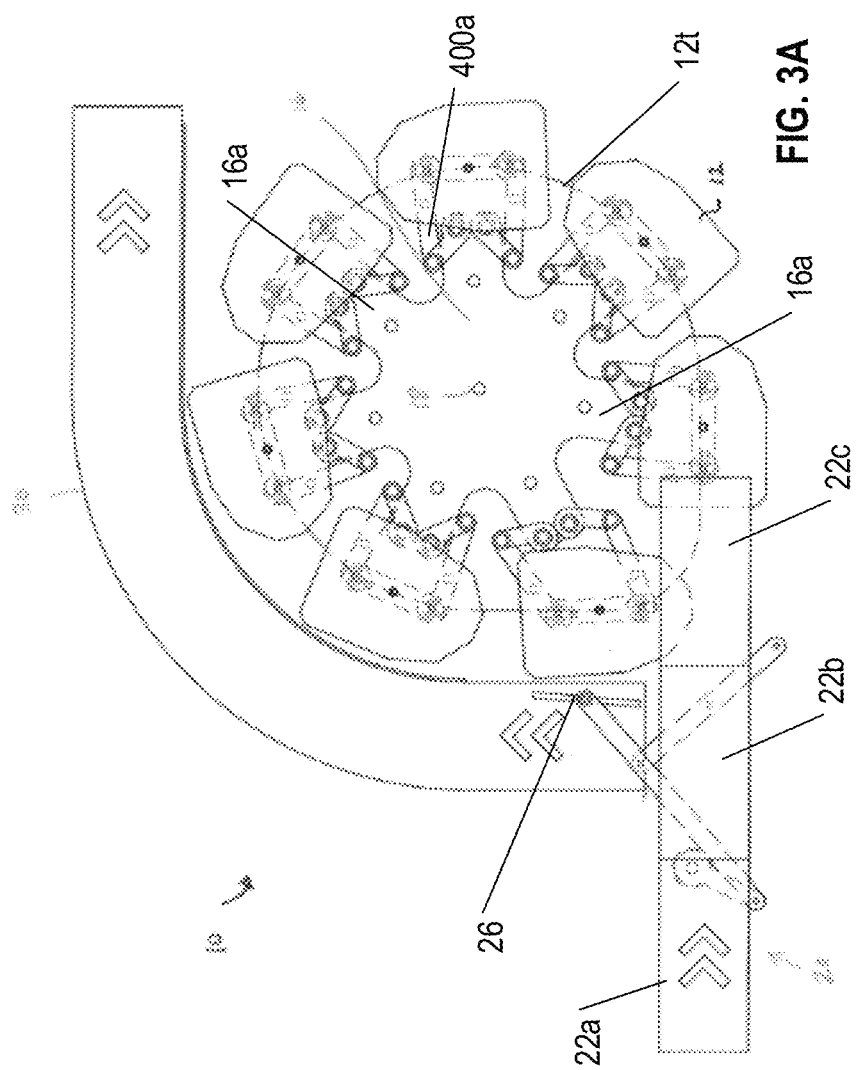

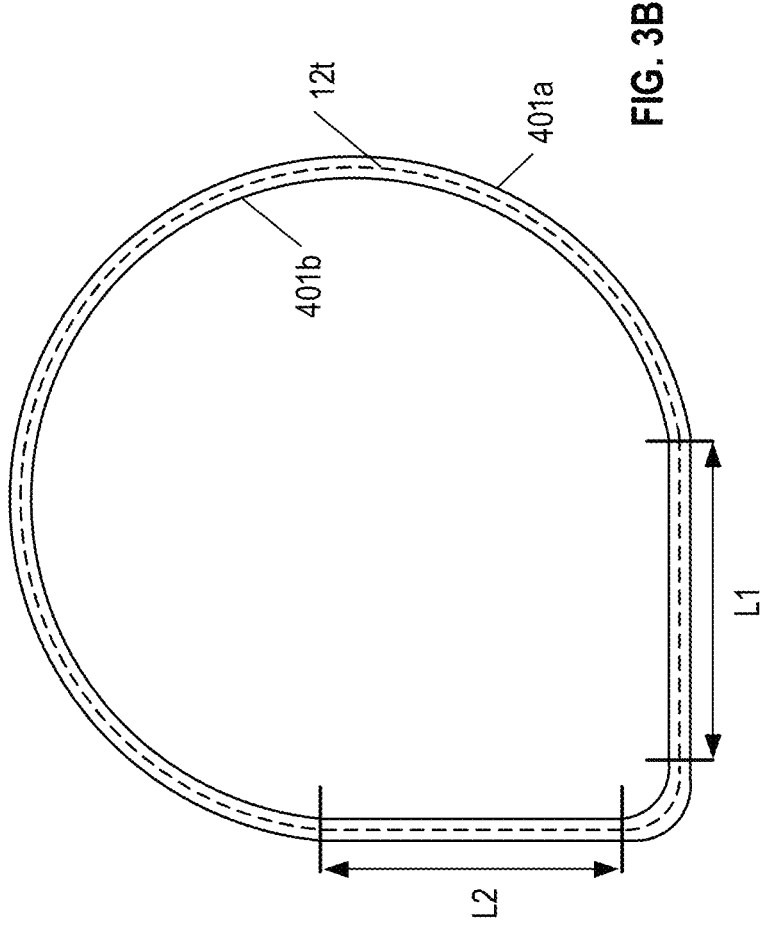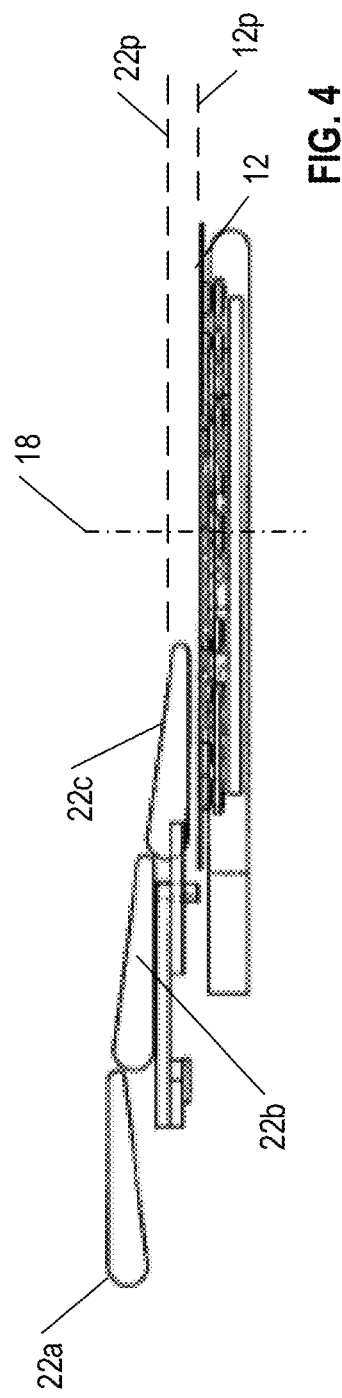

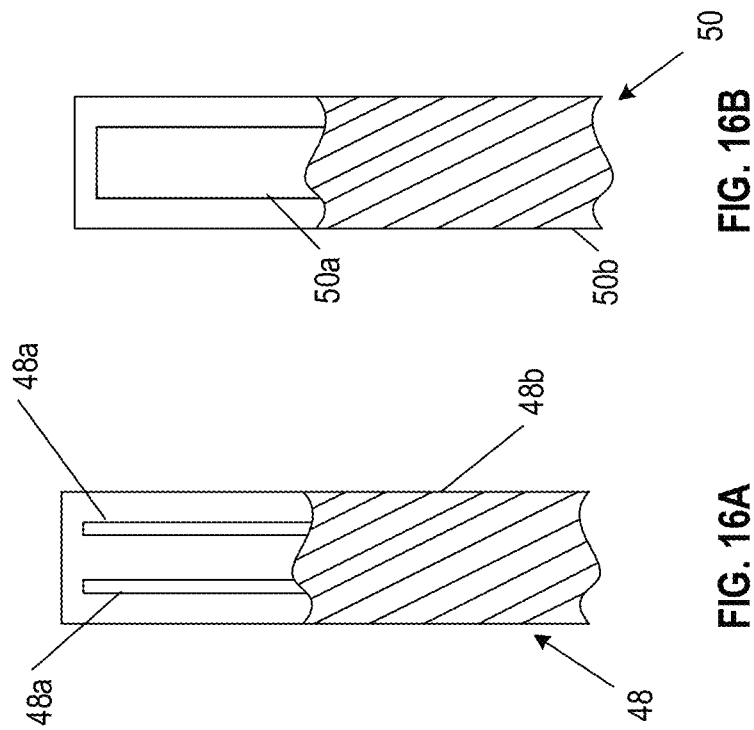
FIG. 16A
FIG. 16B
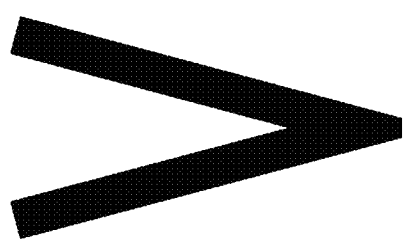
FIG. 15B
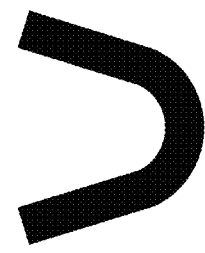
FIG. 15D
FIG. 15A
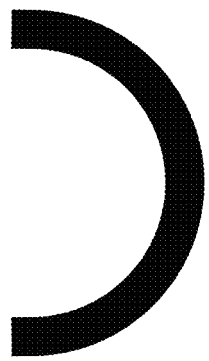
FIG. 15C

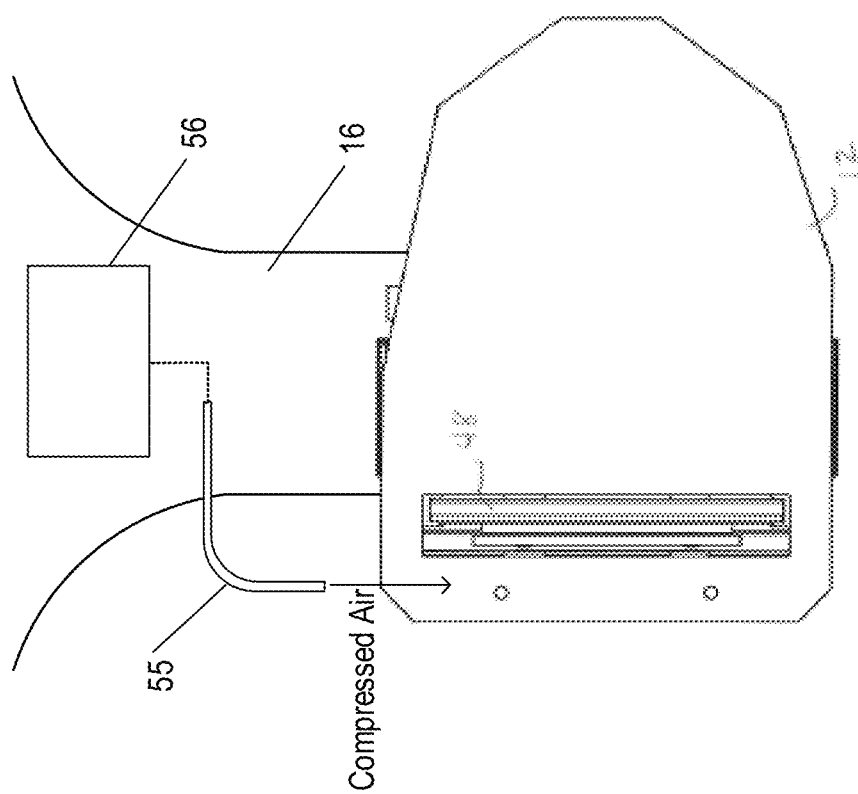

APPARATUS AND METHOD FOR VACUUMIZING AND SEALING A PACKAGE

CROSS REFERENCE TO RELATED APPLICATIONS

This application is a continuation of U.S. patent application Ser. No. 17/159,742, filed Jan. 27, 2021, which is a continuation of U.S. patent application Ser. No. 15/762,491, filed Mar. 22, 2018, which is a National Stage Application, filed under 35 U.S.C. § 371, of International Application No. PCT/US2016/053279, filed Sep. 23, 2016, which claims priority to U.S. Provisional Application No. 62/232,856, filed Sep. 25, 2015; the contents of all of which are hereby incorporated by reference in their entirety.

BACKGROUND

Related Field

The present application describes apparatuses and methods for vacuumizing and sealing a package. The described apparatuses and methods may be used to vacuumize and seal a bagged products, including food products (e.g., poultry, cheese, red meat, smoked food products, processed food products, ready to eat food products, and/or the like).

Description of Related Art

Vacuum packaging in heat sealable plastic bags has been used for packaging food products, such as poultry, meat, and cheese. A vacuum packaging process generally involves placing the food product into a heat sealable plastic bag, evacuating air from inside the bag through a bag opening to collapse the bag around the contained food product, and heat sealing the bag opening to fully enclose the food product within the bag in a generally air-free environment. In certain implementations, the bag is a heat shrinkable bag and the bagged product is advanced through a hot water or hot air shrink tunnel to cause the bag to shrink around the food product.

Vacuum packaging machines known in the art include a vacuum chamber configured to receive unsealed loaded packages (e.g., bags containing one or more products) and vacuum seal the loaded packages. Typically the loaded packages contain food products arranged in heat-shrinkable film bags. After feeding the package into the vacuum chamber and closing the vacuum chamber, the vacuum sealing operation typically includes vacuumization of the vacuum chamber, sealing the mouth of the package, and reintroducing air into the chamber. The chamber is then opened and the bags are unloaded. In some applications, the packages are then conveyed to a heat-shrinking unit to shrink the packaging around the product.

Rotary vacuum chamber packaging machines including a series of vacuum chambers configured to engage a series of chain-driven package platens conveyed around a plurality of axes of rotation are also known. These rotary vacuum chamber packaging machines are configured to vacuumize and seal packages by having packages (e.g., bagged food products) placed on the chain-driven package platens at a loading position. The package platens then move from the loading position toward a vacuumizing station where a vacuum chamber engages the package platens. The air is then evacuated from the vacuum chamber to evacuate the air from within the bag and the bag is sealed. The vacuum chambers are then vented, removed from the package platens, and the vacuumized and sealed package is unloaded from the package platen at an unloading position. Packaging machine systems of this type developed by Furukawa Manufacturing Co., Ltd. are described in U.S. Pat. No. 3,958,391 (Kujubu); U.S. Pat. No. 4,580,393 (Furukawa); and U.S. Pat. No. 4,640,081 (Kawaguchi et al.), all of which are incorporated herein by reference in their entirety.

In vacuum packaging operations (e.g., food packaging operations), there is an on-going need to minimize the floor space occupied by vacuum packing machines while maximizing the throughput of the machines. Due at least in part to timing requirements for removing air from within a package, cycle speeds of current vacuum packing apparatuses are often limited. Moreover, current vacuum packaging machines require substantial operator interaction with the machines in order to ensure that bagged packages are properly loaded onto the platens. Because the flexible bags may wrinkle and crease in the area of the bag in which the bag is to be heat sealed, operators are generally needed in order to ensure the bags are properly placed with a portion of the bag extending over a heat sealing mechanism.

Existing rotary vacuum chamber systems for packaging food products (e.g., fresh red meat, poultry, ready to eat products, and/or the like) are typically configured with a first and second circulatory path, each with its own axis of rotation, and an endless chain that drives discrete chain wheels positioned around the two centers of rotation (see e.g., U.S. Pat. No. 3,958,391). It has been found that the endless chain may stretch over time, which complicates achieving proper alignment and positioning of the platens and vacuum chambers in the system.

Accordingly, there is a need in the art for an apparatus for vacuumizing and sealing a package that provides a significant reduction in the operational footprint compared with typical conventional systems. There is also a need in the art to provide an apparatus configured for automatic registration and loading of packages onto platens to avoid manual loading of packages.

BRIEF SUMMARY

Various embodiments provide an apparatus for vacuumizing and sealing packages having a reduced operational footprint by providing a platen travel path extending around a single axis of rotation, and providing one or more linear travel portions of the platen travel path to facilitate loading and/or unloading of packages onto and/or off of the platens travelling along the platen travel path of the apparatus having a consolidated overall operational footprint.

Various embodiments are directed to an apparatus for vacuumizing and sealing a package. The package may, in various embodiments, comprise a bag comprising a heat-shrinkable thermoplastic film, and a product (e.g., a food product, such as a meat product, which may have an irregular shape) positioned within the bag. In various embodiments, the apparatus comprises a plurality of platens each adapted to support at least one package thereon, wherein each of the plurality of platens comprise a transverse sealing mechanism extending at least partially across a width of the platen at a sealing position of the platen; a plurality of vacuum chambers, each adapted to mate with a corresponding one of the plurality of platens; and a conveying mechanism for conveying the plurality of platens and the plurality of vacuum chambers around a single axis of rotation. In certain embodiments, the conveying mechanism is configured such that each of the plurality of vacuum chambers mates with the corresponding platen of the plurality of platens during a select portion of the angular path. Moreover, various embodiments of the apparatus for vacuumizing and sealing a package comprise an automated loading assembly configured to: identify a select seal location on the package; and deposit the package onto a platen such that the select seal location is substantially aligned with the sealing position of the platen. The apparatus may additionally comprise a vacuumizing system configured to effect vaccumization and sealing of the package; and an automated unloading assembly configured to unload a vacuumized, sealed package from each loaded platen onto an outfeed conveyor. In various embodiments, the number of platens of the plurality of platens is the same as the number of vacuum chambers of the plurality of vacuum chambers.

Moreover, in various embodiments, the conveying mechanism comprises: a carousel configured to rotate about the single axis of rotation and operably secured to the plurality of platens and the plurality of vacuum chambers such that the plurality of platens and the plurality of vacuum chambers rotate about the single axis of rotation with the carousel. Moreover, in various embodiments, the conveying mechanism additionally comprises a motor (e.g., a servo motor); and a pinion drive system operably connecting the motor and the carousel.

In various embodiments, the transverse sealing mechanism of the platens comprises a linear seal bar extending at least partially across the width of the platen. The transverse sealing mechanism may comprise a heat seal assembly configured to form a heat seal across a bag mouth of a respective package. In various embodiments, the apparatus additionally comprises a system for retracting a portion of the heat seal assembly within each respective platen to enable a package to be moved past the heat seal assembly. Moreover, the heat seal assembly may additionally comprise an upper seal bar and a lower seal bar, wherein at least one of the upper seal bar or the lower seal bar is configured to apply heat to the package to form the heat seal across the bag mouth of the respective package. In certain embodiments, at least one of the upper seal bar or the lower seal bar (e.g., only one of the upper seal bar or the lower seal bar, or both the upper seal bar and the lower seal bar) comprises an impulse heat seal mechanism comprising at least one wire (e.g., one wire or two wires) configured to heat and apply heat to the package. In various embodiments in which both the upper seal bar and the lower seal bar comprise impulse sealing mechanisms, one of the upper seal bar or the lower seal bar includes only one wire configured to heat up and apply heat to the package; and the other of the upper seal bar and the lower seal bar includes two wires configured to heat up and apply heat to the package.

Moreover, in various embodiments, the apparatus additionally comprises a perforator mechanism configured to puncture a plurality of holes in the package to facilitate evacuation of the air from within the package. The perforator mechanism may be configured to puncture the plurality of holes between the location at which a seal is formed and an open end of the package.

Moreover, in various embodiments, the apparatus additionally comprises a cutting mechanism configured to sever a portion of each package. In certain embodiments, the apparatus additionally comprises a bag tail removal mechanism configured to remove the severed portion of the package from a platen after the vacuum chamber is lifted away from the corresponding platen. The bag tail removal mechanism may comprise a compressed air supply configured to direct a stream of compressed air across the surface of the platen to blow the severed portion of the package off of the surface of the platen.

In various embodiments, the apparatus additionally comprises a plurality of vacuum chamber lift arms corresponding to the plurality of vacuum chambers and configured to cause the relative movement of each of the plurality of vacuum chambers and thereby selectably form an air tight enclosure with the corresponding platen when the vacuum chamber is mated with the corresponding platen. The vacuum chamber lift arms may, in various embodiments, define a vacuum conduit in fluid communication with an interior portion of the corresponding vacuum chamber.

Moreover, in various embodiments, the apparatus additionally comprises a mechanism for restoring the pressure within each vacuum chamber to atmospheric pressure after vacuumization and sealing of the package has been effected. For example, the mechanism for restoring the pressure within each vacuum chamber to atmospheric pressure after vacuumization and sealing of the package may comprise a cross-venting mechanism configured to place a vacuum chamber that has undergone vacuumization in fluid communication with a second vacuum chamber that has not yet undergone vacuumization.

In various embodiments, the automated loading assembly may comprise a system for positioning a package on a platen, wherein the package has at an upstream end thereof a bag mouth; and wherein the automated loading assembly comprises an infrared camera disposed above the package and an infrared emitter disposed below the package, wherein the infrared camera is configured to interrogate the infrared emitter through the package and thereby detect the trailing edge of the product within the package, and the information acquired from the interrogating step is transmitted to a computer control system and automated loading assembly advances the package a distance determined based at least in part on the information acquired from the infrared camera, to a heat seal assembly.

Moreover, in various embodiments, a package may comprise a package patch, and accordingly the system for positioning a package may comprise a system for detecting the package patch. For example, the system for positioning the package may be configured to advance the package to a fluorescence sensing apparatus comprising a fluorescence detector and a radiation source; detect a trailing edge of the package patch by interrogating fluorescence emitted by the package patch using the fluorescence sensing apparatus, wherein radiation emitted by the radiation source excites the package patch, acquire information from detecting the trailing edge of the product and detecting the trailing edge of the patch, and transmitting the information to the computer controller system, and control a distance of advancement of the package to a heat seal assembly based at least in part on the information acquired from detecting the trailing edge of the product and detecting the trailing edge of the package patch.

Various embodiments are directed to an apparatus for vacuumizing and sealing one or more packages. In various embodiments, the apparatus comprises a plurality of platens operably secured to a rotating carousel configured to rotate about a single axis of rotation, wherein the plurality of platens are configured to travel along a platen travel path comprising an angular portion of the platen travel path and one or more linear portions of the platen travel path around the single axis of rotation; a plurality of vacuum chambers configured to selectably engage a corresponding platen to form an air-tight enclosure therebetween and operably secured to the rotating carousel such that the plurality of vacuum chambers travel along an angular chamber travel path synchronously with the plurality of platens such that each vacuum chamber is aligned with the corresponding platen relative to the single axis of rotation; an automated loading system configured to convey packages in a linear direction parallel to one of the one or more linear portions of the platen travel path toward the plurality of platens, wherein the automated loading system is configured to load at least one package onto a top surface of a platen of the plurality of platens while the platen is travelling along the one of the one or more linear portions of the platen travel path; and a vacuumization and sealing system configured to evacuate air from within the packages to form a vacuum therein and to seal the packages to maintain the vacuum within the packages. In various embodiments, the angular portion of the platen travel path and the one or more linear portions of the travel path collectively defines one full rotation around the single axis of rotation.

In various embodiments, the apparatus additionally comprises a conveying mechanism comprising a motor (e.g., an indexed servo-motor) and a pinion drive system operably connecting the motor and the carousel. Moreover, in various embodiments, each of the plurality of platens is operably secured to the carousel by a linear motion mechanism configured to enable each of the platens to travel in a linear direction during at least one portion of the angular platen travel path.

In various embodiments, the linear motion mechanism comprises a mechanical linkage configured to extend and retract during each of the one or more linear portions of the platen travel path. The linear motion mechanism may be configured such that each of the plurality of platens remain aligned with a corresponding radial section of the carousel extending radially outward from the single axis of rotation during the entire platen travel path.

In various embodiments, each linear portion of the platen travel path corresponds to between 30-50 degrees of rotation of the carousel around the single axis of rotation. In various embodiments, the vacuum chambers are in the lowered position for at least a portion of the period during which the corresponding platens are not travelling along a linear portion of the platen travel path.

In various embodiments, one of the one or more linear portions of the angular platen travel path comprises an unloading portion, wherein packages are removed from the corresponding platens during the unloading portion of the platen travel path.

Each platen may, in various embodiments, further comprise a cam follower configured to engage a cam surface corresponding to the platen travel path to guide the corresponding platen along the platen travel path.

Various embodiments are directed to a package platen for supporting a package during a vacuumization and sealing process performed by a rotary vacuumization and sealing system. In various embodiments, the package platen comprises a support surface defining an upper surface configured to support the package and an opening extending therethrough; and a sealing assembly comprising a seal bar configured to supply heat to a package to form a heat seal therein. In various embodiments the sealing assembly is operable between: an extended position in which the seal bar is positioned above the upper surface of the support surface; and a retracted position in which the seal bar is positioned below the upper surface of the support surface. Moreover, in various embodiments, the support surface of the package platen comprises a lift platform, wherein the upper surface of the lift platform defines the upper surface of the support surface. The lift platform may be removable from the support surface, and may be one of a plurality of lift platforms each having a different height.

In various embodiments, the sealing assembly of the package platen comprises a seal plate configured to form an air-tight seal with the support surface when the sealing assembly is in the extended position. Moreover, the sealing assembly may, in various embodiments, be rotatably mounted relative to the support surface such that the sealing assembly rotates between the extended position and the retracted position. The sealing assembly may further comprise a cam follower configured to engage and ride along a corresponding cam surface as the platen moves along a platen travel path, wherein the corresponding cam surface defines one or more contours to move the sealing assembly between the extended and retracted positions.

Moreover in various embodiments, the seal bar comprises an impulse sealing mechanism, which may comprise at least one wire extended across the seal bar, wherein the at least one wire is configured to heat up and thereby apply heat to the package.

In various embodiments, the package platen is configured to travel along a platen travel path comprising one or more linear portions of travel. In various embodiments, the platen travel path extends around a single axis of rotation. The platens may be operably secured to a carousel to convey the platens along the platen travel path.

Various embodiments are directed to a vacuum chamber assembly for use in evacuating air out of a package during a vacuumization and sealing process performed by a rotary vacuumization and sealing system. In various embodiments, the vacuum chamber comprises: a vacuum chamber portion defining a chamber interior having an open lower end, wherein the vacuum chamber portion is configured to selectably mate with a platen supporting a package thereon to form an air-tight enclosure around the package; and a support arm configured to operably move the vacuum chamber portion between a lowered position in which the vacuum chamber portion is mated with the platen and a raised position, wherein the support arm defines a vacuum conduit extending therethrough, wherein the vacuum conduit is in fluid communication with the chamber interior through a vacuum port extending through the chamber portion.

The support arm of the vacuum chamber assembly may, in various embodiments, be operably secured to the vacuum chamber portion via a hollow pivot point in fluid communication with the chamber interior through the vacuum port and is in fluid communication with the vacuum conduit defined in the support arm. Moreover, the support arm of the vacuum chamber assembly may be rotatably secured to a carousel via a hollow pivot point such that the support arm is permitted to rotate and move the vacuum chamber portion between the lowered position and the raised position, wherein the hollow pivot point is in fluid communication with the vacuum conduit defined in the support arm and a second vacuum conduit secured to the carousel.

In various embodiments, the vacuum chamber assembly further comprises a heat seal assembly positioned within the chamber interior, wherein the heat seal assembly is configured to engage a package and apply heat to the package to form a heat seal therein. The heat seal assembly may additionally comprise a heat seal bar moveable between a retracted position and an extended position to compress a portion of the package between the heat seal bar and a corresponding seal bar on an opposite side of the package.

The heat seal bar may be movable between a retracted position and an extended position by an inflatable diaphragm.

In various embodiments, the vacuum chamber assembly additionally comprises a cutting mechanism configured to sever a portion of a package positioned within the sealed enclosure. Moreover, various embodiments additionally comprise a perforator mechanism configured to puncture holes into a package positioned within the sealed enclosure to facilitate evacuation of air from within the package.

In various embodiments, the vacuum chamber assembly is configured to selectably mate with a single corresponding platen.

Moreover, the vacuum chamber assembly may additionally comprise a secondary support rod configured to maintain a chamber orientation while the chamber is moved between the lowered position and the raised position. In various embodiments, the open lower end of the vacuum chamber portion remains substantially parallel to a horizontal plane while the chamber is moved between the lowered position and the raised position.

Various embodiments are directed to a system for distributing compressed air to a plurality of pneumatically actuated components of a rotary vacuumization system, wherein each of the pneumatically actuated components rotate synchronously with a carousel having a plurality of vacuum chambers configured to enclose one or more packages loaded into the rotary vacuumization system. In various embodiments, the system comprises a plurality of electronically actuated air valves rotating synchronously with the carousel, wherein the plurality of electronically actuated air valves comprise at least one electronically actuated air valve corresponding to each vacuum chamber; and an electrical slip ring assembly. In various embodiments, the electrical slip ring assembly comprises: a stationary portion comprising at least one brush in electronic communication with an electrical signal generator; and a rotating portion configured to rotate synchronously with the carousel, wherein the rotating portion comprises a plurality of electrical contacts, wherein the plurality of electrical contacts comprises at least one electrical contact corresponding to each electronically actuated air valve, and wherein each electrical contact is in electronic communication with at least one of the plurality of electronically actuated air valves. Each of the electrical contacts is in electronic communication with the at least one brush while the electrical contact is adjacent the at least one brush, and wherein the electrical signal generator is in electronic communication with an electronically actuated air valve while the electrical contact corresponding to the electronically actuated air valve is adjacent the brush. In various embodiments, the plurality of electrical contacts of the rotating portion are positioned adjacent to one another and collectively define a ring of electrical contacts around a perimeter of the rotating portion. Moreover, each of the electrical contacts of the rotating portion are electrically isolated from adjacent electrical contacts.

In various embodiments, each electronically actuated air valve is configured to open and thereby provide compressed air to one or more corresponding pneumatically actuated components in response to receipt of a signal transmitted from the electrical signal generator. Moreover, in various embodiments, each electronically actuated air valve receives a signal from the electrical signal generator over a period of time occurring while the corresponding electrical contact of the rotating portion is in electronic communication with the brush.

In various embodiments, the period of time occurring while the corresponding electrical contact of the rotating portion is in electronic communication with the brush occurs during a portion of the period of time that the corresponding electrical contact of the rotating portion is in electronic communication with the brush.

Moreover, in various embodiments, the plurality of pneumatically actuated components comprises at least one of: (1) a pneumatically actuated perforator mechanism corresponding to each vacuum chamber and configured to perforate a package enclosed within the respective vacuum chamber upon receipt of compressed air from a corresponding electronically actuated air valve corresponding to the corresponding vacuum chamber; (2) a pneumatically actuated cutter mechanism corresponding to each vacuum chamber and configured to sever the package enclosed within the respective vacuum chamber upon receipt of compressed air from a corresponding electronically actuated air valve corresponding to the corresponding vacuum chamber; or (3) a bag tail removal system corresponding to each vacuum chamber and configured to emit a stream of compressed air around at least a portion of the package corresponding to the respective vacuum chamber to blow a severed portion of the package away from the package upon receipt of compressed air from a corresponding electronically actuated air valve corresponding to the corresponding vacuum chamber.

In various embodiments, the plurality of electronically actuated air valves of the system for distributing compressed air comprise a first set of electronically actuated air valves, wherein the first set of electronically actuated air valves comprise at least one electronically actuated air valve corresponding to each vacuum chamber; and a second set of electronically actuated air valves, wherein the second set of electronically actuated air valves comprise at least one electronically actuated air valve corresponding to each vacuum chamber. In various embodiments, the stationary portion of the system for distributing compressed air comprises at least two brushes, wherein the at least two brushes comprise: a first brush corresponding to the first set of electronically actuated air valves; and a second brush corresponding to the second set of electronically actuated air valves. In various embodiments, the rotating portion comprises at least two sets of electrical contacts, wherein the at least two sets of electrical contacts comprise: a first set of electrical contacts corresponding to the first set of electronically actuated air valves, wherein the first set of electrical contacts comprises at least one electrical contact corresponding to each electronically actuated air valve of the first set of electronically actuated air valves; and a second set of electrical contacts corresponding to the second set of electronically actuated air valves, wherein the second set of electrical contacts comprises at least one electrical contact corresponding to each electronically actuated air valve of the second set of electronically actuated air valves.

In various embodiments, the first set of electrical contacts are positioned adjacent to one another and collectively define a first ring of electrical contacts around a perimeter of the rotating portion; and the second set of electrical contacts are positioned adjacent to one another and collectively define a second ring of electrical contacts around the perimeter of the rotating portion. Moreover, in various embodiments, the first set of electrical contacts are electrically isolated from the second set of electrical contacts.

In various embodiments, the plurality of pneumatically actuated components comprises: a pneumatically actuated perforator mechanism corresponding to each vacuum chamber and configured to perforate a package enclosed within the respective vacuum chamber upon receipt of compressed air from a corresponding electronically actuated air valve of the first set of electronically actuated air valves; and a pneumatically actuated cutter mechanism corresponding to each vacuum chamber and configured to sever the package enclosed within the respective vacuum chamber upon receipt of compressed air from a corresponding electronically actuated air valve of the first set of electronically actuated air valves.

Various embodiments are directed to a rotary vacuum valve for distributing vacuum pressure to one or more air-tight enclosures of a rotary vacuumization system. In various embodiments the rotary valve comprises: a stationary portion defining an entry port in fluid communication with a vacuum system and a diagnostic port in fluid communication with a diagnostic system; and a rotating portion defining a plurality of chamber ports each in fluid communication with a corresponding vacuum chamber via a vacuum conduit, wherein each vacuum chamber is configured to form an air-tight enclosure. In various embodiments, the rotating portion is configured to rotate relative to the stationary portion and thereby selectably align each of the plurality of chamber ports with the one or more entry ports of the stationary portion to place the corresponding vacuum chamber in fluid communication with the vacuum system and to selectably align each of the plurality of chamber ports with the diagnostic port to place the corresponding vacuum chamber in fluid communication with the diagnostic system. Moreover, in various embodiments, each of the plurality of chamber ports are aligned with the entry port for a portion of the rotation of the rotating portion.

In various embodiments, the diagnostic system is configured to measure a vacuum pressure within a vacuum chamber through the diagnostic port while the vacuum chamber forms an air-tight enclosure.

In various embodiments, the stationary portion is separated from the rotating portion by a lubricant layer, which may comprise a fluid lubricant supplied by a gravity feed.

In various embodiments, the stationary portion further defines a second entry port in fluid communication with the vacuum system. Moreover, in various embodiments, the stationary portion further defines two or more cross-venting ports in fluid communication therebetween and configured to place two or more chamber ports in fluid communication with one another. The stationary portion may, in various embodiments, further define one or more compressed air entry ports, and the rotating portion further defines a plurality of chamber compressed air ports each in fluid communication with a pneumatically actuated mechanism corresponding to a respective air-tight enclosure. The pneumatically actuated mechanism may be a heat seal mechanism movable between an extended position and a retracted position. In various embodiments, each of the compressed air entry ports are in fluid communication with an inflatable diaphragm corresponding to each air-tight enclosure.

Moreover, in various embodiments, the stationary portion further defines a final vent port to place each chamber port in fluid communication with a surrounding environment.

Various embodiments are directed to a method for positioning a package onto a platen of an apparatus for vacuumizing and sealing the package. The method comprises: conveying a plurality of platens along a platen travel path extending around a single axis of rotation, wherein each of the plurality of platens comprise a seal bar configured to heat seal a package positioned thereon; conveying the package along an infeed system toward the plurality of platens, wherein the package is oriented such that an open end of the package defines an upstream end of the package; interrogating one or more sensor systems positioned along the length of the conveying system; determining a seal location along the length of the package relative to the open end of the package based at least in part on data received from interrogating the one or more sensor systems; determining, based at least in part on the location of the seal location along the length of the package, a loading time for transferring the package from the infeed conveyor onto a platen such that the seal location is positioned adjacent the seal bar of the platen; and conveying the package off of a downstream end of the infeed system and onto the platen at the loading time such that the seal location is positioned adjacent the seal bar of the platen.

In various embodiments, the platen travel path comprises an angular travel portion extending at least partially around the single axis of rotation. The platen travel path may comprise one or more linear travel portions.

In various embodiments, the one or more sensor systems comprise an infrared sensor system configured to identify the location of a trailing edge of a product positioned within the package. In certain embodiments, determining a seal location comprises locating the seal location adjacent the trailing edge of the product between the trailing edge of the product and the open end of the package. Moreover, in various embodiments, the one or more sensor systems comprise a fluorescence sensor system configured to identify the location of a trailing edge of a package patch of the package. In various embodiments, determining a seal location comprises locating the seal location adjacent the trailing edge of the package patch between the trailing edge of the package patch and the open end of the package.

In various embodiments, determining a seal location comprises: locating the trailing edge of the product; locating the trailing edge of the package patch; determining which of the trailing edge of the product and the trailing edge of the package patch is closer to the open end of the package; and upon a determination that the trailing edge of the product is closer to the open end of the package, locating the seal location adjacent the trailing edge of the product between the trailing edge of the product and the open end of the package; or upon a determination that the trailing edge of the package patch is closer to the open end of the package, locating the seal location adjacent the trailing edge of the package patch between the trailing edge of the package patch and the open end of the package.

In various embodiments, each platen comprises a corresponding retractable seal bar mechanism configured to move between a retracted position in which the seal bar mechanism is located below an upper surface of the corresponding platen and an extended position in which the seal bar mechanism is located above an upper surface of the corresponding platen; and wherein the seal bar is in the retracted position when the package is conveyed off of the downstream end of the infeed conveyor and onto the platen. Moreover, the method of positioning a package may further comprise raising the seal bar mechanism to the extended position after the package is placed on the platen such that the seal bar mechanisms engages the package at the located seal bar location. In various embodiments, the package to be positioned according to the method of positioning a package comprises a flexible polymeric bag containing a product (e.g., a food product, such as a meat product).

Various embodiments are directed to a method for positioning a package onto a platen of an apparatus for vacuumizing and sealing the package. In various embodiments, the method comprises rotating a plurality of platens around a single axis of rotation and along a platen travel path, wherein the platen travel path comprises one or more linear path portions; conveying the package along an infeed system toward the plurality of platens; and conveying the package off of a downstream end of the infeed system and onto a platen while the platen is travelling along one of the one or more linear path portions of the platen travel path. Various embodiments additionally comprise interrogating one or more sensor systems positioned along the length of the infeed system; determining a seal location along the length of the package proximate the open end of the package based at least in part on data received from interrogating the one or more sensor systems; determining, based at least in part on the location of the seal location along the length of the package, a loading time for transferring the package from the infeed system onto a platen such that the seal location is positioned adjacent a seal bar operably secured to the platen; and conveying the package off of the downstream end of the infeed system and onto the platen at the loading time such that the seal location is positioned adjacent the seal bar of the platen. In various embodiments, the one or more sensor systems comprise an infrared sensor system configured to identify the location of a trailing edge of a product positioned within the package. In such embodiments, determining a seal location may comprise locating the seal location adjacent the trailing edge of the product between the trailing edge of the product and the open end of the package.

Moreover, in various embodiments, the one or more sensor systems comprise a fluorescence sensor system configured to identify the location of a trailing edge of a package patch of the package. In such embodiments, determining a seal location may comprise locating the seal location adjacent the trailing edge of the package patch between the trailing edge of the package patch and the open end of the package. Moreover, in various embodiments, determining a seal location comprises locating the trailing edge of the product; locating the trailing edge of the package patch; determining which of the trailing edge of the product and the trailing edge of the package patch is closer to the open end of the package; and upon a determination that the trailing edge of the product is closer to the open end of the package, locating the seal location adjacent the trailing edge of the product between the trailing edge of the product and the open end of the package; or upon a determination that the trailing edge of the package patch is closer to the open end of the package, locating the seal location adjacent the trailing edge of the package patch between the trailing edge of the package patch and the open end of the package.

In various embodiments, each platen comprises a corresponding retractable seal bar mechanism configured to move between a retracted position in which the seal bar mechanism is located below an upper surface of the corresponding platen and an extended position in which the seal bar mechanism is located above an upper surface of the corresponding platen; and wherein the seal bar is in the retracted position when the package is conveyed off of the downstream end of the infeed conveyor and onto the platen. Moreover, the method of positioning a package further comprises raising the seal bar mechanism to the extended position after the package is placed on the platen such that the seal bar mechanisms engages the package at the located seal location.

The package of the method of positioning a package may comprise a flexible polymeric bag containing a product (e.g., a food product, such as a meat product).

In various embodiments, the one or more linear path portions corresponds to between 30-50 degrees of rotation of a platen around the single axis of rotation.

Moreover, in various embodiments, the package is conveyed off of the downstream end of the infeed system at substantially the same velocity as the platen while the platen is travelling along the one of the one or more linear path portions of the platen travel path.

Various embodiments are directed to a method for heat sealing a package positioned on a platen of an apparatus for vacuumizing and heat sealing the package. The method comprises positioning the package on an upper support surface of the platen such that at least a portion of the package proximate an open end of the package is positioned at a seal location of the platen; raising a lower seal bar from a retracted position in which the lower seal bar is positioned below the upper support surface of the platen to an extended position in which the lower seal bar extends above the upper support surface of the platen at the seal location of the platen; lowering an upper seal bar against the lower seal bar such that the portion of the package positioned at the seal location of the platen is compressed between the lower seal bar and the upper seal bar; and heating at least a portion of one of the lower seal bar or the upper seal bar to heat the portion of the package positioned at the seal location to heat seal the package.

In various embodiments, positioning the package on the upper support surface of the platen comprises automatically depositing the package onto the upper support surface of the platen from a downstream end of an infeed system such that the portion of the package proximate the open end of the package is positioned at the seal location of the platen.

Moreover, in various embodiments, at least one of the lower seal bar or the upper seal bar comprises an impulse sealing mechanism, and the method further comprises providing an electrical current to the impulse sealing mechanism to heat the portion of the package positioned at the seal location to seal the package. In various embodiments, the lower seal bar comprises a lower impulse sealing mechanism and the upper seal bar comprises an upper impulse sealing mechanism, and the method further comprises providing an electric current to the lower impulse sealing mechanism and the upper impulse sealing mechanism to heat the portion of the package positioned at the seal location to seal the package.

In various embodiments, positioning the package on the upper support surface of the platen comprises: determining a heat seal location on the package; and positioning the package on the upper support surface of the platen such that the heat seal location of the package is adjacent the seal location of the platen. In various embodiments, determining a heat seal location on a package comprises conveying the package along an infeed system toward the plurality of platens; interrogating one or more sensor systems positioned along the length of the conveying system; and determining the heat seal location of the package along the length of the package proximate the open end of the package based at least in part on data received from interrogating the one or more sensor systems. Moreover, in various embodiments, the one or more sensor systems comprise an infrared sensor system configured to identify the location of a trailing edge of a product positioned within the package, and determining a heat seal location of the package comprises locating the heat seal location adjacent the trailing edge of the product between the trailing edge of the product and the open end of the package.

In various embodiments, the one or more sensor systems comprise a fluorescence sensor system configured to identify the location of a trailing edge of a package patch of the package, and determining the heat seal location of the package comprises locating the heat seal location adjacent the trailing edge of the package patch between the trailing edge of the package patch and the open end of the package. In certain embodiments, determining the heat seal location of the package comprises locating the trailing edge of the product; locating the trailing edge of the package patch; determining which of the trailing edge of the product and the trailing edge of the package patch is closer to the open end of the package; and upon a determination that the trailing edge of the product is closer to the open end of the package, locating the heat seal location adjacent the trailing edge of the product between the trailing edge of the product and the open end of the package; or upon a determination that the trailing edge of the package patch is closer to the open end of the package, locating the heat seal location adjacent the trailing edge of the package patch between the trailing edge of the package patch and the open end of the package.

In various embodiments, the platen is configured to travel along a platen travel path, and positioning the package on the support surface of the platen comprises automatically depositing the package onto the platen while the platen is travelling along the platen travel path. Moreover, in various embodiments, the platen travel path comprises one or more linear path portions; and automatically depositing the package onto the platen comprises automatically depositing the package onto the platen while the platen is travelling along one of the one or more linear path portions. In certain embodiments, the platen travel path extends around a single axis of rotation such that the platen is configured to rotate about the single axis of rotation. However, in certain embodiments, the platen travel path extends around two or more axes of rotation, and wherein the one or more linear path portions are located between two of the two or more axes of rotation.

Various embodiments are directed to a method for vacuumizing a package having an open end allowing air to pass freely into a package interior. The method comprises positioning the package on a support surface of a platen; lowering a vacuum chamber over the package to engage the platen to form an air-tight enclosure around the package while permitting air within the air-tight enclosure to pass into the interior of the package, wherein the vacuum chamber is operably secured to a rigid support arm configured to move the vacuum chamber between a raised position and a lowered position, and wherein the rigid support arm defines a vacuum conduit extending therethrough to selectably place the interior of the air-tight enclosure in fluid communication with a vacuum system; and evacuating air from within the air-tight enclosure through the vacuum conduit of the rigid support arm and to the vacuum system, wherein evacuating the air from within the air-tight enclosure evacuates the air from within the package interior.

Various embodiments of a method for vacuumizing a package additionally comprise heat sealing the open end of the package after evacuating the air from within the air-tight enclosure. Certain embodiments additionally comprise perforating the package to facilitate evacuating air from within the package interior. Moreover, in various embodiments, the method for vacuumizing a package additionally comprises severing a portion of the package proximate the open end of the package. The method may further comprise raising the vacuum chamber after severing the portion of the package; and directing a stream of compressed air across the support surface of the platen to blow the severed portion of the package off of the platen. Moreover, in various embodiments, the method for vacuumizing a package additionally comprises raising the vacuum chamber after heat sealing the open end of the package; and removing the package from the support surface of the platen. In various embodiments, the platen is configured to travel along a platen travel path, and positioning the package on the support surface of the platen comprises automatically depositing the package onto the platen while the platen is travelling along the platen travel path. In various embodiments, the platen travel path comprises one or more linear path portions; and automatically depositing the package onto the platen comprises automatically depositing the package onto the platen while the platen is travelling along one of the one or more linear path portions. In various embodiments, the platen travel path may extend around one or more axes of rotation (e.g., one axis of rotation or two or more axes of rotation).

Moreover, in various embodiments, automatically depositing the package onto the platen comprises automatically depositing the package onto the platen from an infeed system configured to convey the package in a linear direction toward the platen travel path.

Various embodiments are directed to a method for operating one or more pneumatic devices of an apparatus for vacuumizing and heat sealing a package while the one or more pneumatic devices are rotating about a single axis of rotation of the apparatus for vacuumizing and heat sealing the package. In various embodiments, the method comprises providing one or more electronically actuated valves each configured to selectably provide pneumatic pressure to at least one of the one or more pneumatic devices, wherein the one or more electronically actuated valves are rotating synchronously with the one or more pneumatic devices; providing a slip ring configured for transmitting electrical signals from a stationary electrical signal generator to the one or more electronically actuated valves while the one or more electronically actuated valves are rotating; rotating the pneumatic devices, the one or more electronically actuated valves; and the plurality of electrically isolated contacts such that the contacts pass the brushes to place each of the electronically actuated valves in electrical communication with the stationary electrical signal generator; transmitting a signal from the stationary electrical signal generator to the electronically actuated valve while the electrical signal generator is in electrical communication with the electronically actuated valves; and in response to receiving a signal from the stationary electrical signal generator, actuating the electronically actuated valve to provide pneumatic pressure to one or more corresponding pneumatic devices to operate the one or more corresponding pneumatic devices. In various embodiments, the slip ring comprises a stationary portion comprising a brush in electrical communication with the stationary electrical signal generator; and a plurality of electrically isolated contacts configured to rotate relative to the stationary portion synchronously with the electronically actuated valves, and wherein each of the plurality of electrically isolated contacts is in electrical communication with a corresponding one or more electronically actuated valves.

In various embodiments, the one or more pneumatic devices comprise at least one of: (1) a plurality of cutting mechanisms, wherein the plurality of cutting mechanisms comprise a cutting mechanism corresponding to each of a plurality of vacuum chambers; (2) a plurality of perforator mechanisms, wherein the plurality of perforator mechanisms comprise a perforator mechanism corresponding to each of the plurality of vacuum chambers; or (3) a plurality of bag tail removal systems configured to provide a stream of compressed air to remove a severed portion of a package from the apparatus, wherein the plurality of bag tail removal systems comprises a bag tail removal system corresponding to each of the vacuum chambers. In various embodiments, transmitting a signal from the stationary electrical generator to the electronically actuated valve occurs during a portion of the time during which the electrical contact is in electrical communication with the brush.

Various embodiments are directed to a method for monitoring vacuum characteristics of one or more vacuum chambers rotating about a single axis of rotation. The method comprises providing a rotary vacuum valve comprising: a stationary portion defining an entry port in fluid communication with a vacuum system and a diagnostic port in fluid communication with a diagnostic system configured to monitor vacuum characteristics; a rotating portion defining one or more chamber ports each in fluid communication with a single corresponding vacuum chamber via a vacuum conduit; rotating the rotating portion of the rotary vacuum valve to a first position such that at least one chamber port is aligned with the entry port such that the corresponding vacuum chamber is in fluid communication with the vacuum system such that the vacuum system evacuates air from within the corresponding vacuum chamber; and rotating the rotating portion of the rotary vacuum valve to a second position such that the at least one chamber port is aligned with the diagnostic port of the stationary portion of the rotary vacuum valve such that the corresponding vacuum chamber is in fluid communication with the diagnostic system to monitor the vacuum characteristics of the corresponding vacuum chamber. Various embodiments additionally comprise monitoring a vacuum level of a vacuum chamber while a corresponding chamber port is aligned with the diagnostic port. Moreover, various embodiments additionally comprise venting a vacuum chamber to reduce the vacuum pressure therein. In various embodiments, venting the vacuum chamber comprises placing the vacuum chamber in fluid communication with a second vacuum chamber at atmospheric pressure to equalize the pressure therebetween. In various embodiments, venting the vacuum chamber occurs before rotating the rotating portion of the rotary valve to the second position. Moreover, in various embodiments, placing the vacuum chamber in fluid communication with a second vacuum chamber occurs before rotating the rotating portion of the rotary valve to the second position.

BRIEF DESCRIPTION OF THE FIGURES

Reference will now be made to the accompanying drawings, which are not necessarily drawn to scale, and wherein:

FIG. 3A illustrates a top view of a platen travel path according to one embodiment;

FIG. 3B illustrates a top view of a cam track and a platen travel path according to one embodiment;

FIG. 4 illustrates a side view of a platen travel path according to one embodiment;

FIGS. 15A-15D are example heat seal bar shapes according to various embodiments;

FIGS. 16A-16B are example heat seal bar configurations according to various embodiments;

FIG. 17 is a top view of a platen and a portion of a bag tail removal system according to one embodiment;

DETAILED DESCRIPTION OF VARIOUS EMBODIMENTS

Figure 1:
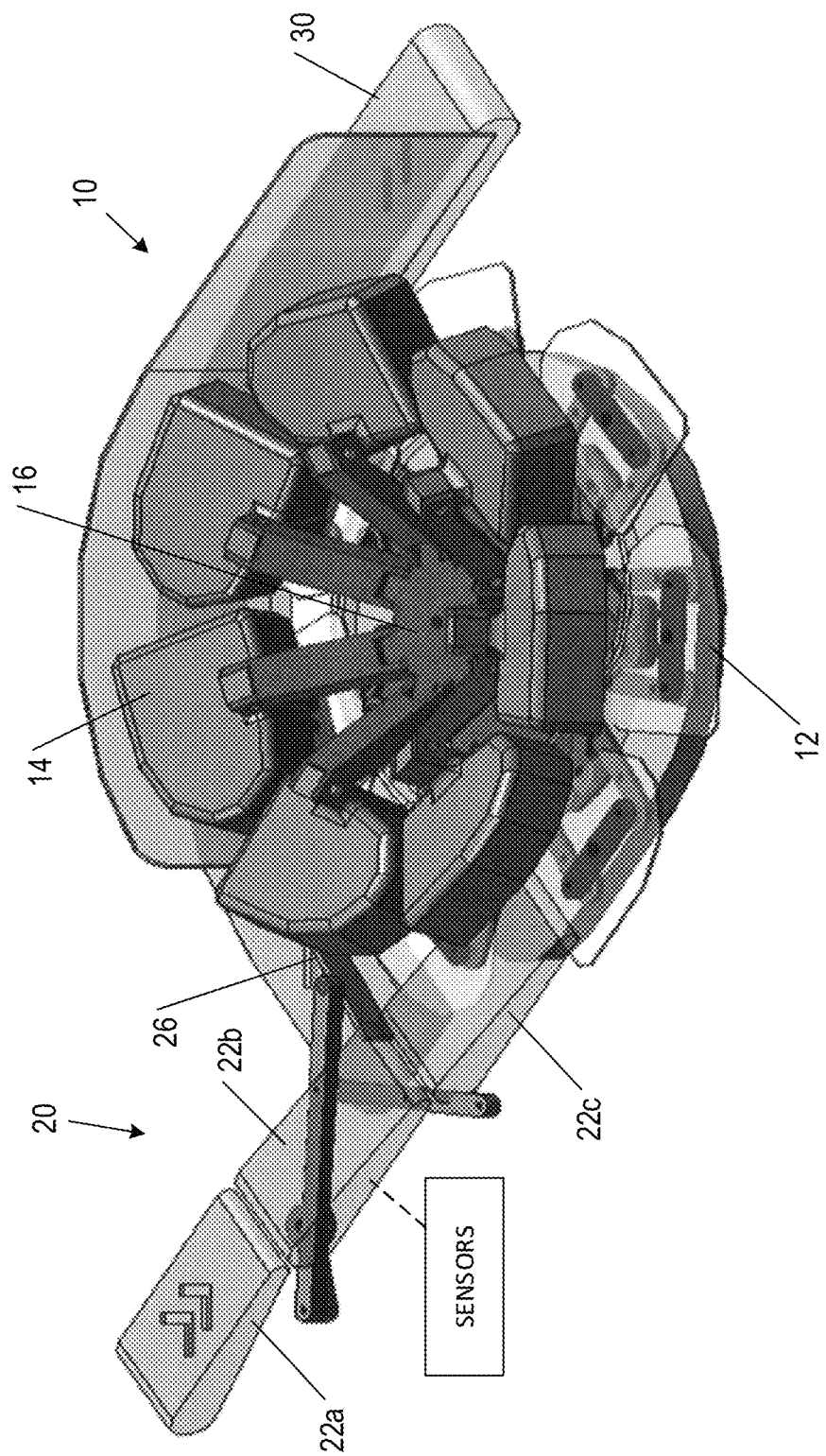
FIG. 1 illustrates an apparatus for vacuumizing and heat sealing packages according to one embodiment.

The present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

A rotary food packager configured to vacuumize and heat seal packages is described herein. The packages may be, for example, plastic bags each containing a product (e.g., a food product, such as a meat product). In various embodiments, the rotary food packager has a plurality of package platens configured to support a pre-bagged product and a plurality of corresponding vacuum chambers. In various embodiments, the package platens and the vacuum chambers rotate synchronously around a single, vertical axis of rotation. The rotational movement of the chambers and platens may be driven and controlled by a motor (e.g., a servo motor) via a pinion drive mechanism.

As described in greater detail below, as the platens move around the axis of rotation, they may be guided along one or more linear portions of travel. In particular, in various embodiments, the platens are each connected to a linkage assembly configured to permit the platens to move away and return toward the axis of rotation along a radial direction of travel relative to the axis of rotation. In various embodiments, as the chambers and platens rotate around the axis of rotation, the vacuum chambers are lowered onto the platens to seal the interior volume of the chamber during a portion of the platens' travel path around the axis of rotation. In such embodiments, the closed chamber continues to rotate around the axis of rotation and, while it remains closed, a pneumatically-driven perforator blade may puncture one or more holes in the side of a package bag located within the chamber. The air may then be vacuumed out of the chamber (and out of the bag) by a vacuum system, which is described in greater detail below. The bag may then be heat sealed using an impulse heat sealing mechanism and the bag tail (the portion of the bag located between the heat seal and open end of the bag) may be severed from the now sealed and vacuum packaged bag of product using a pneumatically actuated cutting knife.

In various embodiments, the vacuum is then vented from within the chamber and the chamber is raised such that the vacuum sealed product may be removed from the package platen. In various embodiments, after the chamber is raised, compressed air is directed across the surface of the platen to blow the severed bag tail off of the platen. In certain embodiments, as the chamber is vented, it is cross vented with another chamber initially undergoing (or prior to undergoing) vacuuming in order to decrease the vacuum level within the chamber to be released while increasing the vacuum level in the other chamber in order to lower the amount of air that must be evacuated from the chamber.

The packages (e.g., pre-bagged products) may be loaded onto the package platens automatically and without an operator via an infeed system. In various embodiments, the infeed system incorporates an infrared detection system and a fluorescence detection system in order to identify a select location for providing a heat seal in the bag. For example, the infrared detection system identifies the trailing edge of the product within the bag, while the fluorescence detection system locates thick portions of the bag that are not conducive to heat sealing (e.g., reinforcing bag patches). Collectively, the infrared and fluorescence systems identify a transverse line across the width of the bag as a select location at which a heat seal may be formed to fully seal the bag.

Once the select heat seal location is identified, the infeed system may convey the package onto a package platen such that the select heat seal location is located above an impulse heat seal bar operatively connected to the platen. In various embodiments, the platen passes directly below the infeed system during the loading process, during which time the heat seal bar is retracted below a top surface of the platen. In embodiments in which the heat seal bar is retracted below the platen during loading, the vertical drop for the packages being conveyed onto the platen (corresponding to the vertical distance between the top surface of the platen and the top surface of the infeed system) is minimized such that the bag opening is not disturbed while the package is conveyed onto the platen. By minimizing the drop from the infeed conveyor onto the platen, the bag opening may remain relatively flat when placed onto the platen with minimal creases/wrinkles, which could impede formation of a strong heat seal through the bag if present.

After the package is loaded onto the platen, the heat seal bar may be raised to a sealing position. In various embodiments, the vacuum chamber includes a corresponding heat seal bar that mates with the lower seal bar while the chamber is closed. Both the lower and upper seal bars may include impulse sealing mechanisms to heat the heat sealable plastic located therebetween quickly to form an air-tight heat seal bond in the plastic. This dual, two-sided impulse seal mechanism may configured to seal through any remaining wrinkles or creases formed in the plastic bag when the bag is dropped onto the platen.

Moreover, in various embodiments, the platens are travelling along a linear portion of travel as they pass under the infeed conveyor. This linear portion of travel may enable the packages to be loaded from the infeed conveyor in a linear direction onto platens travelling in a direction parallel to the loading direction of the infeed conveyor thereby ensuring the packages are properly aligned on the platens. Once the packages are loaded onto the platens, the platens may return to the angular (circular) path of travel, during which time the corresponding chambers may be lowered onto the platens as described above. In certain embodiments, the platens also have a linear travel path during the unloading process as well in order to facilitate unloading of the vacuum sealed packages.

Various embodiments additionally comprise an outfeed conveyor system located below the infeed conveyor and the platen travel path. This "overlapping" orientation of infeed and outfeed conveyors provides a small overall footprint of the machine in order to save floor space in a packaging environment. After the packages are vacuum sealed, the packages may be directed off of the platens and onto the outfeed conveyor via an unloading assembly (e.g., a paddle configured to direct the package off of the corresponding platens and onto the outfeed conveyor).

With reference to the pneumatic perforator, pneumatic cutting knife, and the compressed air system, these may be controlled via electronically-actuated valves (e.g., solenoid valves) that rotate synchronously with the platens and/or the chambers about the axis of rotation. The valves receive electronic signals via an electronic slip-ring having a plurality of separate electrical contacts corresponding to each valve of each of the platen-chamber combinations. The electrical contacts (which may be rotating with the platens and/or the chambers) are engaged in turn by electrical brushes to selectively connect the valves to an electrical signal generator, which transmits a signal to operate the perforator, cutting knife, and/or compressed air system.

The previously described vacuum system may be controlled by one or more vacuum pumps and/or vacuum boosters located external to the vacuum sealing apparatus. In various embodiments, one or more vacuum pumps provide a continuous vacuum pressure to the vacuum sealing apparatus, which selectively distributes the vacuum pressure through a rotary valve having a plurality of vacuum ports corresponding to each of the platens and/or the chambers to the vacuum chambers after the chambers are lowered. As the platens and/or chambers rotate about the axis of rotation, the plurality of ports may rotate synchronously and thereby selectively place the interior of the chambers in fluid communication with the one or more vacuum pumps while the chambers are closed to increase a vacuum level therein. In various embodiments, each of the ports are in fluid communication with their respective chamber via a vacuum conduit that extends through hollow support arms for the chambers. Thus, the system may not incorporate additional vacuum hoses connecting the rotary valve with the chambers. Moreover, in addition to the ports corresponding to each of the chambers and/or platens, the rotary valve may include one or more diagnostic ports that may be used to connect diagnostic equipment to test vacuum pressures and/or other aspects of the system.

The vacuum sealer and other components described herein may be particularly useful for vacuumizing and heat sealing a package (a bag into which a product, such as a food product, has been placed manually, mechanically or otherwise).

Any suitable bag formulations of the package, especially those made from thermoplastic films such as olefinic films with or without oxygen barrier functionality, can be used with the apparatus described herein. These films are made by extrusion coating, co-extrusion, lamination, and/or other suitable processes. In certain embodiments, films comprise an outer layer, an intermediate layer, and an inner layer. The materials of the outer layer are often chosen for abuse resistance and/or sealability, and can be chosen from any suitable polymeric materials such as polyolefin, especially ethylenic polymer and copolymer, polypropylene, polyester, polyamide, and/or the like. The inner layer materials, often chosen for sealability, can be any of the materials described for the outer layer. The intermediate layer materials are often chosen for their barrier qualities (e.g., barriers to oxygen, moisture, carbon dioxide, and/or the like). Examples include polyvinylidene chloride polymer and copolymer, ethylene vinyl alcohol copolymer, polyvinyl alcohol, polyamide, polyester, acrylonitrile, and/or the like. In various embodiments, the intermediate layer may itself comprise a plurality of individual layers. Bags are in one embodiment heat shrinkable, various bags used with the apparatus described herein are not heat shrinkable. In various embodiments, the bags are at least partially crosslinked.

Rotary Vacuum Sealer with Single Axis of Rotation

FIG. 1 illustrates an isometric view of a rotary vacuum sealer apparatus 10. As shown in FIG. 1, the rotary vacuum sealer apparatus 10 comprises an infeed system 20 for providing packages to the rotary vacuum sealer apparatus 10; a plurality of platens 12 configured to support and convey packages during vacuumization and sealing; a plurality of vacuum chambers 14 for forming an air-tight enclosure around packages placed onto respective platens 12; and an outfeed system 30 configured for conveying packages away from the apparatus 10. Each of these components are described in greater detail herein.

Figure 2:
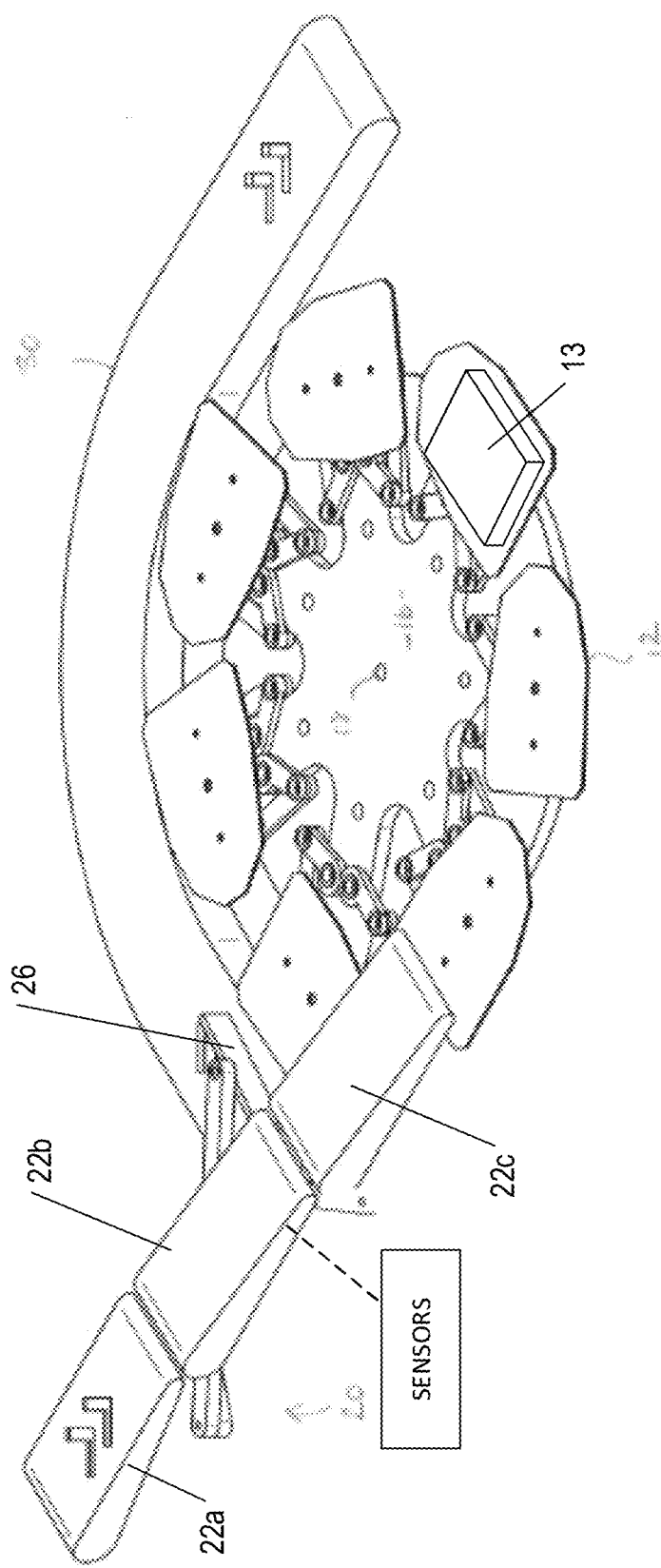
FIG. 2 illustrates a plurality of platens configured to support packages while being vacuumized and heat sealed according to one embodiment.

FIG. 2 illustrates an isometric view of the rotary vacuum sealer's platens 12 and portions of the infeed/outfeed systems 20, 30. As shown in FIG. 2, the platens 12 are distributed around and supported by a carousel 16. Although FIG. 2 illustrates only the platens 12, each platen 12 has a dedicated, corresponding vacuum chamber 14 (shown in FIG. 1). In the illustrated embodiment of FIG. 2, the rotary vacuum sealer apparatus 10 includes seven separate platens 12 each with corresponding vacuum chambers 14. However, according to various other embodiments, the apparatus 10 may have any number of platens 12 and corresponding vacuum chambers 14 (e.g., 3, 4, 5, 6, 8, 9, 10, 11, or 12 platens 12 each with a corresponding vacuum chamber 14).

Each platen 12 is configured to support one or more packages (e.g., a food product placed within a plastic bag) to be vacuumized. In the illustrated embodiment of FIG. 2, the platens 12 each have a generally elongated shape, having a length measured in a direction parallel to their direction of travel and a width measured perpendicular to their direction of travel. As shown in FIG. 2, the length of the platens 12 are longer than the width of the platens 12 such that generally elongated packages may be placed upon the platens' top surfaces. In addition, in certain embodiments, the top surface of the platens 12 may each define one or more indentions to provide support to a package placed thereon. For example, particularly when used with at least partially round products (e.g., cylindrical and/or partially spherical shaped products), the indentions may provide support to maintain a relative position of a package on the platen 12. Moreover, in various embodiments, the top surface of the platen 12 may define two or more indentions to facilitate support of a plurality of packages to be simultaneously vacuumized and heat sealed within a single vacuum chamber 14.

In the illustrated embodiment of FIG. 1, each of the vacuum chambers 14 has an elongated shape corresponding to the shape of the platens 12. In particular, in FIG. 1, both the platens 12 and vacuum chambers 14 have chamfered leading edges forming a generally hexagonal platen profile. However, it should be understood that any of a variety of platen 12 and vacuum chamber 14 shapes may be utilized, including rectangular, square, circular, elliptical, pentagonal, polygonal and/or the like. Moreover, the vacuum chamber 14 and platens 12 need not have corresponding shapes, but may have any of a variety of shapes permitting the vacuum chamber 14 to mate with the platen 12 to form an air-tight enclosure therebetween.

Figure 12:
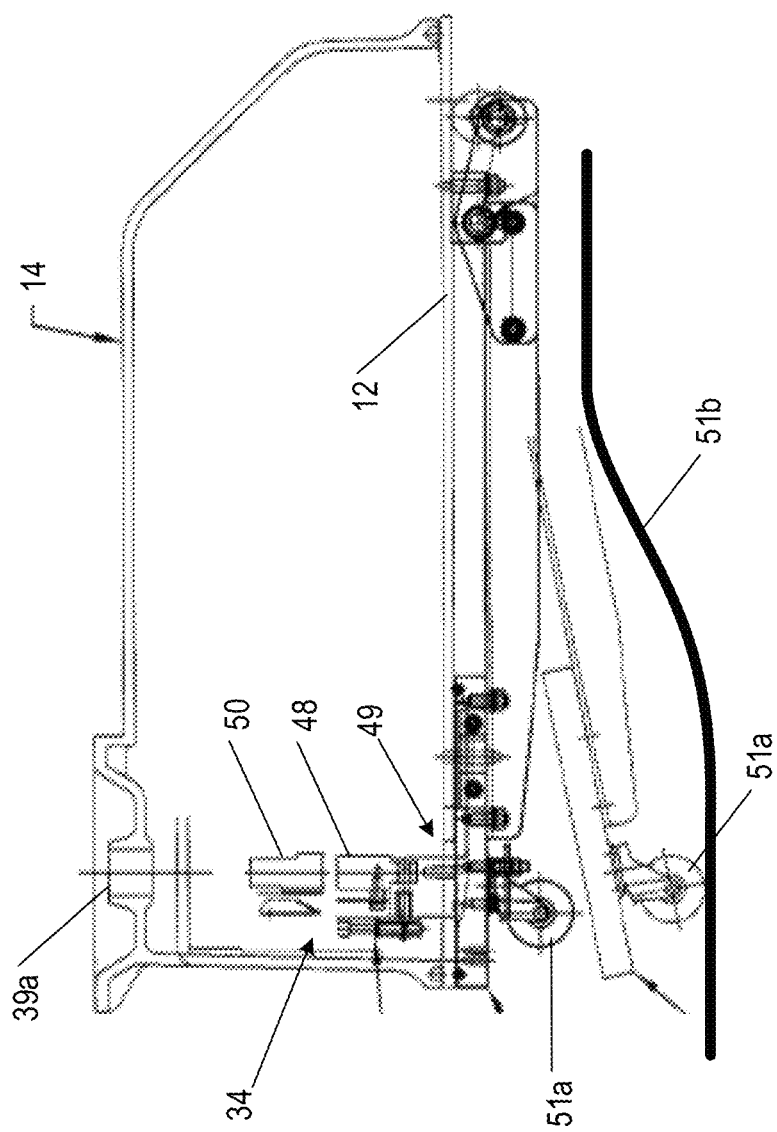
FIG. 12 is a side cutaway view of a heat seal mechanism according to one embodiment.

With reference briefly to the illustrated embodiment of FIG. 12, each vacuum chamber 14 defines a hollow chamber interior having an open bottom end. When the vacuum chamber 14 is lowered onto its respective platen 12, it forms an air-tight seal and thereby provides an air-tight, enclosed interior portion. As will be described in greater detail herein, the interior of each vacuum chamber 14 is in fluid communication with a vacuum system, such that the air within the vacuum chamber may be evacuated out of the chamber when the chamber is mated with its corresponding platen 12.

Referring now to FIG. 3A, which illustrates a top view of a portion of the apparatus 10, the platens 12 are operably secured to a common carousel 16 rotating about a single, vertical axis of rotation 18. In various embodiments, the carousel 16 may comprise a body portion having one or more carousel extension arms 16a corresponding to each of the plurality of platens 12 and extending radially outward from the body. However, in various embodiments, the carousel 16 may not define the one or more carousel extension arms 16a in various embodiments, in which embodiments the platens 12 may be secured to the body portion of the carousel 16. The corresponding vacuum chambers 14 (as shown in FIG. 1) are likewise operably secured to the carousel 16 (as explained in further detail herein) such that the platens 12 and vacuum chambers 14 rotate synchronously around a common axis of rotation 18 (e.g., clockwise around the axis of rotation or counter-clockwise around the axis of rotation). As utilized herein, rotating about the single, vertical axis of rotation 18 includes travelling 360 degrees around the axis of rotation 18. Rotation about the axis of rotation 18 may comprise an entirely angular (circular) path of travel about the axis of rotation 18, a partially angular (circular) path of travel about the axis of rotation 18, a partially linear path of travel about the axis of rotation 18, a series of a plurality of linear paths of travel about the axis of rotation 18, and/or the like. While the carousel 16 rotates around the axis of rotation 18, each corresponding set of platens 12 and vacuum chambers 14 remain aligned along a common radius extending away from the common axis of rotation 18. Thus, as will be described in greater detail herein, as the carousel 16 rotates, the vacuum chambers 14 may be lowered onto the corresponding platens 12 to form an at least substantially air-tight enclosure.

FIG. 4 illustrates a side view of the platen travel path. As can be appreciated form FIG. 4, the carousel 16 and platens 12 are oriented generally horizontally such that the platens' travel path occurs at least substantially within a single horizontal plane 12*p*. In addition, as indicated in FIG. 4, the horizontal plane 12*p* in which the platens' travel path lies is positioned at a height below a lower (downstream) end of an infeed system 20 (the position of which is indicated as 22*p* in FIG. 4).

According to various embodiments, the platens' travel path 12*t* (shown in FIGS. 3A and 3B) includes one or more linear travel segments L1, L2 as the platens 12 rotate around the axis of rotation 18. The one or more linear travel segments L1, L2 facilitate loading and/or unloading of packages onto the platens 12. In the illustrated embodiment of FIGS. 3A and 3B, the travel path of the platens—as viewed from above the apparatus 10—is indicated by the dashed line 12*t*. For clarity, the travel path 12*t* is also shown together with a cam track (described in detail herein) in FIG. 3B. As can be seen from FIGS. 3A and 3B, platens' travel path while rotating about the axis of rotation 18 includes two or more linear travel portions L1, L2 having a transition point therebetween. As explained herein, having two or more linear travel portions L1, L2 facilitates unloading of the platens 12 during a second linear travel portion L2 and reloading the platens 12 during a first linear travel portion L1.

With reference to FIG. 3A, the platens 12 may remain secured to the carousel 16 (e.g., to a corresponding carousel extension arm 16*a* extending radially outward from the axis of rotation 18) via a linear-motion mechanism (described herein) and/or other fasteners during the entire platen travel path. The one or more linear travel segments L1, L2 are enabled by a linear-motion mechanism operatively securing each of the platens 12 to the carousel 16 (e.g., at a corresponding carousel extension arm 16*a*). FIGS. 5A-5E provide a detailed illustration of a linear-motion mechanism 40. In the illustrated embodiments of FIGS. 2-5E, the linear motion mechanism 40 is embodied as a passive mechanical linkage assembly configured to permit each platen 12 to extend away from the carousel 16 radially outward from the axis of rotation 18 through a center point of the corresponding platen 12. The linkage assembly shown in FIGS. 5A-5E is configured to permit the platens 12 to move away from the axis of rotation 18, and to rotate such that the platen 12 may remain aligned with the linear direction of travel as it moves along a linear portion of travel. In the illustrated embodiments of FIGS. 5A-5E, the linkage assembly is secured to the carousel 16 via one or more fasteners (e.g., pins) permitting rotation of the linkage assembly relative to the carousel. The linkage assembly is additionally secured to the corresponding platen 12 via one or more fasteners (e.g., pins, bolts, screws, and/or the like). Accordingly, in the illustrated embodiments of FIGS. 5A-5E, each platen 12 is operably secured to the carousel 16 via the linear motion mechanism.

Figure 5A:
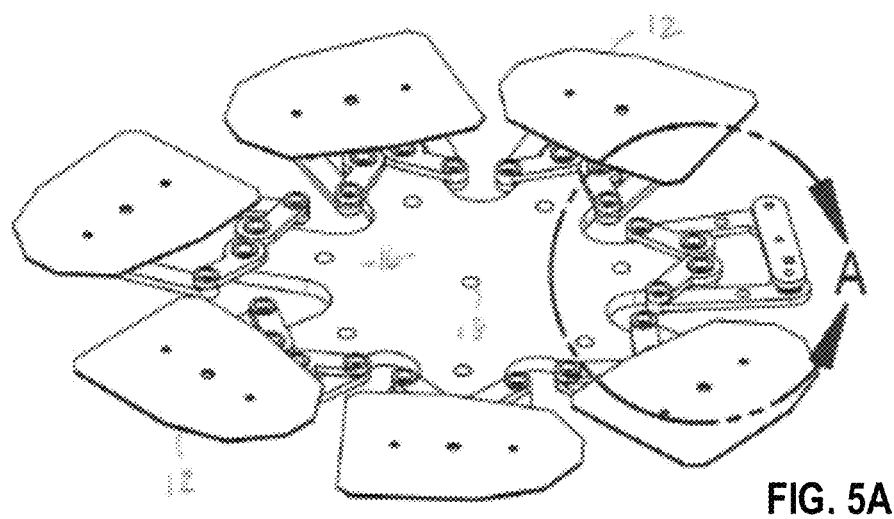
FIG. 5A illustrates a portion of an apparatus, including mechanism enabling a linear portion of a platen travel path according to one embodiment.
Figure 5B:
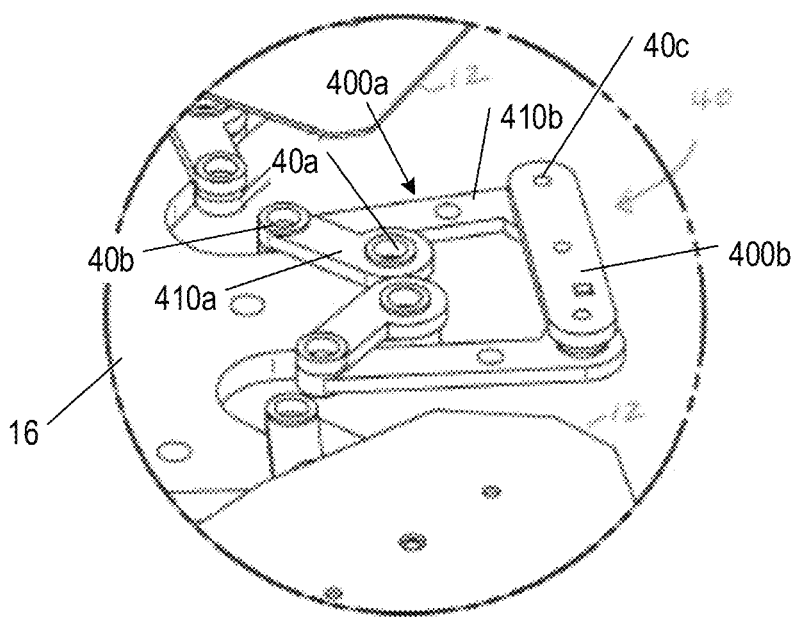
FIG. 5B is a close up view of a mechanism enabling a linear portion of a platen travel path according to one embodiment.
Figure 5C:
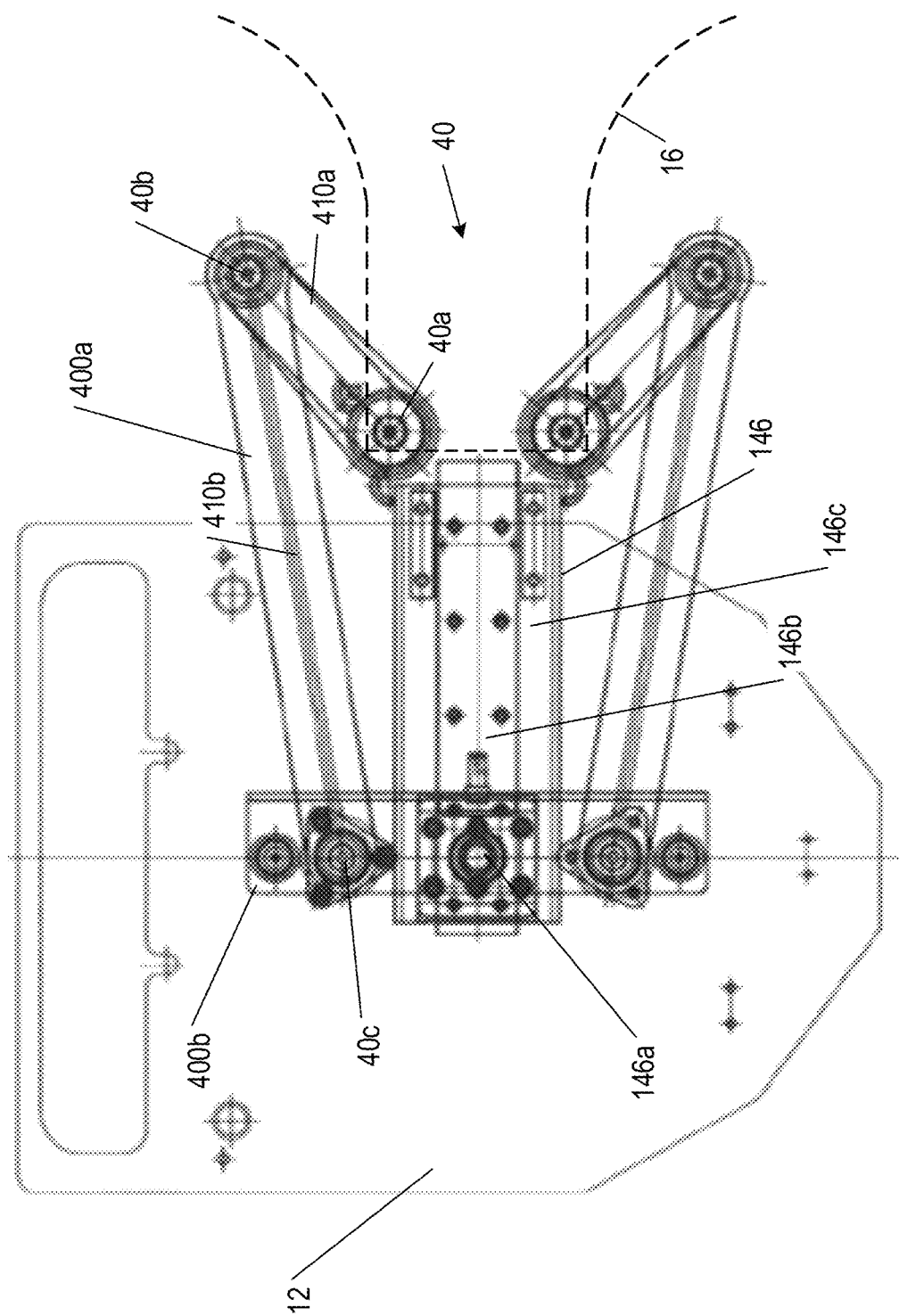
FIG. 5C is a bottom view of a platen and the mechanism enabling a linear portion of platen travel path according to one embodiment.
Figure 5D:
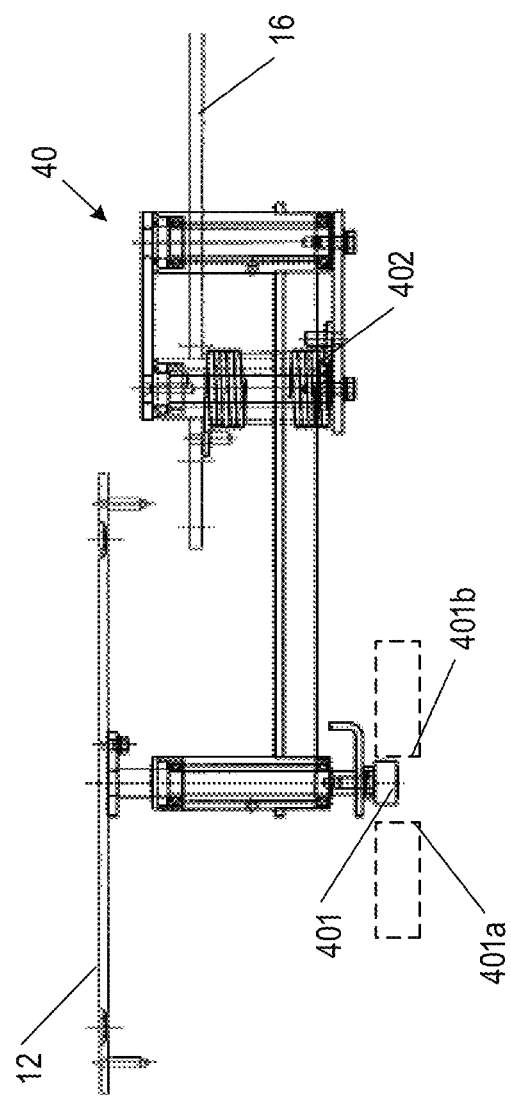
FIG. 5D is a side view of a platen and the mechanism enabling a linear portion of a platen travel path according to one embodiment.

FIG. 5D illustrates a side view of a platen 12 and linear-motion mechanism 40 according to various embodiments. As shown in FIG. 5D, each platen 12 includes at least one corresponding cam follower 401 secured to a bottom portion of the platen 12. In the illustrated embodiment of FIG. 5D, the cam follower 401 comprises a horizontal wheel configured to rotate about a vertical axis of rotation while riding within a cam track as the corresponding platen 12 moves along the platen travel path. As shown in FIG. 3B, the cam track extends around the axis of rotation 18 and has an outer surface 401*a* and an inner surface 401*b*, in which the cam follower 401 is configured to reside. In various embodiments, the platens 12 and/or the linear motion mechanism 40 may additionally comprise a biasing mechanism 402 (e.g., a tension or compression spring) configured to bias the cam followers 401 against one of the cam surfaces (e.g., inner cam surface 401*b*). By biasing the cam followers 401 against the cam surface 401*b*, unwanted rattling of the cam follower 401 against the cam surfaces 401*a*, 401*b* may be prevented.

As shown in FIG. 5B, the linear motion mechanism 40 comprises two central axes 40*a* at which a pair of extension arms 400*a* are operably secured to the carousel 16. As shown in FIG. 5B, each extension arm 400*a* comprises a first extension rod 410*a* and a second extension rod 410*b*. A first end of the first extension rod 410*a* is pivotably secured to the carousel 16 at the central axis 40*a*, and a second end of the first extension rod 410*a* is pivotably secured to the second extension rod 410*b* at an axis 40*b*. The end of each second extension rod 410*b* is pivotably secured to crossbar 400*b* at an axis 40*c*. With reference to FIG. 5A, a corresponding platen 12 is secured to the crossbar 400*b* (e.g., via one or more fasteners, such as bolts, screws, adhesive, and/or the like). In various embodiments, the platen 12 is secured to the crossbar 400*b* such that the platen 12 cannot rotate relative to the crossbar 400*b*. For example, the platen 12 may be secured to the crossbar at two points, and/or may be secured such that a non-round pin engages a corresponding hole of the crossbar 400*b*. Accordingly, the length of the first extension rod 410*a* and the second extension rod 410*b* defines a maximum distance away from the carousel 16 that the platen 12 may move while remaining operably secured to the carousel 16 via the linear motion mechanism. As discussed reference to FIG. 5D, a cam follower 401 is secured below the extension arms 400*a* concentric with one or more axis 40*c*.

As the platen 12 follows the platen travel path (e.g., illustrated as line 12*t*) and transitions from an angular portion of the platen travel path to a linear portion of the platen travel path, each extension arm 400*a* rotates relative to the carousel about its respective axis 40*a* such that the extension arms 400*a* extend outward. As the extension arms 400*a* extend outward, the second extension rods 410*b* rotate about their respective axis 40*b* relative to the first extension rods 410*a* such that the extension arms 400*a* extend away from the carousel 16. As the carousel rotates 16 and the platen 12 travels along a linear portion of the platen travel path, the second extension rods 410*b* rotate about axis 40*c* relative to the cross bar 400*b* such that the platen 12 maintains the linear orientation relative to the platen travel path. As the platen 12 travels along a linear portion of the travel path, axes 40*c* move closer and farther away from the platen travel path (due to the rotation of the carousel 16), and accordingly the extension arms operate to maintain the linear orientation of the platen 12 while the carousel 16 continues rotating about the axis of rotation 18. Moreover, as shown at least in FIG. 3A, the two extension arms 400*a* corresponding to each platen 12 need not extend at the same distance. Indeed, as the platens 12 traverse a linear travel path (e.g., L1 or L2) corresponding to an angular distance of rotation of the carousel 16, the extension arms 400*a* corresponding to the platen 12 move independently of one another in order to maintain the linear orientation of the platen 12 as it traverses the linear travel path portion. For example, with reference to FIG. 3A in which the platens 12 are travelling counter-clockwise around the axis of rotation 18, immediately after the platen 12 entering a linear travel portion of the platen travel path, the extension arm 400a proximate the rear of the platen 12 is extended a greater distance than the extension arm 400a proximate the front of the platen 12. As the platen 12 travels along the linear portion of the platen travel path 12t, the platen 12 passes a point at which the platen 12 is tangent to a circle having a center-point concentric with the axis of rotation 18. After passing the point at which the platen 12 is tangent to a circle having a center-point concentric with the axis of rotation 18 and while the platen 12 continues to travel along the linear travel path, the extension arm 400a proximate the front portion of the platen 12 is extended a greater distance than the extension arm 400b proximate the rear portion of the platen 12.

FIG. 5C shows another embodiment of the linear motion mechanism 40, having two central axes 40a at which the extension arms 400a are secured relative to the carousel 16. In the illustrated embodiment of FIG. 5C, the linear motion mechanism 40 additionally comprises a sliding mechanism 146 positioned between extension arms 400a and pivotably secured between the crossbar 400b and the carousel 16. The sliding mechanism 146 comprises a slide body 146b and a base plate 146c. The crossbar 400b is pivotably secured to the slide body 146b, at axis 146a. The slide body 146b is slidably secured relative to the base plate 146c. The base plate 146c is pivotably secured relative to the carousel 16. Accordingly, as the extension arms 400a extend (e.g., during a linear portion of the platen travel path), the sliding mechanism 146 likewise extends to provide additional support for the platen 12 as it travels along a linear portion of the platen travel path. Moreover, when the extension arms 400a are extended at different distances relative to one another, the sliding mechanism 146 is configured to pivot relative to the crossbar 400b and carousel 16.

Figure 5E:
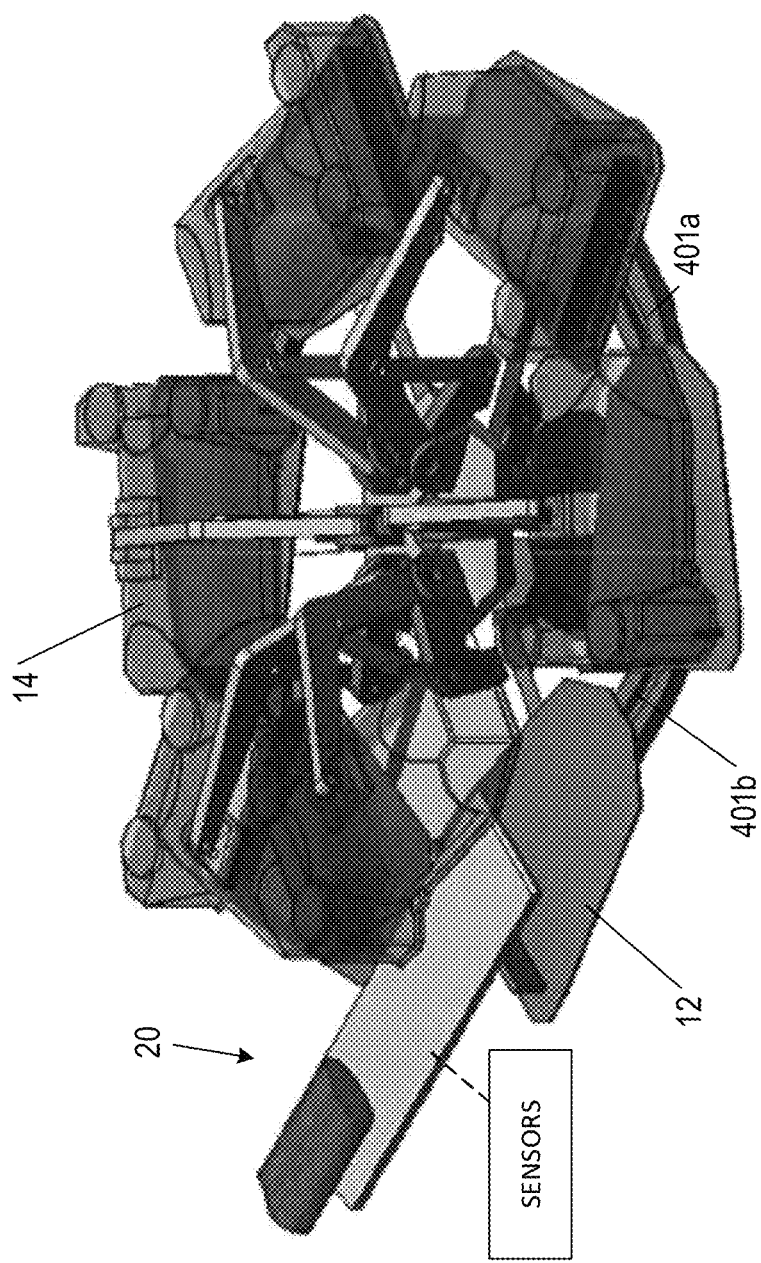
FIG. 5E illustrates a portion of an apparatus for vacuumizing and heat sealing packages according to one embodiment.

In various embodiments, the cam track defined between the cam surfaces 401a, 401b corresponds to and defines the travel path of each of the plurality of platens 12. FIG. 5E shows the location of the cam track relative to the platen travel path according to one embodiment. As shown in FIG. 5E, the cam track is positioned below the platen travel path and follows the platen travel path to guide the platens 12 as they traverse the platen travel path. As the carousel 16 rotates about the axis of rotation 18, thereby rotating the plurality of platens 12 around the axis of rotation 18, the cam follower 401 corresponding to each platen 12 (operably secured below one or more of the axes 40c) engages the cam surfaces 401a, 401b. The cam surfaces 401a, 401b comprise linear surface portions defining linear portions of the cam track corresponding to the linear portions of travel for the platens 12, and curved surface portions defining curved portions of the cam track corresponding to the rotational portions of travel for the platens 12. As the cam follower 401 travels along the curved portions of the cam track, the linear motion mechanism 40 remains inactive, and the platen 12 remains a predefined distance away from the axis of rotation 18. As the cam follower 401 transitions to and follows a linear portion of the cam track, at least a portion of the linear motion mechanism 40 extends or retracts to maintain a linear path of travel for the platen 12. The mechanical linkage corresponding to a platen 12 extends while the corresponding cam follower 401 travels along a linear portion of the cam track such that the platen 12 maintains a linear travel direction.

Referring again to FIGS. 3A and 3B, the platens 12 may have two or more linear travel portions L1, L2 having a transition point therebetween. Having two or more linear travel portions may thus facilitate both unloading of the platens 12 during a second linear travel portion L2 and reloading the platens 12 during a first linear travel portion L1. In various embodiments, the linear portions of platen 12 travel occur while the corresponding vacuum chambers 14 are lifted away from the platens 12 (e.g., during loading and unloading operations). After packages are loaded onto the platens 12, the platens 12 may return to a rotational travel path, during which time the vacuum chambers 14 are lowered onto corresponding platens 12, and vacuumization and sealing operations described herein are completed.

The length of each segment of platen 12 travel (i.e., each linear travel segment and the rotational travel segment) may be described in reference to the angular distance traveled around the axis of rotation 18. For example, in the illustrated embodiment of FIG. 3B, the platens 12 travel along the first linear travel segment L1 during a loading operation for between about 30-50 degrees (e.g., for about 47.5 degrees) while the carousel 16 rotates the platens 12 around the axis of rotation 18, then follows a rotational travel path for between about 260-300 degrees (e.g., about 265 degrees) (during which time the packages loaded onto the platens 12 are vacuumized and sealed), then follows the second linear travel segment L2 during an unloading operation for between about 30-50 degrees (e.g., about 47.5 degrees). However, various lengths of linear travel path are possible, corresponding to any of a variety of angular distances around the axis of rotation 18. In various embodiments, the linear portion of the platen travel path during which packages are loading onto the platens is sufficiently long that the packages may be moved entirely onto the top surface of the platen during the linear portion of the platen travel path. Similarly, the linear portion of the platen travel path corresponding to the unloading portion of the platen travel path is sufficiently long to enable the package to be removed from the top surface of the corresponding platen during the linear portion of the travel path.

Although described and illustrated as being utilized in association with an apparatus 10 in which the platens 12 rotate about a single axis of rotation 18. Various features, components, and/or systems described herein may be operable with an apparatus in which the platens 12 move between and/or around a plurality of axes of rotation. For example, various features, components, and/or systems may be operable with an apparatus in which the platens 12 are secured to a chain drive mechanism configured to convey the plurality of platens 12 around two or more axes of rotation, and in which a vacuum chamber 14 is configured to engage the platen 12 during a portion of a travel path around one of the two or more axes of rotation. In such embodiments, the number of platens 12 may not be equal to (e.g., may be greater than) the number of vacuum chambers 14, such that the platens 12 may not each corresponding to a particular vacuum chamber 14.

Infeed System

Packages enter the apparatus 10 via an automated loading assembly 20 and an infeed conveyor. As shown in FIGS. 1-4, the loading assembly 20 comprises one or more infeed conveyors 22a-22c configured to convey packages in a generally linear direction toward and onto platens 12. Packages are sequentially loaded onto platens 12 while the platens 12 are travelling in a linear direction (e.g., along a linear travel path portion L1), and the platens 12 are circulated around the axis of rotation 18. Loading the packages onto the platens 12 while the platens 12 are moving in a linear direction facilitates proper placement of the packages on the platens 12. As will be described in greater detail herein, the packages may be loaded onto the platens 12 such that a determined select heat seal location extending transversely across the package is aligned with a heat seal mechanism 34 oriented transverse to the direction of travel of each platen 12. Accordingly, by loading the packages from an infeed conveyor 22 having a linear movement onto a platen 12 having a linear movement substantially parallel to the path of travel of the infeed conveyor 22a-22c, the orientation of the package relative to the travel direction remains substantially unchanged during the loading process. Thus, the determined select heat seal location extending transversely across the package maintains its orientation relative to the heat seal mechanism 34 of the platen.

It has been found that incorporating one or more linear travel segments into a generally angular platen travel path enables automatic loading of the packages onto the platens 12 while maintaining a desired package orientation during the loading process. The generally angular travel path of the platens 12 may have a small overall radius in order to minimize the overall footprint of the apparatus 10, while the linear travel path portions facilitate automatic loading of the packages onto the platens 12 without substantially increasing the overall footprint of the apparatus 10 and without decreasing the rate of packaging of the apparatus 10.

Particularly when loading elongated packages onto the platens 12, frictional forces between the package and the infeed conveyor 22, and between the package and an upper surface of the platen 12 may result in the package being loaded onto a platen 12 in an orientation at least substantially parallel to the orientation of the one or more infeed conveyors 22a-22c, regardless of the direction of travel of the platen 12. Thus, for comparison, a package loaded from a linear infeed conveyor onto a platen 12 traveling along a rotational path may be skewed relative to the orientation of the platen 12. The effect of loading a package from a linear infeed conveyor onto a platen 12 following a rotational path may be minimized by making the radius of the rotational path sufficiently large (thereby minimizing the angular displacement of the platen 12 while the package is being loaded onto the platen 12 from the infeed conveyor 22). However, the package may remain at least slightly skewed as a result of the transfer between the linear infeed conveyor and a platen 12 traveling along a rotational path. Moreover, increasing the radius of the platen travel path increases the overall footprint of the apparatus 10 to accommodate the larger travel path of the platens 12.

As will be described in greater detail herein, the infeed system 20 may comprise one or more sensor systems configured to identify a select heat seal location for a package before the package is loaded onto a corresponding platen 12. In such embodiments, the infeed system 20 is configured to track the location of the select heat seal location as the package is conveyed along the one or more infeed conveyors 22a-22c toward the platens 12 such that the package may be conveyed off of a downstream end of the infeed conveyors 22a-22c and onto a corresponding platen 12 such that the select heat seal location of the package is aligned with the heat seal mechanism 34 on the platen 12 after the package is loaded thereon.

Figure 6:
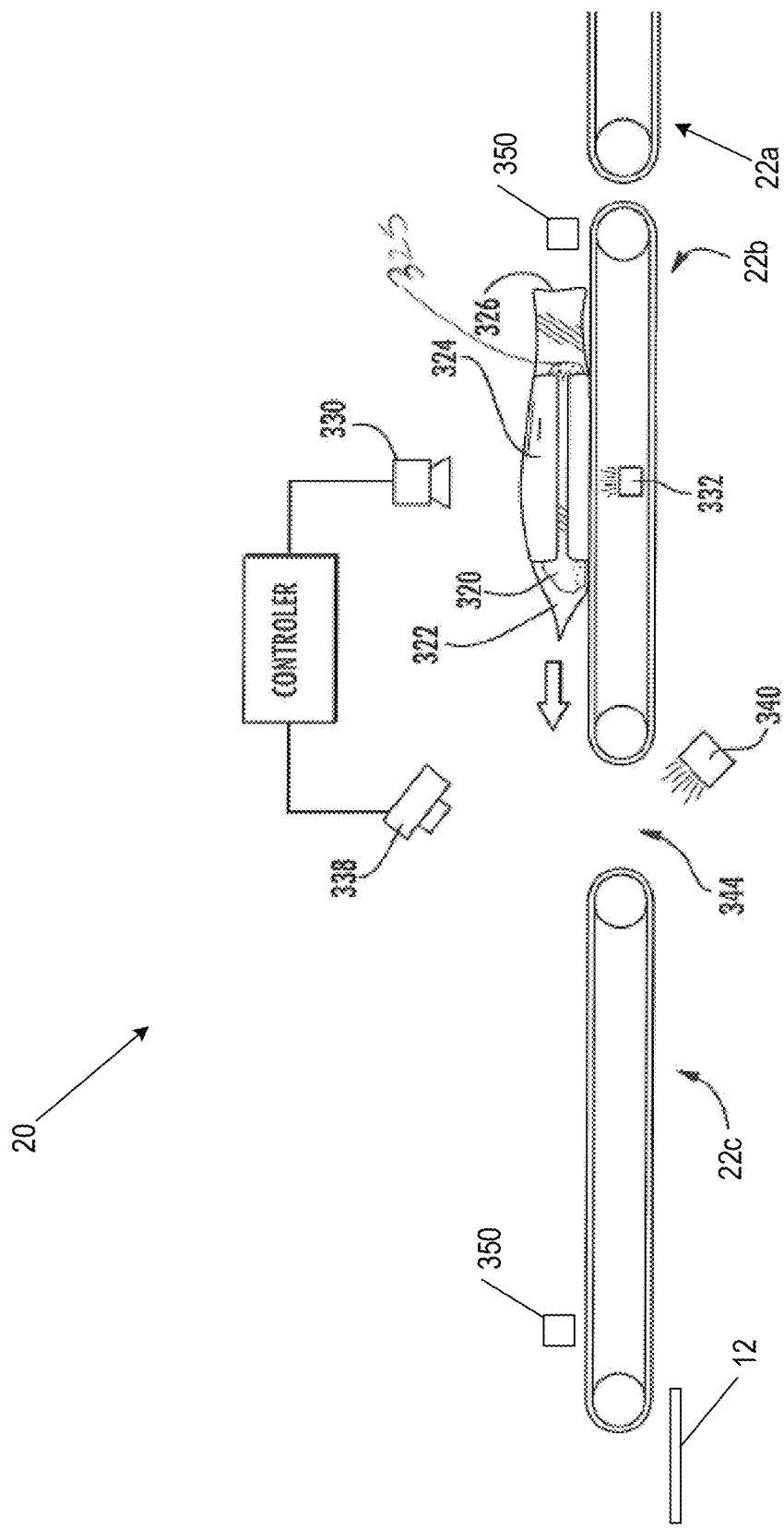
FIG. 6 is a side view of an infeed system according to one embodiment.

FIG. 6 illustrates one example of an infeed system 20 that may be used with the apparatus 10. As shown in FIG. 6, the infeed system 20 comprises a plurality of conveying mechanism segments (e.g., conveyor belts) 22a, 22b, 22c collectively forming the infeed conveyor which may each be independently operable to move packages onto or off of the infeed conveyor 22. The independently operable conveying mechanisms may facilitate indexing of the packages that may be provided to the infeed system 20 in unequal increments, such that each of the provided packages are loaded onto corresponding individual platens 12 such that their respective select heat seal locations align with corresponding heat seal mechanism 34 of the corresponding platen 12. As an initial example that will be expanded upon herein, a first package 322 may be provided to a receiving conveyor 22a of the infeed system 20 via a source conveyor (not shown). The receiving conveyor 22a may thereafter transfer the package 322 to a measurement conveyor 22b to measure the relative length of the package 322 and/or a package 320 positioned therein, and to determine a select seal location for applying a heat seal to the package 322. The measurement conveyor 22b may thereafter transfer the first package 322 to a loading conveyor 22c, which is configured to move the first package 322 to a preloading position proximate an exit end of the infeed conveyor to prepare for loading the package 322 onto a corresponding platen 12. Depending on the relative position of the first package relative to the platen 12 onto which the first package is to be loaded, the infeed conveyor may keep the first package 322 stationary at the preloading position until a corresponding platen 12 is properly aligned to receive the first package 322. Simultaneously, an entry end of the infeed conveyor may receive a second package and move the second package to a position proximate and upstream from the first package 322. Once the first package 322 is loaded onto a corresponding platen 12, the second package may be moved into the preloading position to await a second platen 12 to arrive at the proper loading position.

In the illustrated embodiment of FIG. 6, the infeed system 20 comprises a plurality of sensing devices configured to identify various aspects of a package 322 prior to loading onto a corresponding platen 12. Certain of these sensing devices function similarly to those detecting devices described in U.S. Provisional Patent Application No. 62/147,317 to McDonald et al., incorporated herein in its entirety by reference. As noted above, the package may comprise a plastic bag containing a product (e.g., a food product, such as a meat product), and accordingly the plurality of sensing devices may be configured to identify the location of the product in the package to ensure that the heat seal location for the package does not overlap the product (thereby ensuring a strong heat seal may be formed in the plastic bag). Moreover, the plastic bag may include one or more thick portions of plastic (e.g., reinforcing bag patches) that may impede effective sealing of the package. Accordingly, the sensors may identify the location of these reinforcing bag patches to ensure the heat seal location does not overlap any of these reinforcing bag patches in order to facilitate forming a strong heat seal in the plastic bag.

FIG. 6 illustrates various components of the sensing devices according to various embodiments that are configured to detect various characteristics of a package 322. In the illustrated embodiment of FIG. 6, the first package 322 may be a plastic bag containing a product 320 (e.g., an edible product). The first package 322 may have an open trailing edge 326 positioned at an upstream end of the first package 322. Moreover, the package 322 may have one or more package patches 324 configured to provide additional puncture resistance to the package bag. When positioned within the first package 322, the product 320 has a trailing edge 325 at the most upstream point of the product 320. As will be described in greater detail herein, the various sensing devices may be configured to locate the product trailing edge 325 and the location of the package patches 324 in order to identify a select heat seal location upstream of both the product trailing edge 325 and the package patches 324.

As shown in FIG. 6, the infeed system 20 comprises a gate sensor 350 configured to detect the presence or absence of a product between an emission portion and a detector portion. In various embodiments, the emission portion and the detector portion may be positioned on opposite sides of the infeed conveyor 22, such that a package 322 travelling along the infeed conveyor 22 is detected by the gate sensor 350. For example, when no package is positioned between the emission portion and the detector portion, the detector portion detects a light (e.g., visible light, infrared light, and/or the like) emitted by the emitter portion. If a package (e.g., first package 322) is positioned between the emission portion and the detector portion, the detector portion does not detect the light emitted by the emission portion, thus indicating a package is positioned therebetween. In various embodiments, the gate sensor 350 may be configured to detect a downstream end and/or an upstream end of a package (or product 320 positioned within the package) by maintaining continuous and/or discrete measurements to detect the presence of a package therebetween. In various embodiments, the gate sensor 350 may provide data indicative of the presence or absence of a product 320 therebetween to a computer controller system, which additionally receives data regarding the speed of the infeed conveyor (e.g., the speed of the measurement conveyor 22b). With the data regarding the speed of the conveyor, and the data regarding the presence or absence of a product 320 at the gate sensor, along with measurement time data (e.g., indicative of the amount of time a product is positioned at the gate sensor), the computer controller system may be configured to determine the overall length of the product 320 positioned within the package.

In various embodiments, the overall length of the product 320 may be sufficient information for the computer controller system to determine the appropriate positioning of the package on a corresponding platen 12 such that a heat seal is formed at a select heat seal location on the package (e.g., first package 322). For example, when heat sealing cheeses, processed meats (e.g., sausages) or other regularly shaped products, having generally continuous and/or predictable edge profiles (e.g., products having a substantially rectangular side-profile, a substantially hemispherical side profile, and/or the like such that the longest portion of the products occur at some predictable height above the surface of a conveyor), the overall length of the product 320, as determined by the gate sensor 350, may be sufficient to determine the appropriate positioning of the package (e.g., first package 322) on a corresponding platen 12. In various embodiments, the infeed system 20 may comprise a plurality of gate sensors 350 configured to detect the presence of packages and/or products at various positions along the infeed conveyor to facilitate indexing of the packages provided to the infeed system 20. For example, the infeed system 20 may comprise a first gate sensor 350 positioned proximate the entrance (upstream) end of the infeed conveyor 22 to detect packages being provided to the infeed system 20. The infeed system 20 may additionally comprise a second gate sensor 350 configured to measure the length of a package 322 and/or product 320. The infeed system 20 may additionally comprise a loading gate sensor positioned proximate a loading (downstream) end of the infeed conveyor 22 to detect when a package 322 is positioned in a preloading position and/or when a package 322 has been fully loaded onto a corresponding platen 12 such that the package is no longer on the infeed conveyor 22.

As shown in FIG. 6, the infeed conveyor may additionally include one or more infrared detectors and/or one or more florescence detectors to detect various components of a package 322. Such detectors may provide data indicative of the overall length of a package 322 containing an irregularly shaped product 320 (e.g., a cut of fresh meat, a cut of poultry, and/or the like), and/or may provide additional data useful for determining a select sealing location for providing a heat seal on the package 322.

As shown in FIG. 6, the infeed system 20 may comprise an infrared detection system comprising a radiation source 332 and an infrared detection camera 330. In the illustrated embodiment of FIG. 6, the infrared source 332 is embodied as an LED array comprising one or more infrared LEDs positioned below a top surface of infeed conveyor (e.g., below a top surface of the measurement conveyor 22b). The infrared source 332 is configured to emit infrared radiation through the top surface of the infeed conveyor 22b within an interrogating view of the infrared detector camera 330 positioned above the upper surface of the infeed conveyor 22, such that packages 322 may pass below the infrared detector camera 330 and between the infrared detector camera 330 and the infrared source 332. Accordingly, the conveying mechanism embodying the infeed conveyor may comprise a material transparent to infrared radiation. For example, the infeed conveyor may comprise a conveyor belt (e.g., an Intralox Series 100, friction top flush gridlink belt, provided by Intralox, LLC, a VOLTA™ FELW-2.0 belt provided by Ammeraal Beltech).

As an example, the LEDILA435AP6-XQ™ or LEDIA0X80W™ LED arrays from Banner Engineering Corp., may be used as the LED array embodying the infrared source 332. A P40RS camera, from Banner Engineering Corp., or a PRESENCEPLUS™ P4AR infrared camera, a FLT1™ infrared filter, and a LCF04™ P4AR lens, each from Banner Engineering Corp., may collectively be used as the infrared detecting camera 330.

In use, the infrared detection system may determine the location, size, and/or length of the product 320 positioned within the package (e.g., first package 322). The infrared radiation may pass through the package bag, such that the package bag does not interfere with the identification of various characteristics of the product 320 positioned within the package 322. Accordingly, the infrared detection system may identify one or more characteristics of the product 320 as the package containing the product 320 is moved along the infeed conveyor. The infrared detection system may identify such characteristics of the product 320 irrespective of the exact orientation of the package 322 on the infeed conveyor. Thus, the packages (e.g., first package 322) may be provided to the infeed system 20 using any of a variety of loading mechanisms (e.g., a source conveyor automatically providing the packages to the infeed conveyor, a human operator placing the packages on the infeed conveyor, and/or the like).

The infrared detection system may thus be configured to detect a product trailing edge 325 positioned within a package (e.g., first package 322) as the package passes between the radiation source 332 and the infrared detector camera 330 and through the interrogation view of the infrared detector camera 330. As a package containing a product 320 passes between the radiation source 332 and the infrared detector camera 330, portions of the interrogation view of the infrared detector camera 330 corresponding to the location of the product 320 are blocked. Data indicative of which portions of the interrogation view of the radiation detector camera 330 are blocked may be transmitted to a computer controller system configured to apply one or more algorithms to the data to identify various characteristics of the product 320. For example, the computer controller system may utilize data collected as the product 320 first enters the interrogation view of the infrared detector camera to identify a leading edge of the product 320 as the most-downstream portion of the product 320. As the product 320 continues to pass through the interrogation view of the infrared detector camera 330 and eventually exit the interrogation view, the computer controller system may utilize corresponding data to identify the product trailing edge 325 within the package 322. Additional characteristics of the product 320, including the overall length of the product 320 and the relative orientation of the product 320 on the infeed conveyor 22 may be determined by the computer controller system based on the data collected from the infrared sensor system. For example, the computer controller system may receive data regarding the speed of the infeed conveyor and/or the distance advanced by the infeed conveyor between the detection of the most downstream end of the product and the most upstream end of the product to determine the overall length of the product 320.

Moreover, as illustrated in FIG. 6, the infeed system 20 may additionally comprise a fluorescence detector system configured to identify the location of one or more package patches 324. In various embodiments, package patches 324 may comprise thick plastic portions within the material of the package bag configured to provide added support to the package bag to impede tearing or perforation of the package bag by sharp edges of a product 320 stored therein. For example, the package patches 324 may be positioned on the package bag such that edges of bones of fresh cut meat are aligned with the package patches 324 to prevent the bone from penetrating through the package bag. The configuration of the package patches 324 may impede heat sealing through the package patches 324 (e.g., due to the relative thickness of the patches), and accordingly, the fluorescence detection system facilitates locating the package patches 324 such that a select heat seal location may be identified for each individual package (e.g., first package 322). When used in combination with an infrared detection system (as described herein), a computer controller system may utilize data collected from both the infrared detection system and the fluorescence detection system in order to identify a select heat seal location for an individual package 322. For example, the computer controller system may identify the location of the package patches 324 as well as the location of the product trailing edge 325 positioned within the package 322 in order to ensure that the select heat seal location does not overlap a portion of the product 320 and/or one or more package patches 324.

The fluorescence sensing system comprises a fluorescence sensing camera 338 and a fluorescence radiation source 340. In the illustrated embodiment of FIG. 6, the fluorescence radiation source 340 comprises a second LED array comprising one or more LEDs configured to emit ultraviolet radiation to excite a package patch 324 such that the package patch 324 fluoresces and is thereby detectable by the fluorescence sensing camera 338. As an example, a GT1200*™ monochromatic CCD camera, sourced from Matrox Electronic Systems Ltd. may be used as a fluorescence detecting camera 338; and a LEDUV365LA580AG6-XQ™, sourced from Banner Engineering Corp., may be used as the second LED array embodying the fluorescence radiation source 340.

As illustrated in FIG. 6, the fluorescence radiation source 340 may be positioned below a surface of the infeed conveyor such that the ultraviolet radiation is directed upwards through packages (e.g., first package 322) being conveyed by the infeed conveyor 22. As illustrated in FIG. 6, the fluorescence radiation source 340 may be aligned with a gap 344 between conveying mechanisms (e.g., between the receiving conveyor 22*a* and the measurement conveyor 22*b* or between the measurement conveyor 22*b* and the loading conveyor 22*c*) such that the ultraviolet radiation is emitted upwards through the gap 344 between the conveying mechanisms.

As illustrated in FIG. 6, the corresponding fluorescence detector camera 338 is positioned above the infeed conveyor 22 such that package patches 324 excited by the ultraviolet radiation emitted by the fluorescence source 340 are detectable by the fluorescence detector camera 338. Accordingly, the fluorescence detector camera 338 is configured to identify one or more characteristics of a package patch 324, including the location of the package patch 324 relative to the package bag. In various embodiments, the fluorescence detector system is configured to detect the location of the trailing (upstream) end of the package patch 324 such that the computer controller system may identify a select heat seal location in the bag. Various embodiments the fluorescence detection system operate similarly to the fluorescence sensing apparatus describe in U.S. Provisional Application Ser. No. 62/147,317, incorporated herein in its entirety by reference.

Each of the conveyors (22*a*, 22*b*, 22*c*) and each of the sensing configurations are configured to facilitate indexing of the packages (e.g., first package 322) prior to placement on corresponding platens 12 such that the identified select heat seal location of the package 322 is positioned between the lower seal bar 48 and upper seal bar 50 (shown in FIG. 12) when a package is placed on the platen 12.

Figure 7A:
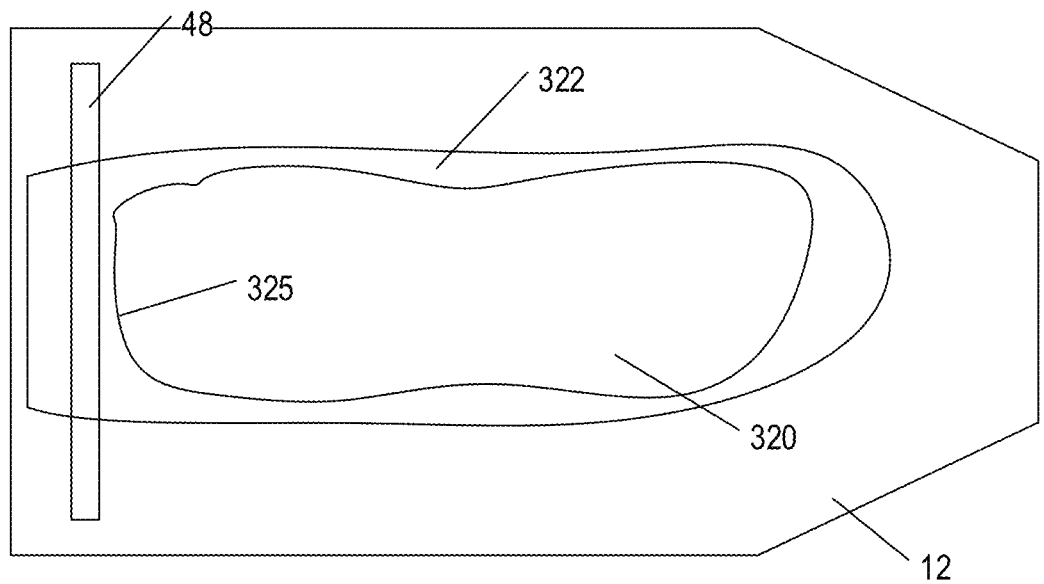
FIGS. 7A-7B show packages positioned on a platen according to various embodiments.
Figure 7B:
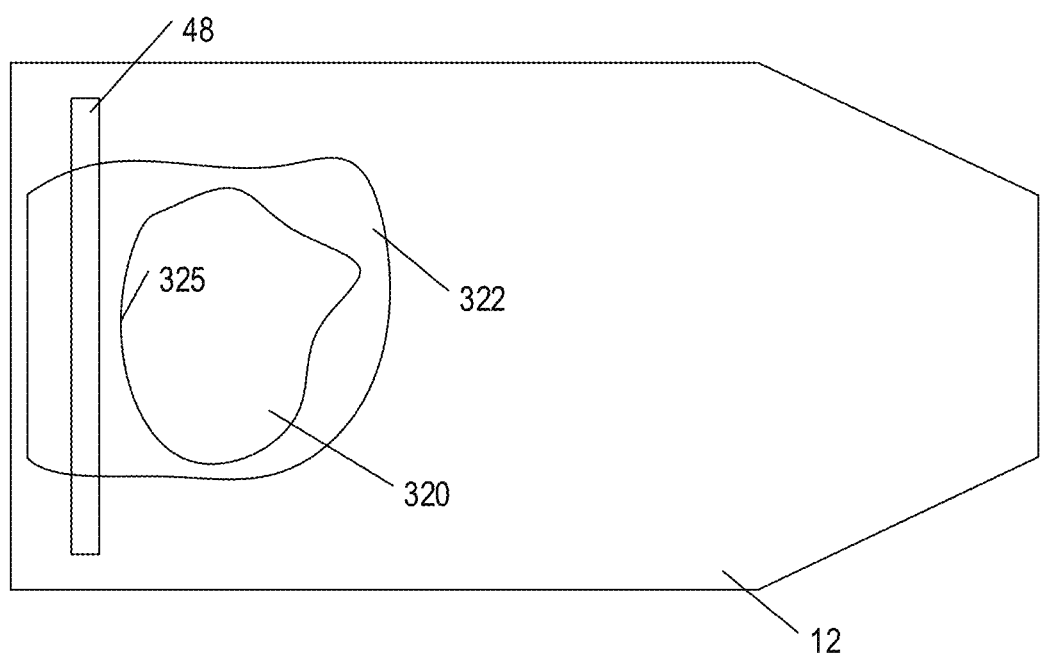

In various embodiments, the platens 12 continue to travel along the platen travel path 12*t* while each package (e.g., first package 322) is loaded onto a corresponding platen 12. Accordingly, the infeed system 20 is configured to appropriately time the loading of the package onto a corresponding platen 12 while the platen is travelling along a linear portion L1 of the platen travel path 12*t* such that the package is positioned on the platen 12 such that the identified (and tracked) select seal location is aligned with the heat seal mechanism 34 of the corresponding platen 12. FIGS. 7A-7B illustrate example placements of packages (e.g., first package 322) containing products 320 on platens 12 such that the select heat seal location for a package is aligned with a lower seal bar 48, such that the package 322 will be sealed along the identified select seal location. As shown in FIGS. 7A-7B, the package 322 may be positioned such that the select heat seal location (which is identified as being a predetermined distance away from the trailing edge of the product 325) is positioned over the lower seal bar 48. Accordingly, in various embodiments, the controller computer system is configured to determine the appropriate time to convey the package (e.g., first package 322) off of the downstream end of the infeed conveyors 22*a*-22*c* based at least in part on the determined (and tracked) location of the trailing edge of the product 325 and/or the trailing edge of the package patch 324 (as shown in FIG. 6), as well as a determined amount of time necessary to move the package such that the package is moved off of the downstream end of the infeed conveyors 22a-22c.

In various embodiments, each platen 12 is also configured to receive and secure a lift platform 13 as shown in FIG. 2. As shown in FIG. 2, the lift platform 13 is configured to rest on the top surface of the platen 12 and thereby provide a raised surface for supporting a package thereon. In effect, the lift platform raises the vertical position of a package placed on the platen 12 relative to the various components of the platen 12 and/or vacuum chamber 14. In particular, the lift platform 13 enables the vertical position of a package relative to the platen's sealing mechanisms 48, 50 to be adjusted to suit a particular package.

As an example, a plurality of interchangeable lift platforms 13—each having a different thickness (measured between a top surface of the lift platform 13 and a bottom surface of the lift platform 13)—may be configured to be secured to the upper surface of one of the platens 12. The particular lift platform 13 used in a given operational scenario may be selected based on the type of product to be vacuumized and heat sealed on the apparatus 10. In particular, the appropriate lift platform 13 may be selected such that the vertical center of the package (indicated as line c in FIG. 13C) may be substantially aligned with the sealing surfaces of the seal bars 48, 50 (described in greater detail herein) to provide an aesthetically pleasing seal location for the product. For example, for a block of cheese to be vacuumized and heat sealed on the apparatus, the lift platform 13 may be selected such that, when the block of cheese is placed on the lift platform 13, the centerline of the block of cheese (indicated as line c in FIG. 13C) is at least substantially aligned with the top surface of the lower seal bar 48 of the heat seal system 34 described herein such that the heat seal is positioned at least proximate to the center of the block of cheese.

In various embodiments, the lift platform 13 may be operable between various heights to accommodate products having different product heights, such as via a lift mechanism (e.g., a pneumatic lift mechanism, a hydraulic lift mechanism, a scissor lift mechanism, and/or the like). In such embodiments, the lift platform 13 may not be removably secured to the platen 12.

After passing the linear loading portion of the platen travel path during which packages are loaded onto corresponding platens 12, the platens 12 return to an angular (circular) portion of the platen travel path. During the angular portion of the platen travel path, a corresponding vacuum chamber 14 is mated with each platen 12 to create an air-tight enclosure around the package. Although not shown, each vacuum chamber 14 comprises a sealing element (e.g., a gasket) along a bottom edge of the vacuum chamber 14 to facilitate forming an air-tight seal between the platen 12 and the vacuum chamber 14. The package is thereafter vacuumized by evacuating the air out of the air-tight enclosure (and consequently out of the package), the package is sealed (e.g., via a heat seal mechanism), and the vacuumized, sealed package is then unloaded onto an outfeed conveyor 30 of an automated unloading assembly 26. In various embodiments, the unloading process is facilitated by a paddle assembly 28 configured to engage the package and push the package onto the outfeed conveyor 30. The processes for vacuumizing and sealing packages are described in greater detail herein.

Vacuum Chambers

As indicated above, each of the vacuum chambers 14 in the illustrated embodiments are configured to be selectively lowered onto the corresponding platens 12 while the platens 12 are travelling around the axis of rotation 18. Accordingly, as illustrated at least in FIG. 1, each vacuum chamber 14 is operably connected to the carousel 16 such that the vacuum chamber 14 may be moved between a raised position permitting unobstructed access to the top surface of the corresponding platen 12 (and a package supported on the platen), and a lowered position in which the vacuum chamber 14 is mated with the platen 12 to form an air-tight enclosure therebetween. In various embodiments, each vacuum chamber 14 remains in a raised position for about 85 degrees of the chamber travel path, and in a lowered position for about 220 degrees of the chamber travel path. In various embodiments, each vacuum chamber 14 moves between a raised position and a lowered position during about 25 degrees of the chamber travel path, and moves between a lowered position to a raised position during about 30 degrees of the chamber travel path.

Support Mechanism for the Vacuum Chambers

As shown in FIG. 1, each of the vacuum chambers 14 are operatively connected to the carousel 16 by a support mechanism configured to enable the vacuum chamber 14 to be selectively moved between the raised position and the lowered position. In various embodiments, the support mechanism is at least substantially parallel to a radius extending from the axis of rotation 18 through a center point of the corresponding platen 12, enabling the vacuum chamber 14 to be moved between the raised position and the lowered position while remaining aligned with the corresponding platen 12 relative to the axis of rotation 18.

Figure 8A:
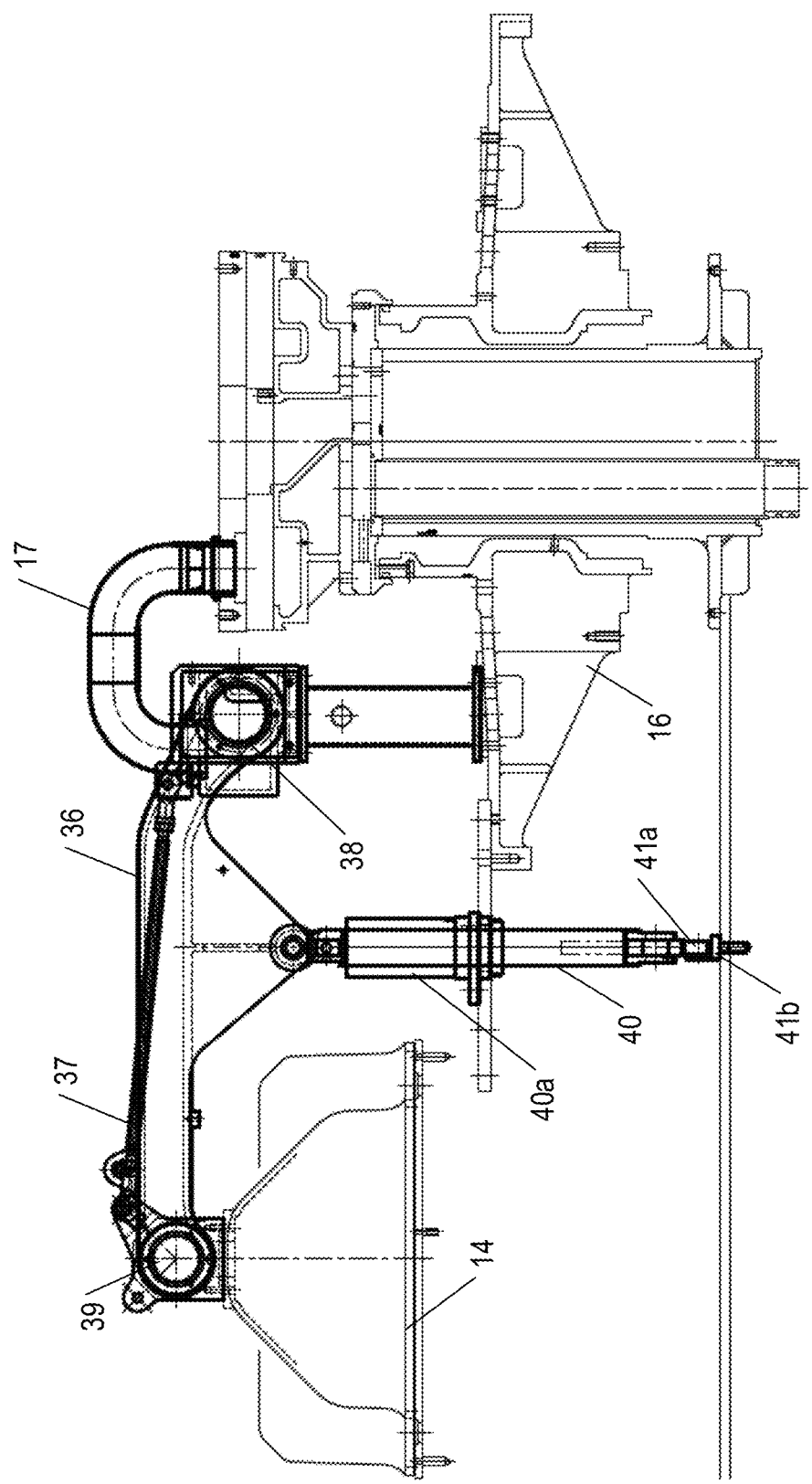
FIG. 8A is a side view of a vacuum chamber and corresponding support arm according to one embodiment.
Figure 8B:
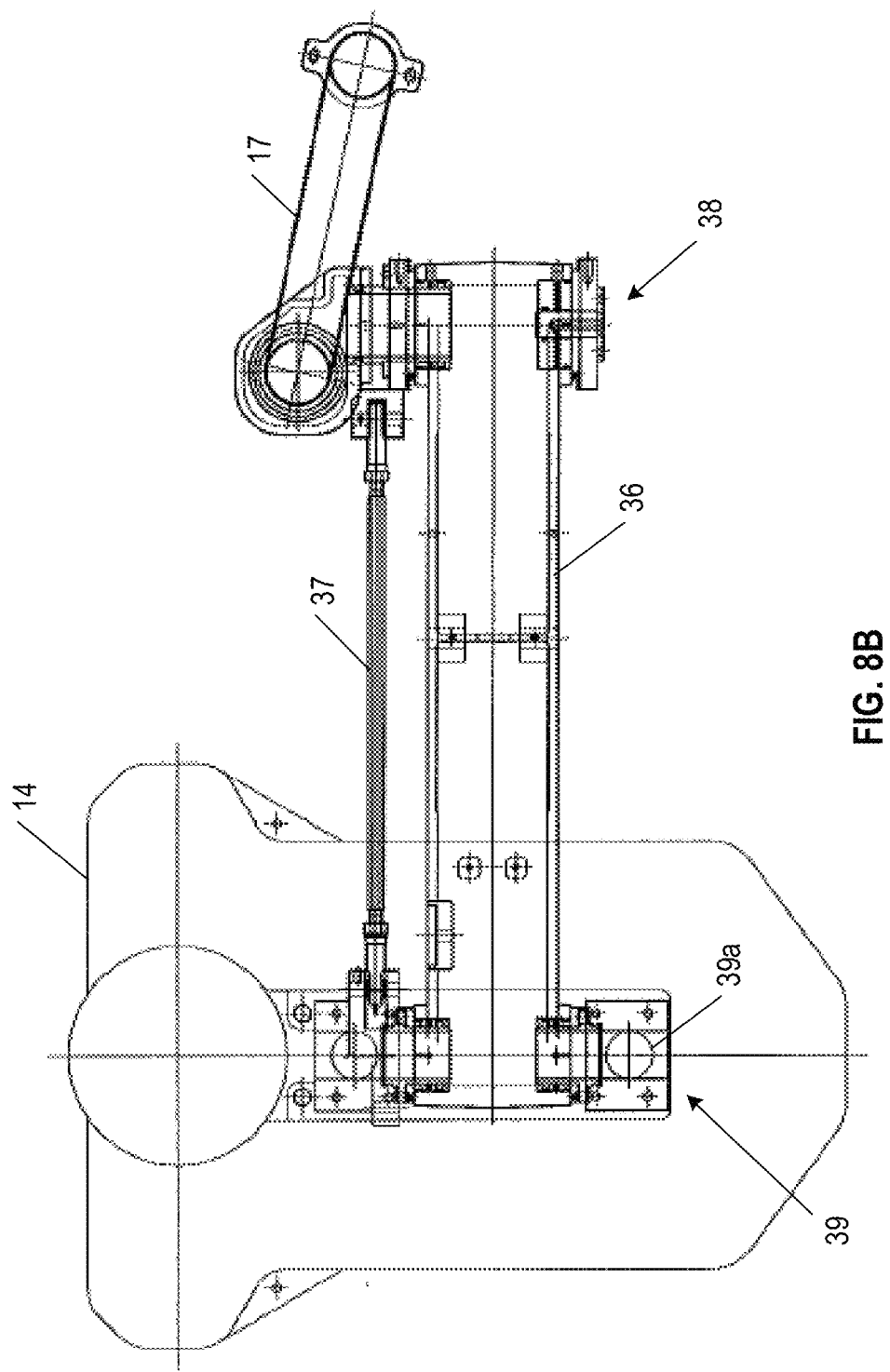
FIG. 8B is a top view of a vacuum chamber and corresponding support arm according to one embodiment.

FIGS. 8A-8B illustrate side and top views, respectively, of a vacuum chamber support mechanism according to various embodiments. In the illustrated embodiment of FIGS. 8A-8B, the support mechanism comprises a mechanical linkage, including a primary support arm 36 and a secondary support rod 37. As shown in FIG. 8A, the primary support arm 36 is rotatably secured to the carousel 16 at a first pivot point 38 enabling the support arm 36 to be rotated between positions supporting the vacuum chamber in the raised position and the lowered position. The primary support arm 36 is secured to the vacuum chamber 14 at a second pivot point 39 on an opposite end of the primary support arm 36 compared to the first pivot point 38. In various embodiments, the primary support arm 36 is configured to support the weight of the vacuum chamber 14. By securing the primary support arm 36 to the vacuum chamber 14 at a second pivot point 39, the vacuum chamber 14 may be permitted to rotate relative to the primary support arm 36 such that the bottom edge of the vacuum chamber 14 may remain at least substantially parallel to the top surface of the corresponding platen 12 while raising and lowering the vacuum chamber 14. The secondary support rod 37 is similarly pivotably secured to the carousel 16 and the vacuum chamber 14 at pivot points corresponding to the secondary support rod 37. The pivot points corresponding to the secondary support rod 37, which may be shorter than the primary support bar 36 may be different than the pivot points 38, 39 for the primary support bar 36, and may be positioned such that the vacuum chamber 14 rotates relative to the primary support bar 36 during raising and lowering such that the bottom edge of the vacuum chamber 14 remains parallel to the platen 12. Collectively, the primary support arm 36 and secondary support rod 37 form the linkage which is configured to maintain the orientation of the vacuum chamber 14 relative to the corresponding platen 12 such that the bottom edge of the vacuum chamber 14 remains at least substantially parallel to the top surface of the corresponding platen 12.

Figure 9:
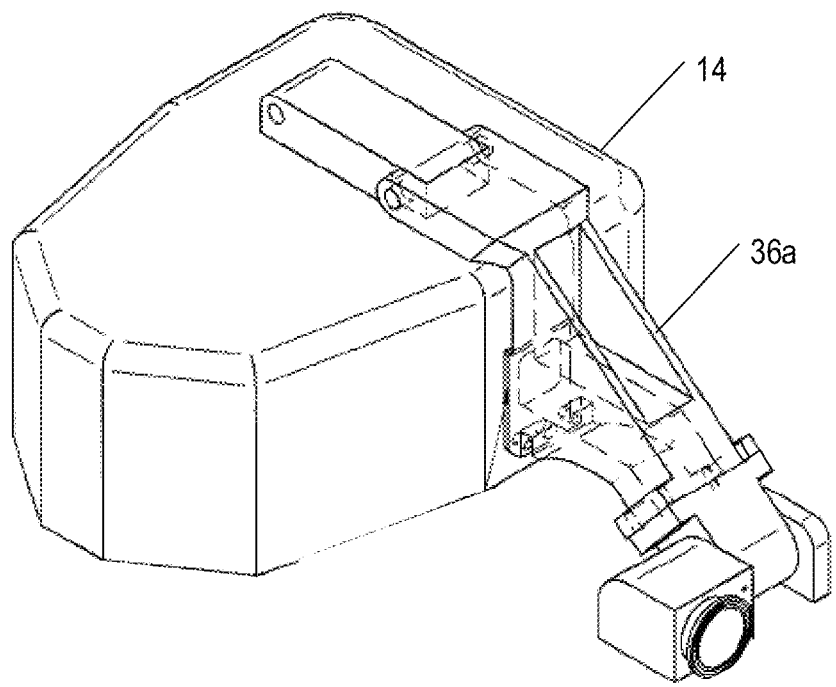
FIG. 9 is a perspective view of an alternative vacuum chamber and support arm according to one embodiment.

FIG. 9 illustrates an alternative support arm arrangement which does not include a secondary support rod. In such embodiments, the primary support arm 36a may be rigidly secured to the vacuum chamber 14 or may be pivotably secured to the vacuum chamber 14, similar to that described above. In such embodiments, the vacuum chamber 14 may pivot as it is moved between the lowered position in which the vacuum chamber 14 is mated with the corresponding platen 12 and the raised position. Accordingly, the orientation of the vacuum chamber 14 relative to the support arm 36a may remain substantially unchanged during raising and lowering of the vacuum chamber 14, and accordingly the bottom edge of the vacuum chamber 14 may not remain parallel with the corresponding platen 12.

Moreover, various embodiments may include one or more adjustment mechanisms (not shown) to adjust the orientation of the vacuum chamber 14 relative to the corresponding platen 12. Such adjustment mechanisms may permit the vacuum chamber orientation to be modified in order to provide an optimal air-tight seal with the corresponding platen 12. Accordingly, such adjustment mechanisms may permit adjustment of the vacuum chamber 14 to accommodate and/or rectify slight imperfections in the orientation of the platen 12 and/or the vacuum chamber 14. Similarly, each platen 12 may include one or more platen adjustment features configured to permit adjustments to the orientation of the platen 12 to facilitate forming an air-tight seal between the platen 12 and the corresponding vacuum chamber 14. For example, the vacuum chamber 14 and platen 12 may have a corresponding pin and pin-set configuration configured to facilitate proper alignment of the vacuum chamber 14 relative to the platen 12. For example, the vacuum chamber 14 may have one or more alignment pins extending downward away from a bottom edge of the vacuum chamber 14. The corresponding platen 12 may have corresponding pin-set holes configured to mate with the alignment pins of the vacuum chamber 14 when the vacuum chamber is lowered onto the platen 12 to guide the vacuum chamber 14 into proper alignment on the platen 12.

Moreover, in the illustrated embodiments of FIGS. 8A-8B and 9, the primary support arm 36, 36a is hollow, thereby permitting the chamber interior of the vacuum chamber 14 to be placed in fluid communication with a vacuum system controllable through the carousel 16 through the hollow primary support arm 36, 36a. In the illustrated embodiment of FIGS. 8A-8B, the first pivot point 38 and second pivot point 39 are likewise hollow. Where the primary support arm 36 is operably secured to the vacuum chamber 14 (e.g., at the second pivot point), the chamber interior is in fluid communication with the interior of the primary support arm 36 via one or more vacuum ports 39a extending through a surface of the vacuum chamber 14 in fluid communication with the interior of the second pivot point 39 and/or the primary support arm 36. In various embodiments, the interior of the primary support arm 36 is isolated from the surrounding environment, such that the primary support arm 36 functions as a vacuum conduit between the vacuum system operable within the carousel 16 and the interior of the vacuum chamber 14. In various embodiments, the interior of the vacuum chamber 14 is in communication with the vacuum system only via the vacuum conduit formed through the primary support arm 36, 36a. However, in various embodiments, the interior of the vacuum chamber 14 may be in communication with the vacuum system via a plurality of vacuum conduits, including the vacuum conduit through the primary support arm 36, 36a and/or one or more additional vacuum conduits (e.g., flexible and/or rigid vacuum tubing).

Figure 10:
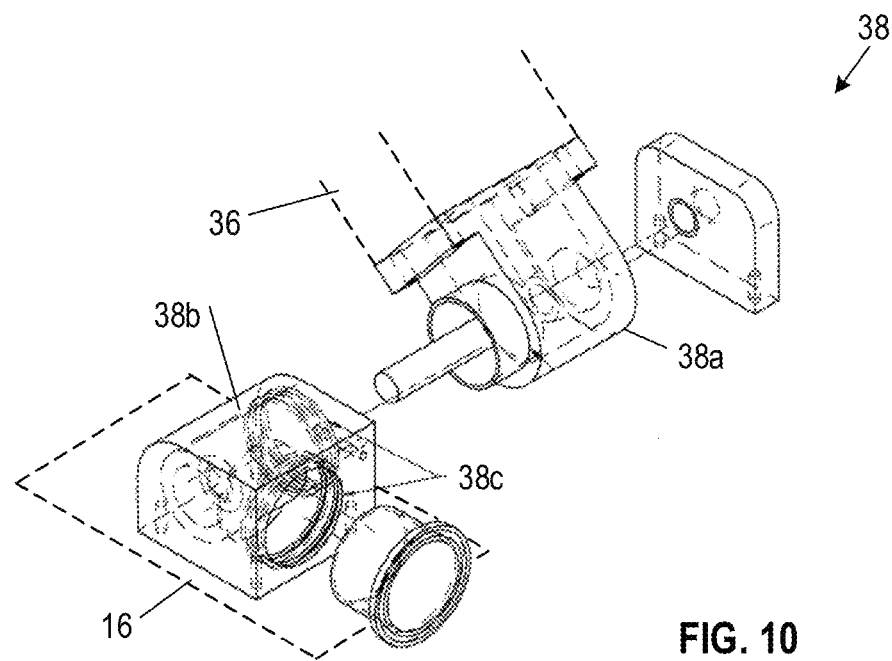
FIG. 10 is an exploded view of a vacuum chamber support arm pivot point according to one embodiment.

Each of the first pivot point 38 and the second pivot point 39 may comprise concentric hollow tubes configured to pivot relative to one another. For example, FIG. 10 illustrates an exploded view of a hollow first pivot point configured to direct air therethrough (e.g., to place the interior of the vacuum chamber 14 in fluid communication with the vacuum system via the vacuum conduit formed through the primary support arm 36, 36a). As shown in FIG. 10, a first portion 38a of each pivot point 38 may be disposed on the primary support arm 36, and may comprise a first hollow tube having a centerline concentric with the axis of rotation of the pivot point 38. A second portion 38b of each pivot point 38 may be secured to the carousel 16 (e.g., the first pivot point 38 may be secured to the carousel 16) or the vacuum chamber 14 (e.g., the second pivot point 39 may be secured to the vacuum chamber 14, as shown in FIGS. 8A and 8B). The second portion 38b of each pivot point may comprise one or more hollow tubes having a centerline concentric with the axis of rotation of the pivot point. The hollow tubes of the second portion 38b of each pivot point may have an interior diameter larger than an exterior diameter of the first portion of each pivot point disposed on the primary support arm 36, such that the first portion of each pivot point may be disposed within the second portion of each pivot point. One or more sealing elements 38c (e.g., gaskets, O-rings, and/or the like) may be disposed between the first portion 38a and the second portion 38b of each pivot point to provide an air-tight seal within each pivot point. In various embodiments, one or more bearings may also be disposed within the one or more pivot points to facilitate rotation of the pivot point and to increase the durability of the pivot points for extended use.

In various embodiments, the hollow interior of the primary support arm 36 may be in fluid communication with the chamber interior of the vacuum chamber 14 and/or the vacuum system controllable through the carousel 16 via one or more vacuum conduits 17 (as shown in FIGS. 8A and 8B). For example, each pivot point may be solid and the primary support arm 36 may have one or more vacuum ports (not shown) located proximate each pivot point. In such embodiments, the vacuum port 39a for the vacuum chamber 14 may be in fluid communication with the vacuum port of the primary support arm 36 located proximate the second pivot point via a vacuum conduit (e.g., flexible vacuum tubing; not shown). Similarly, the vacuum system controllable through the carousel 16 may be in fluid communication with the primary support arm 36 via a vacuum conduit (not shown) secured to the vacuum port of the primary support arm 36 located proximate the first pivot point. Various embodiments may incorporate a flexible conduit at only one of the two pivot points (e.g., only between the vacuum chamber and the primary support arm, or only between the primary support arm and the vacuum system controllable through the carousel).

In various embodiments, the vacuum chamber 14 may be placed in fluid communication with the vacuum system controllable through the carousel via one or more vacuum hoses (e.g., flexible vacuum hoses) extending between a vacuum port 39a on the vacuum chamber 14 and a corresponding vacuum port on the carousel 16. In such embodiments, the primary support arm 36 need not operate as a vacuum conduit between the vacuum chamber 14 and the vacuum system controllable through the carousel 16 and/or may operate as a secondary vacuum conduit between the vacuum chamber 14 and the vacuum system.

In various embodiments, the support mechanism for the vacuum chambers 14 described herein, including, inter alia, the primary support arm 36, the secondary support rod 37, the first pivot point 38, and/or the second pivot point 39, may be utilized to support vacuum chambers 14 of apparatuses in which the number of vacuum chambers 14 does not equal (e.g., is less than) the number of platens 12. For example, vacuumization apparatuses in which platens 12 are driven via a chain-drive mechanism around one or more axes or rotation and/or in which the number of platens 12 is greater than the number of vacuum chambers 14 may utilize vacuum chamber support systems as described herein (e.g., to place a vacuum system in fluid communication with an interior of one or more vacuum chambers 14 via a vacuum conduit defined by a primary support arm 36).

Movement Mechanism for the Vacuum Chambers

FIG. 8A illustrates a portion of the apparatus 10 illustrating an example movement mechanism for each of the plurality of vacuum chambers 14. In various embodiments, the movement mechanism for each of the plurality of vacuum chambers 14 is configured to raise and lower the vacuum chambers 14 in sequence, to thereby selectively mate the vacuum chamber 14 with the corresponding platen 12 during a portion of the rotational travel path of the platens 12 and vacuum chambers 14. In the illustrated embodiment of FIG. 8A, each vacuum chamber 14 is movable between the raised position and the lowered position via a cam surface and cam follower system. In the illustrated embodiment, the primary support arm 36 is pivotably secured to a push rod 40 extending downward away from a bottom surface of the primary support arm 36. In various embodiments, a top end of the push rod 40 is pivotably secured to the primary support arm 36 such that the push rod 40 may maintain an at least substantially vertical orientation as the support arm moves (pivots) between a raised position and a lowered position. Moreover, the push rod may be slidably positioned within a support sleeve 40a secured to the carousel 16 configured to maintain the vertical orientation of the push rod 40 during operation. In the illustrated embodiment, a bottom end of the push rod defines a cam follower 41a configured to engage a corresponding cam surface 41b disposed below the travel path of the vacuum chambers 14 as the vacuum chambers 14 rotate synchronously with the corresponding platens 12 around the axis of rotation 18. In various embodiments, the cam follower 41a may comprise a wheel configured to rotate about a horizontal axis of rotation as the cam follower 41a rides along the cam surface 41b. The cam surface 41b may comprise a raised surface portion corresponding to the portion of the vacuum chamber 14 travel path in which the vacuum chamber 14 is in a raised position, a lowered surface portion corresponding to the portion of the vacuum chamber 14 travel path in which the vacuum chamber 14 is in a lowered position and mated with the corresponding platen 12, and transition surface portions connecting the raised and lowered surface portions and corresponding to the periods during which the vacuum chamber 14 moves between the raised and lowered positions.

In operation, after passing a loading portion of the platen 12 and vacuum chamber 14 travel path in which the vacuum chamber 14 is in a raised position and the cam follower 41a is engaged with a raised surface portion of the cam surface 41b, the cam follower 41a engages a transition surface portion between the raised surface portion and the lowered surface portion of the cam surface 41b. As the cam follower 41a remains engaged with the transition region of the cam surface 41a, the vacuum chamber 14 is lowered to mate with the corresponding platen 12, which is also travelling along a rotational path of travel. While the platen 12 and corresponding vacuum chamber 14 remain mated while travelling a predefined distance around the axis of rotation 18, the cam follower 41a remains engaged with the lowered surface portion of the cam surface 41b. Upon reaching a second transition surface portion between the lowered surface portion and the raised surface portion of the cam surface 41b, the cam follower 41a engages the second transition surface portion, which pushes the push rod 50 upward as the cam follower 41a rides up the second transition surface portion, thereby raising the vacuum chamber 14. The vacuum chamber 14 then remains in the raised position while the cam follower 41a is engaged with the raised surface portion of the cam surface 41b. Accordingly, the cam surface 41b may be endless and extends fully around the axis of rotation 18.

In various embodiments, the cam surface 41b may only include the raised surface portion and the transition surface portions, such that the cam follower 41a is not engaged with the cam surface 41b while the vacuum chamber 14 is in the lowered position. The cam follower 41a engages a transition portion of the cam surface 41b to raise the vacuum chamber 14 into the raised position, and remains engaged with the raised surface portion of the cam surface 41b to maintain the vacuum chamber 14 in the raised position. The cam follower 41a may thereafter engage a second transition surface portion of the cam surface 41b to lower the vacuum chamber 14 to the lowered position again, at which point the cam follower 41a disengages the cam surface 41b while the vacuum chamber 14 remains in the lowered position.

Considering the plurality of vacuum chambers 14 of the illustrated embodiments, the cam surface 41b and cam follower 41a mechanism permits certain of the vacuum chambers 14 to be in a lowered position with other of the vacuum chambers 14 are in a raised position. The location of the raised surface portion of the cam surface 41b and the lowered surface portion of the cam surface 41b (or the gap in the cam surface 41b) determines the portions of the rotational path of the vacuum chambers 14 during which the vacuum chambers 14 are in the raised and lowered positions. Thus, while one or more vacuum chambers 14 are positioned such that the corresponding cam followers 41a engage the raised portion of the cam surface 41b, other vacuum chambers 14 are located such that corresponding cam followers 41a engage a lower portion of the cam surface 41b (or a gap in the cam surface).

Other mechanisms may be used to raise and lower the vacuum chamber 14, such as a motor (e.g., a servo motor) controllable by a central control computer, a gearing mechanism, a hydraulic actuator, and/or the like.

As noted above in reference to the vacuum chamber support system, the described and illustrated movement mechanisms of FIGS. 8A-8B, 9, and 10 may be utilized with a variety of vacuum chambers 14, including vacuum chambers 14 that do not correspond to a single platen 12. For example, the described and illustrated movement mechanisms may be utilized with a vacuumization and sealing apparatus in which the number of platens 12 is not equal (e.g., greater than) the number of vacuum chambers 14.

Rotary Vacuum Valve

Figure 11:
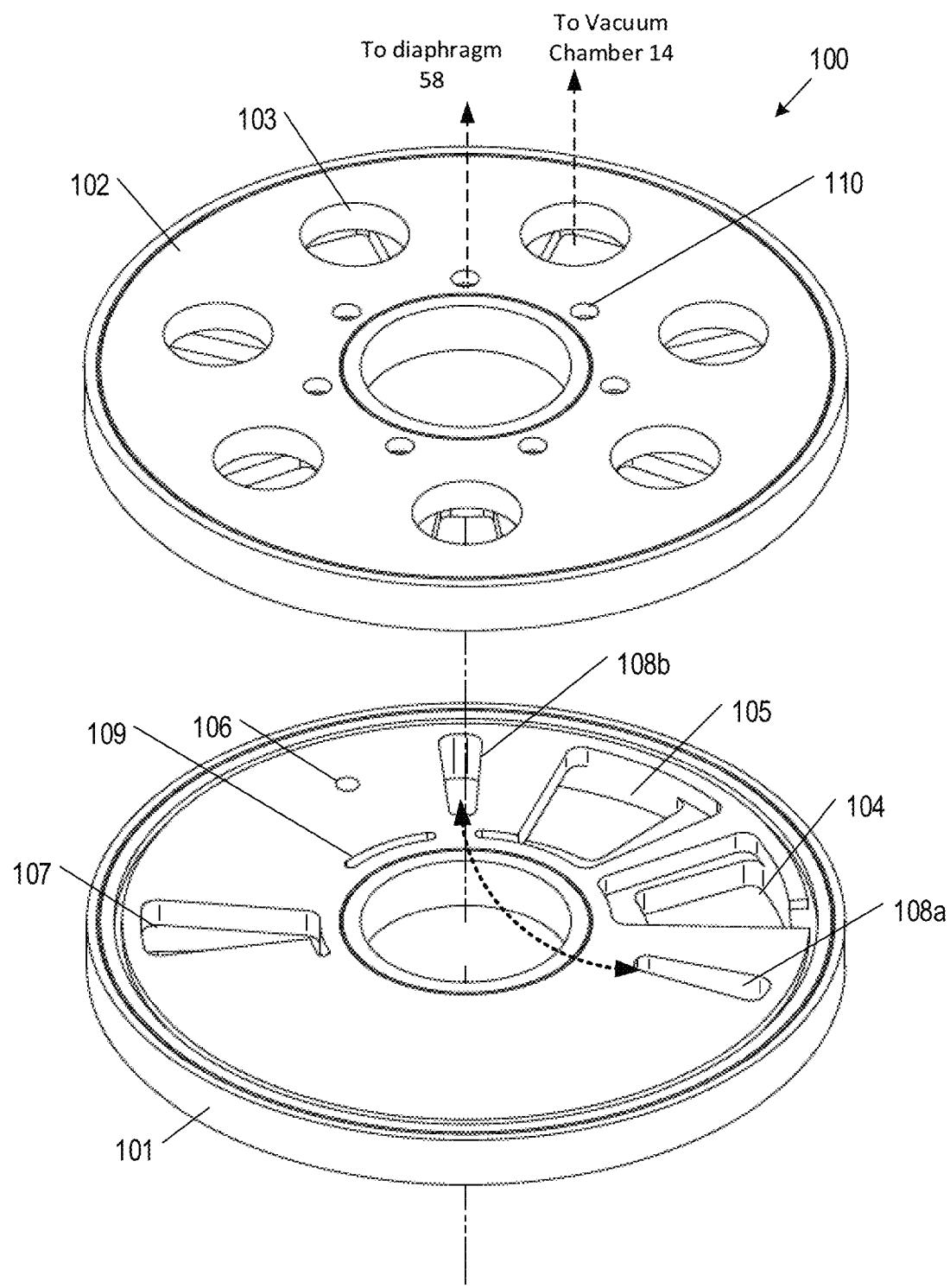
FIG. 11 is an exploded view of a rotary valve according to one embodiment.

In various embodiments, the vacuum system comprises one or more vacuum pumps and/or vacuum boosters configured to provide a vacuum pressure to the apparatus 10. In various embodiments, the one or more vacuum pumps and/or vacuum boosters are operably secured to the apparatus 10 via one or more vacuum conduits (e.g., flexible and/or rigid tubing). The apparatus 10 then selectably distributes the vacuum pressure among the plurality of vacuum chambers 14 to selectively evacuate the air from each of the vacuum chambers 14. FIG. 11 illustrates an exploded view of a rotary vacuum valve 100 used to selectively distribute the vacuum pressure among the plurality of vacuum chambers 14. In the illustrated embodiment of FIG. 11, the rotary vacuum valve 100 comprises an input component 101 and a distributor component 102. The distributor component 102 is configured to rotate with the carousel 16 (not shown in FIG. 11) and relative to the input component 101. Each of the input component 101 and distributor component 102 may be secured within a rotary valve housing (not shown) configured to maintain the relative positioning of the input component 101 and distributor component 102.

The distributor component 102 is operably secured to the carousel 16 such that the distributor component 102 rotates with the carousel 16. As illustrated, the distributor component has at least one distributor port 103 corresponding to each vacuum chamber 14 such that the at least one distributor port 103 is in fluid communication with the corresponding vacuum chamber 14 via one or more vacuum conduit portions (e.g., including the primary support arm 36 and/or one or more rigid or flexible vacuum tubes).

As illustrated, the input component 101 comprises a first entry port 104 in fluid communication with vacuum conduit operatively secured to the vacuum pumps and/or vacuum boosters and a second entry port 105 in fluid communication with vacuum conduit operatively secured to the vacuum pumps and/or vacuum boosters. In various embodiments, the first entry port 104 and second entry port 105 are positioned such that air is first evacuated from a vacuum chamber 14 (in a lowered position forming an air-tight enclosure with a corresponding platen 12) as a corresponding distributor port 103 is aligned with the first entry port 104, and additional air is evacuated from the vacuum chamber 14 to a final vacuum level within the vacuum chamber 14 as the corresponding distributor port 103 is aligned with the second entry port 105.

Accordingly, the input component 101 is configured to remain stationary as the carousel 16 and the distributor component 102 rotates. Moreover, as illustrated, the input component 101 defines a diagnostic port 106 that is configured to be placed in fluid communication with a diagnostic system (not shown). The diagnostic port 106 thereby permits one or more diagnostic systems to be in fluid communication with one or more vacuum chambers 14 while a corresponding distributor port 103 is aligned with the diagnostic port 106 to thereby monitor one or more characteristics of the one or more vacuum chambers 14 in operation. For example, a vacuum pressure sensor may be secured to the diagnostic port 106 and configured to detect a vacuum level within one or more of the vacuum chambers 14 as the distributor ports 103 corresponding to the vacuum chambers 14 pass the diagnostic port 106. In various embodiments, the diagnostic port 106 may be configured to permit one or more diagnostic systems to be operably secured to the apparatus 10 while the apparatus 10 is in operation. Accordingly, the diagnostic port 106 permits one or more connected diagnostic systems to continually monitor characteristics of the one or more vacuum chambers 14 while the apparatus 10 is in operation. As discussed in greater detail herein, the diagnostic port 106 may be positioned relative to the input ports 104, 105 and/or one or more vent ports 108b, 107 such that the diagnostic port 106 permits a diagnostic system to monitor a final vacuum pressure within a vacuum chamber 14, and/or some partial vacuum pressure within a vacuum chamber 14. For example, in the illustrated embodiment of FIG. 11, the diagnostic port 106 is positioned such that each distributor port 103 passes a first cross vent port 108a, the first entry port 104, the second entry port 105, and a second cross vent port 108b, before becoming aligned with the diagnostic port 106. In such embodiments, the diagnostic port 106 permits a diagnostic system to monitor a partial vacuum pressure within each vacuum chamber 14 (after a portion of the vacuum pressure has been vented to another vacuum chamber 14 via the cross vent ports 108a, 108b as described herein). As an additional example, the diagnostic port 106 may be positioned such that a distributor port passes the first cross vent port 108a, the first entry port 104, and the second entry port 105 before becoming aligned with the diagnostic port 106, such that the diagnostic port 106 permits a diagnostic system to monitor a final vacuum pressure within a corresponding vacuum chamber 14 (before the vacuum pressure is cross vented to another vacuum chamber 14 and/or otherwise released in whole or in part). Moreover, in various embodiments, the rotary vacuum valve may define a plurality of diagnostic ports 106 positioned to monitor vacuum levels in vacuum chambers 14 at various stages of vacuum (e.g., before and after a second cross vent port 108b).

Moreover, in the illustrated embodiment of FIG. 11, the input component 101 additionally defines a final vent port 107 in fluid communication with the ambient atmosphere. The final vent port 107 is configured to vent the interior of a vacuum chamber to the ambient atmosphere while a corresponding distributor port 103 is aligned with the final vent port 107 before lifting the vacuum chamber 14 off of the corresponding platen 12. Because the pressure within the vacuum chamber is equalized with the ambient atmosphere, the vacuum chamber is not being held against the corresponding platen 12 by a vacuum pressure within the vacuum chamber 14, and accordingly, lifting the vacuum chamber 14 away from the corresponding platen 12 is facilitated. In the illustrated embodiment, the final vent port 107 is positioned downstream of the entry ports 104, 105 and the diagnostic port 106.

As also illustrated in FIG. 11, the input component 101 may define a pair of cross vent ports 108a, 108b in fluid communication with one another. The pair of cross vent ports may be positioned such that a first cross vent port 108a is positioned upstream of the first entry port 104 such that each distributor port 103 becomes aligned with the first cross vent port 108a before the corresponding vacuum chamber 14 is vacuumized. In the illustrated embodiment, the second cross vent port 108b is positioned downstream of the second entry port 105 such that each distributor port 103 becomes aligned with the second cross vent port 108b after the vacuumization process of the corresponding vacuum chamber 14 is complete. Moreover, the cross vent ports 108a, 108b are positioned such that a first distributor port 103 is aligned with the first cross vent port 108a while a second distributor port 103 is aligned with the second cross vent port 108b such that the vacuum chambers 14 corresponding to the first and second distributor ports 103 are placed in fluid communication with one another. Accordingly, while the vacuum chambers are in fluid communication with one another via the cross vent ports 108a, 108b, the vacuum level in the vacuum chamber 14 corresponding to the first distributor port 103 (aligned with the first cross vent port 108a) is increased while the vacuum level in the vacuum chamber 14 corresponding to the second distributor port 103 (aligned with the second cross vent port 108b) is decreased.

For example, the second cross vent port 108b may be positioned such that a package positioned within an air-tight enclosure formed between a vacuum chamber 14 and a platen 12 is fully vacuumized and sealed (as described herein) before the interior of the air-tight enclosure is cross vented via the second cross vent port 108b. Thus, the amount of air that must be evacuated from within each vacuum chamber 14 while the corresponding distributor ports 103 are aligned with the entry ports 104, 105 is decreased.

Moreover, in the illustrated embodiment of FIG. 11, the input component 101 comprises one or more compressed air entry ports 109 configured to selectably supply air to a pneumatic device (e.g., a diaphragm 58 operable to move an upper seal bar 50 corresponding to a particular vacuum chamber 14 between a retracted and extended position (as described below)). In the illustrated embodiment, the distributor component 102 has corresponding compressed air distributor ports 110 corresponding to each vacuum chamber 14. Accordingly, as the compressed air distributor ports 110 become aligned with the compressed air entry ports 109, compressed air is directed through the compressed air distributor ports 110 and to operate the pneumatic device (e.g., to inflate the corresponding diaphragm 58, which causes the corresponding upper seal bar 50 to move to the extended position).

In the illustrated embodiment, the distributor component 102 is adjacent the input component 101, such that a first surface of the distributor component 102 rotates against the adjacent first surface of the input component 101. In various embodiments, the apparatus 10 additionally comprises a lubricant system (not shown) configured to constantly supply a lubricant (e.g., a mineral oil) between the first surface of the input component and the first surface of the distributor component to form a thin film of lubricant therein. In various embodiments, the lubricant may be supplied via a gravity fed lubricant system. In such embodiments, the lubricant acts to lubricate the surfaces of the input component 101 and the distributor component 102 to facilitate rotation of the distributor component 102 relative to the input component 101. Moreover, the lubricant may additionally operate to provide an air-tight seal within the rotary vacuum valve 100.

In operation, the carousel 16, the vacuum chambers 14, and the distributor component 102 may be configured to rotate relative to the input component 101. As the distributor component 102 rotates relative to the input component 101, the distributor ports 103 corresponding to each vacuum chamber 14 pass over the entry port 104 in fluid communication with the one or more vacuum pumps and/or vacuum boosters. While the distributor ports 103 are aligned with the entry port 104, the air within the corresponding vacuum chamber 14 is evacuated through the one or more vacuum conduit portions, through the rotary vacuum valve 100, and through the vacuum system. The portion of time during which the distributor port 103 for a particular vacuum chamber 14 is aligned with the entry port 104 corresponds to the period of time during which the vacuum chamber 14 is in the lowered position and mated with the corresponding platen 12. Thus, while the vacuum chamber 14 is in the lowered position, the air within the air-tight enclosure formed with the platen 12 is evacuated.

As the carousel 16 rotates, each of the distributor ports 103 may become aligned with the entry ports 104, 105 consecutively. Moreover, more than one distributor port 103 may be aligned with an entry port 104, 105 simultaneously. Thus, as the carousel 16 rotates, the air within each of one or more vacuum chambers 14 in the lowered position may be evacuated as the distributor ports 103 initially become aligned with the entry port 14. For example, while a first distributor port 103 remains aligned with an entry port 104, a second distributor port 103 may become aligned with the entry port 104 such that both the first and second distributor ports 103 are aligned with the entry port 104 simultaneously. The entry port 104 thus may be configured such that one or more distributor ports 103 may remain aligned with the entry port 104 during at least a portion of the time during which the corresponding vacuum chambers 14 are in the lowered position. For example, as mentioned above, the vacuum chambers 14 may each remain in the lowered position for a rotational distance around the axis of rotation 18 for at least a minimum rotational distance around the axis of rotation 18. The distributor ports 103 corresponding to the vacuum chambers 14 may thus remain aligned with the entry port during at least substantially all of the time during which the vacuum chambers 14 are in the lowered position.

In various embodiments, the rotary vacuum valve 100 may include only a subset of the described ports. For example, the rotary vacuum valve 100 may include only those ports necessary to selectably place each vacuum chamber 14 in fluid communication with the vacuum pumps and/or vacuum boosters. For example, the input component 101 may only define a single entry port, and may not define cross vent ports and/or a final vent port. In yet other embodiments, the input component 101 may only define one or more entry port and the final vent port 107. Indeed, any of a variety of combinations of the described ports may be possible. Moreover, the rotary vacuum valve 100 may not include the compressed air distribution ports (e.g., the compressed air distributor ports 110 and the compressed air entry ports 109), such that the upper seal bar 50 may be operable via other mechanisms (e.g., via an electronically actuated valve 56 in communication with a slip ring distributor 61, as described herein).

Similar to the vacuum chamber support system and vacuum chamber movement mechanism described herein, the rotary vacuum valve 100 may be incorporated into an apparatus in which the number of vacuum chambers 14 does not equal (e.g., is less than) the number of platens 12, and such that the vacuum chambers 14 do not each corresponding to a particular platen 12.

Seal Bar System

As previously mentioned, after the air within a particular vacuum chamber 14 is evacuated such that the air within a package placed therein is likewise evacuated, and while a vacuum pressure is maintained within the vacuum chamber 14, an open end of the package bag is heat sealed to maintain the vacuum pressure within the package after the vacuum within the vacuum chamber 14 is released. FIG. 12 illustrates a sealing system 34 operable to seal a package closed according to various embodiments. As illustrated in FIG. 12, the sealing system 34 may comprise a lower heat seal bar 48 and an upper heat seal bar 50.

Each of the lower seal bar 48 and the upper seal bar 50 are elongated members extending in a direction parallel to the width of the corresponding platen 12. In the illustrated embodiments, the lower seal bar 48 and upper seal bar 50 are positioned proximate a back portion of the platen 12 (relative to the direction of travel of the platen 12). As will be described in greater detail below, packages may be loaded onto the platens 12 such that the open ends of the packages extend rearward (toward the rear portion of the platen). In such embodiments, the sealing system 34 is positioned in the rear portion of the platen 12 such that the lower seal bar 48 and upper seal bar 50 engage the package proximate the open end of the package.

Retractable Lower Seal Bar

In the illustrated embodiment, the sealing system 34 comprises a retraction mechanism 42 for retracting the lower seal bar 48 below the upper surface of the corresponding platen 12. FIG. 12 illustrates the lower seal bar 48 in an extended and retracted position, respectively. As each platen 12 passes below an infeed conveyor 22 during loading, the lower seal bar 48 may be retracted below the upper surface of the platen 12. Because the lower seal bar 48 is retracted, the upper surface of the platen 12 may be relatively flat, which permits the platen 12 to remain proximate to the infeed conveyor 22 and thereby minimize the distance between the upper surface of the infeed conveyor 22 and the upper surface of the platen 12 in order to minimize the distance a package drops from the upper surface of the infeed conveyor 22 to the upper surface of the platen 12.

In the illustrated embodiment, movement of lower seal bar 48 between the extended and retracted positions occurs via an opening 49 defined within each platen 12. When in the retracted position, the lower seal bar 48 is positioned within the opening 49 and entirely below the upper surface of the platen 12. In the extended position, the lower seal bar 48 extends through the opening 49 and above the upper surface of the platen 12. Moreover, as shown in the illustrated embodiment, the lower seal bar 48 additionally comprises a subplaten 49a proximate the lower portion of the lower seal bar 48. When the lower seal bar 48 is in the extended position, the subplaten 49a of the lower seal bar 48 engages a bottom surface of the platen 12 around the opening 49, thereby forming an air-tight seal within the opening 49 in the platen 12. Accordingly, when the lower seal bar 48 is in the extended position and the corresponding vacuum chamber 14 is mated with the platen 12, the defined enclosure is air-tight to permit evacuation of the air within the enclosure (e.g., via a vacuum conduit in fluid communication with the vacuum system).

In the illustrated embodiment of FIG. 12, the lower seal bar 48 is operably secured to a bottom portion of the platen 12, such that the lower seal bar 48 is permitted to move between the extended and retracted positions. As illustrated, the lower seal bar 48 is pivotably secured to a lower portion of the platen 12, such that the lower seal bar 48 rotates between the extended and retracted positions.

Moreover, as illustrated, the lower seal bar 48 comprises a cam follower 51a extending below a lower portion of the seal bar 48. The cam follower 51a is configured to engage and ride along a cam surface (illustrated schematically in FIG. 12 as line 51b) operable to control the raising and lowering of the retractable lower seal bar 48. Similar to the cam/cam follower system described above as operable to control the raising and lowering of each vacuum chamber 14, the cam surface 51b corresponding to the retractable lower seal bar 48 may be an endless surface extending around the axis of rotation 18. In various embodiments, the cam surface 51b has a raised surface portion corresponding to the portion of platen travel during which the lower seal bar 48 is in the extended position, a lower surface portion corresponding to the portion of platen travel during which the lower seal bar 48 is in the retracted position, and transition surface portions between the raised surface portion and the lower surface portion. In various embodiments, the position of the transition surface portions between the lower surface portions and the raised surface portions of the cam surface 51b may correspond with the transition regions of the cam surface 41b controlling the raising and lowering of the vacuum chambers 14 such that the lower seal bar 48 reaches the extended position at substantially the same time that the vacuum chamber 14 mates with the corresponding platen 12.

Accordingly, during the loading and/or the unloading portions of the platen travel path, the cam follower 51a may engage a lower portion of the cam surface 51b, such that the lower seal bar 48 remains in the retracted position. After passing the loading portion of the platen travel path, the cam follower 51a engages a transition surface portion of the cam surface 51b, which pushes the cam follower 51a upwards, and consequently pushes the lower seal bar 48 into the extended position as the cam follower 51a rides up the transition surface portion of the cam surface 51b between the lower portion and the raised portion. While the cam follower 51a is engaged with and rides along the raised portion of the cam surface 51b, the lower seal bar 48 remains in the extended position.

In various embodiments, the cam surface 51b may not comprise a lower surface portion. In such embodiments, the lower seal bar 48 may remain in the retracted position while the cam follower 51a is disengaged from the cam surface 51b. Upon reengaging the cam surface 51a at a lower end of a transition surface portion, the cam follower 51a rides along the transition surface portion to a raised portion of the cam surface 51b, thereby causing the lower seal bar 48 to move to the extended position.

Figure 13C:
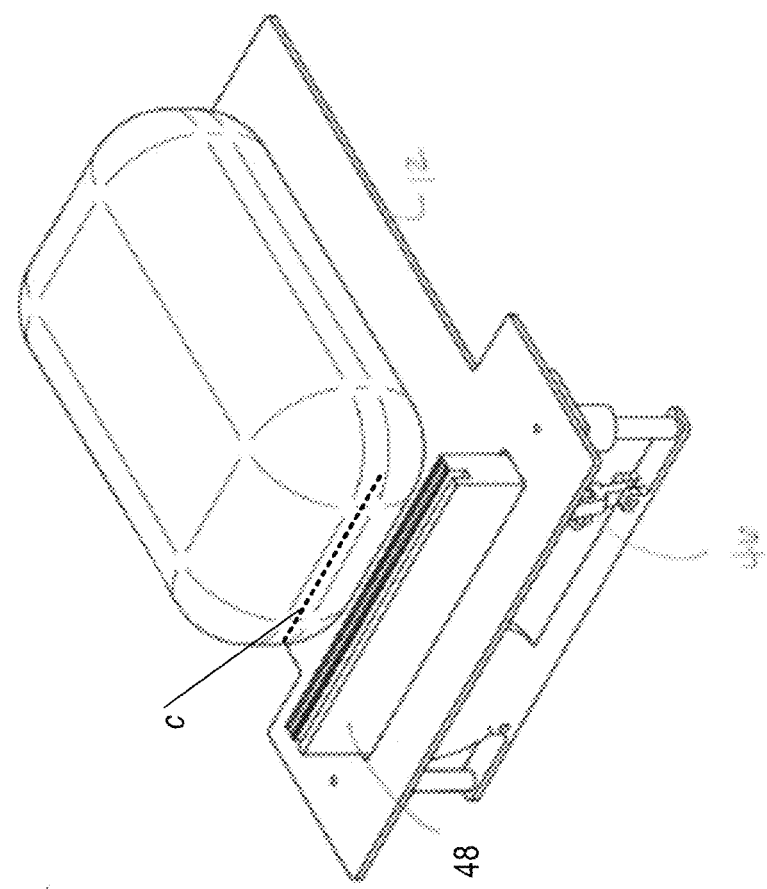
FIGS. 13A-13C are various views of an alternative heat seal mechanism according to one embodiment.
Figure 13A:
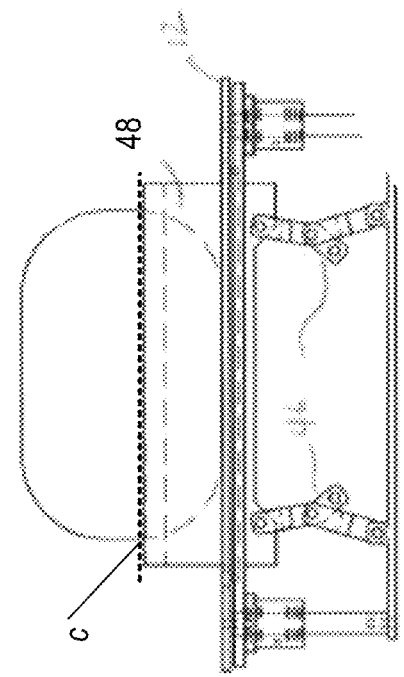
Figure 13B:
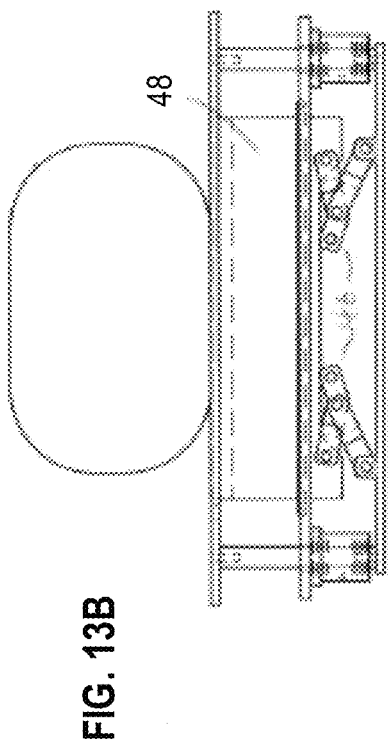

The lower seal bar 48 may be moved between the extended position and the retracted position according to a variety of moving mechanisms in addition to or alternative to the described cam/cam follower configuration. FIGS. 13A-13C illustrate an alternative mechanism for moving the lower seal bar 48 between the retracted and extended positions. As shown in FIGS. 13A-13C, the lower seal bar 48 may be moved between the extended and retracted positions via one or more linear actuation mechanisms 46. Although not shown, the lower seal bar 48 need not be movable via a cam/cam follower mechanism, and may be movable via one or more controlled motors, linear actuators, pneumatic mechanisms, hydraulic mechanisms, and/or the like.

Moreover, various components, features, and/or systems described herein may be operable with platens 12 having fixed lower seal bars 48. For example, various embodiments may comprise an infeed system 20 configured to convey packages onto platens 12 each having lower seal bars 48 fixed in the extended position. In such configurations, the distance between the upper surface of the platen 12 and the upper surface of the downstream end of the infeed conveyor (illustrated as the distance between 12p and 22p in FIG. 4) may be sufficiently great that the extended lower seal bar 48 may pass under the infeed system 20.

Moreover, the retractable lower seal bar 48 mechanism may be operable with apparatuses in which the number of platens 12 is not equal to (e.g., is greater than) the number of vacuum chambers 14. For example, apparatuses in which the platens 12 are operably secured to a chain drive mechanism to move around two or more axes of rotation along a platen travel path may incorporate a retractable lower seal bar 48 into each platen 12 to facilitate automatic loading of packages onto the corresponding platens 12.

Upper Seal Bar

Figure 14:
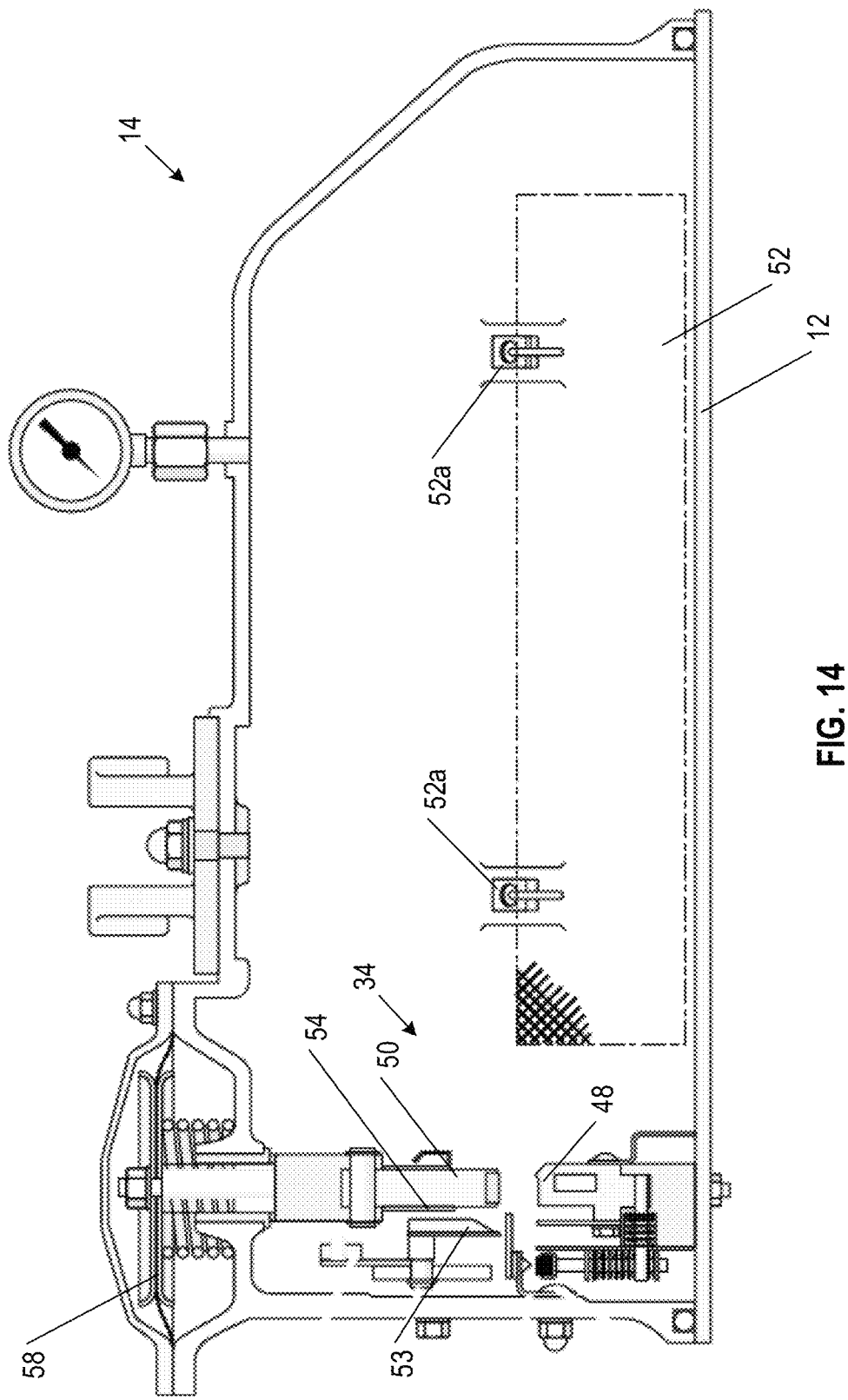
FIG. 14 is a side cutaway view of a vacuum chamber and package manipulation systems according to various embodiments.

FIG. 14 illustrates an interior cutaway view of an example vacuum chamber 14. As shown in FIG. 14, the upper seal bar 50 of the sealing system 34 is operably secured within the vacuum chamber 14 and is configured to engage the lower seal bar 48 while the lower seal bar 48 is in the extended position and the vacuum chamber 14 is in the lowered position.

Moreover, in the illustrated embodiment of FIG. 14, the upper seal bar 50 is configured to move between a retracted position and an extended position. In various embodiments, the total travel distance between the retracted position and the extended position of the upper seal bar 50 is small (e.g., approximately 0.5 inches), and is configured to apply a compressive force to a plastic bag of a package (not shown) between the upper seal bar 50 and the lower seal bar 48.

In various embodiments, the upper seal bar 50 is controllable between the retracted and extended positions by a pneumatic diaphragm 58 (e.g., operable via compressed air received through the rotary vacuum valve 100 described herein and illustrated in FIG. 11) located above the upper seal bar 50. In various embodiments, compressed air may be directed into the diaphragm 58, thereby expanding the diaphragm 58, and pressing the upper seal bar 50 downward into the extended position. By releasing the air from within the diaphragm, the upper seal bar 50 retracts to the retracted position. Moreover, in various embodiments, the upper seal bar 50 may be biased to the retracted position (e.g., via one or more tensile or compressive springs) to facilitate movement to the retracted position upon deflation of the diaphragm 58.

The upper seal bar 50 may be movable between the extended and retracted positions via one or more mechanisms in addition to or alternatively to the diaphragm mechanism described herein. For example, the upper seal bar 50 may be movable between the retracted and extended positions via one or more motors (e.g., servo motors), linear actuators, hydraulic mechanisms, and/or the like.

Like other components discussed above, the upper seal bar 50 described herein may be operable with an apparatus in which the number of vacuum chambers does not equal (e.g., is less than) the number of platens 12.

Heat Seal Mechanism

In various embodiments, the lower seal bar 48 and upper seal bar 50 each comprise heat seal mechanisms configured to apply heat to a plastic bag of a package compressed therebetween to partially melt the plastic to form a heat seal. In various embodiments, the lower seal bar 48 and the upper seal bar 50 may be at least substantially linear elongated bars extending perpendicular to the direction of travel of the platen 12, however a variety of seal bar configurations may be utilized. FIGS. 15A-15D provide example orientations of the seal bars 48, 50. As shown in FIGS. 15A-15D, the lower seal bar 48 and the upper seal bar 50 may have any of a variety of profiles, including, as non-limiting examples, as generally elongated bars having a curved orientation (e.g., a semi-circular shape, a hyperbolic shape, a parabolic shape, a "U" shape, a "V" shape, and/or the like). The profile shape of the seal bars may be selected at least in part based on the type of packages and/or products that are to be packaged on the vacuum packager. The profile shape of the seal bars may be selected in order to minimize the size of "bag ears" (portions of a sealed bag of a package within a bag the vacuumed portion of the bag but in which the product is not located). For example, a product having a pointed, "V" shaped trailing edge may have large bag ears within the vacuum packaged portion of the package if using a linear seal bar configuration oriented perpendicular to the direction of travel of the platens 12. Using a "V" shaped seal bar configuration to provide a heat seal that substantially contours to the trailing edge of the product minimizes the bag ears between the heat seal and the product of the package.

FIGS. 16A-16B illustrate example configurations of the seal bars 48, 50 according to various embodiments. As shown in FIGS. 16A-16B, each of the lower heat seal bar 48 and the upper heat seal bar 50 comprise at least one impulse sealing wire 48a, 50a configured to apply heat to a plastic bag (not shown) compressed therebetween. Specifically, in the illustrated embodiment of FIG. 16A, the lower seal bar 48 comprises two at least substantially parallel impulse sealing wires 48a extending across at least a portion of the width of the lower seal bar 48. In the illustrated embodiment of FIG. 16B, the upper seal bar 50 comprises one wide impulse sealing wire 50a extending across the width of the upper seal bar 50. When activated (e.g., by transmitting an electric current through the wires), each of the impulse sealing wires 48a, 50a in the upper seal bar 50 and lower seal bar 48 heat up rapidly to melt a portion of the plastic (e.g., heat sealable plastic layers) in the plastic bag of the package. By applying heat from both the upper seal bar 50 and the lower seal bar 48, the sealing mechanism 34 (as shown collectively in FIG. 14) may be configured to apply sufficient heat to the package to seal through one or more creases, wrinkles, or other imperfections that may be present in the package at the heat seal location. Accordingly, by applying heat from both the upper side and the lower side of the package to seal through one or more creases, wrinkles, or other imperfections, the sealing mechanism 34 may be configured to account for one or more imperfections in the package caused by automatically loading the package onto the platen 12 from an infeed conveyor. Moreover, as shown in FIGS. 16A-16B, the lower seal bar 48 and upper seal bar 50 may comprise an insulative cover 48b, 50b configured to prevent the impulse sealing wires 48a, 48b from directly contacting the plastic of the package. Such insulative covers 48b, 50b may ensure that the melted plastic of the package does not adhere to the impulse sealing wires 48a, 48b after heat sealing the package.

In various embodiments, one of the upper seal bar 50 or the lower seal bar 48 may not include an impulse sealing wire, such that one of the upper seal bar 50 or the lower seal bar 48 may operate as an "anvil" against which the package is pressed during the sealing operation. In such embodiments, the heat caused by the impulse sealing mechanism is applied from a single side of the package. For example, the lower seal bar 48 may comprise one or more impulse sealing wires 48a (e.g., two impulse sealing wires) extending across the width of the lower seal bar 48. The upper seal bar 50 may act as an anvil, and accordingly does not include any impulse sealing wires. Thus, during the sealing process, the plastic package is compressed between the lower seal bar 48 and the upper seal bar 50, and heat is applied from the lower seal bar 48 to heat seal the package closed.

Like various other components, features, and/or systems described herein, the described heat seal mechanism may be configured to heat seal packages loaded onto an apparatus in which the number of platens 12 does not equal (e.g., is greater than) the number of vacuum chambers 14.

Package Manipulation Systems

Referring again to FIG. 14, each platen 12 and vacuum chamber 14 combination has one or more package manipulation systems configured to facilitate vacuumization and sealing of packages located within the sealed enclosure formed by the platen 12 and vacuum chamber 14. Such package manipulation systems may be secured to at least one of the interior of the vacuum chamber 14, the upper seal bar 50, and/or the lower seal bar 48. Such package manipulation systems may comprise spreader systems, gripper systems, package compression systems, perforator systems, cutter systems, and/or the like. In various embodiments, certain of the package manipulation systems may be operable with apparatuses in which the number of platens 12 is not equal to (e.g., greater than) the number of vacuum chambers 14, like various other features, components, and/or systems described herein.

Spreader and Gripper Systems

In various embodiments, a spreader system corresponding to a particular platen 12 and vacuum chamber 14 combination may comprise a pair of spreaders (not shown) operably secured within the interior of the vacuum chamber 14 and/or a pair of spreaders operably secured to the lower seal bar 48. In combination, the plurality of spreaders are each configured to engage (e.g., grip) a lateral edge of a package proximate the open end of the package to spread the package laterally to reduce the number of creases, wrinkles, and/or imperfections in the package in order to facilitate heat sealing of the package after vacuumization. For example, the plurality of spreaders are configured to spread a portion of the package proximate the open end of the package across the lower seal bar 48 and/or upper seal bar 50. The spreaders function in a similar way to those described in U.S. Pat. No. 6,877,543 to Stevens, the content of which is incorporated herein by reference in its entirety.

In various embodiments, after spreading the package, the gripper system is configured to grip a package within the enclosure formed by the platen 12 and the vacuum chamber 14 to maintain the position of the package therein during the vacuumization and heat sealing processes. The gripper system may comprise a compressive system configured to compress a portion of the package between two or more compression surfaces to grip the package therebetween while permitting air to move freely into and out of the package via the open end of the package.

Package Compressor Mechanism

In various embodiments, each vacuum chamber 14 may comprise a package compressor mechanism configured to compress a package located therein to facilitate evacuation of air from within the package. In the illustrated embodiment of FIG. 14, the package compressor system is embodied as a chain-mail sheet 52 secured within the interior of the vacuum chamber 14. The chain-mail sheet 52 is secured (e.g., via one or more fasteners 52a) to the interior of the vacuum chamber 14 such that the chain-mail sheet 52 hangs down within the vacuum chamber 14. When a package is positioned within the enclosure formed between the vacuum chamber 14 and the corresponding platen 12, the chain-mail sheet 52 engages and conforms to an upper surface of the package to generally conform to the shape of the upper surface of the product (e.g., food product) positioned within the plastic bag forming the package. The added weight of the chain-mail sheet 52 against the top surface of the package compresses the package bag, thereby forcing air out of the package and into the enclosure in which the package is positioned.

Perforator System

In the illustrated embodiment of FIG. 14, the perforator system comprises a perforator blade 53 operably secured within the interior of the vacuum chamber 14 and configured to perforate a package located therein in order to facilitate evacuation of air out of the package. In the illustrated embodiment of FIG. 14, the perforator blade 53 comprises a plurality of sharpened protrusions extending downward from a blade body, and configured to puncture a plurality of holes in the package in order to facilitate evacuation of air from within the package.

As shown in in FIG. 14, the perforator blade 53 is positioned between the upper seal bar 50 and the rear of the vacuum chamber 14, such that perforations in the package are located upstream of a heat seal formed in the package. Accordingly, after perforating and heat sealing the package, the package remains sealed, and the perforations are located in the "bag tail" (the portion of the package between the heat seal and the open end that may be removed by the cutting knife as described herein).

The perforator blade 53 is operable between an extended position in which the perforator blade 53 engages a plastic package to perforate the package, and a retracted position in which the perforator blade 53 does not engage the plastic package.

In various embodiments, the perforator blade 53 is operable between the extended and retracted positions via a pneumatic actuator configured to selectably apply a pressure to the perforator blade 53 to move the perforator blade 53 to the extended position. In various embodiments, the perforator blade 53 may be biased to the retracted position (e.g., via one or more tensile and/or compressive springs) to facilitate movement of the perforator blade to the retracted position after the package has been perforated and after the pneumatic pressure has been released.

Bag Tail Removal System

FIGS. 14 and 17 illustrate various features of a bag tail removal system. As shown in FIGS. 14 and 17, each vacuum chamber 14 and platen 12 combination has a corresponding bag tail removal system. The bag tail removal system illustrated in FIGS. 14 and 17 comprises a cutter mechanism configured to remove the excess plastic between the heat seal and the open end of the package after the package has been vacuumized and heat sealed (the portion of the package referred to herein as the bag tail). The bag tail removal system additionally comprises a pressurized air source configured to blow a stream of pressurized air across the surface of the platen 12 after the vacuum chamber 14 has been raised in order to blow the severed bag tail off of the upper surface of the platen 12.

As illustrated in FIG. 14, the cutter mechanism comprises a cutter blade 54 configured to sever the package across the entire width of the package in order to remove the bag tail from the package after the package has been vacuumized and heat sealed.

As shown in FIG. 14, the cutter blade 54 is positioned between the upper seal bar 50 and the rear of the vacuum chamber 14, such that the package is cut upstream of a heat seal formed in the package. Accordingly, after perforating and heat sealing the package, the package remains sealed, and the excess plastic forming the bag tail is removed by the cutter system. In various embodiments, the cutter blade 54 is positioned between the upper heat seal bar 50 and the perforator blade 53 such that the portion of the bag tail including the perforations formed by the perforator blade 53 are removed when the bag tail is served by the cutter blade 54.

In various embodiments, the cutter blade 54 is operable between the extended and retracted positions via a pneumatic actuator configured to selectably apply a pressure to the cutter blade 54 to move the cutter blade 54 to the extended position. In various embodiments, the cutter blade 54 may be biased to the retracted position (e.g., via one or more tensile and/or compressive springs) to facilitate movement of the cutter blade 54 to the retracted position after the bag tail has been removed and after the pneumatic pressure has been released.

As illustrated in FIG. 17, the bag tail removal system additionally comprises a compressed air nozzle 55 positioned on the carousel 16 adjacent the platen 12 and configured to selectably eject a stream of pressurized air across the surface of the platen 12 to blow the severed bag tail off of the surface of the platen 12. Although not shown, in various embodiments, the apparatus 10 may additionally comprise a bag tail capture system configured to capture the severed bag tails as they are blown off of the surface of the platens 12 and to dispose of the same. For example, the bag tail capture system may comprise a vertical screen configured to stop the bag tails' motion as they are ejected from the surface of the platen 12, and a vacuum system configured to direct the captured bag tails off of the screen and away from the apparatus 10 for disposal.

Pneumatic Control

As indicated above, the perforator system and/or the cutter system comprise pneumatically actuated blades 53, 54 configured to move between a retracted position and an extended position in order to engage a package placed within the enclosure formed between the vacuum chamber 14 and the platen 12.

Figure 18:
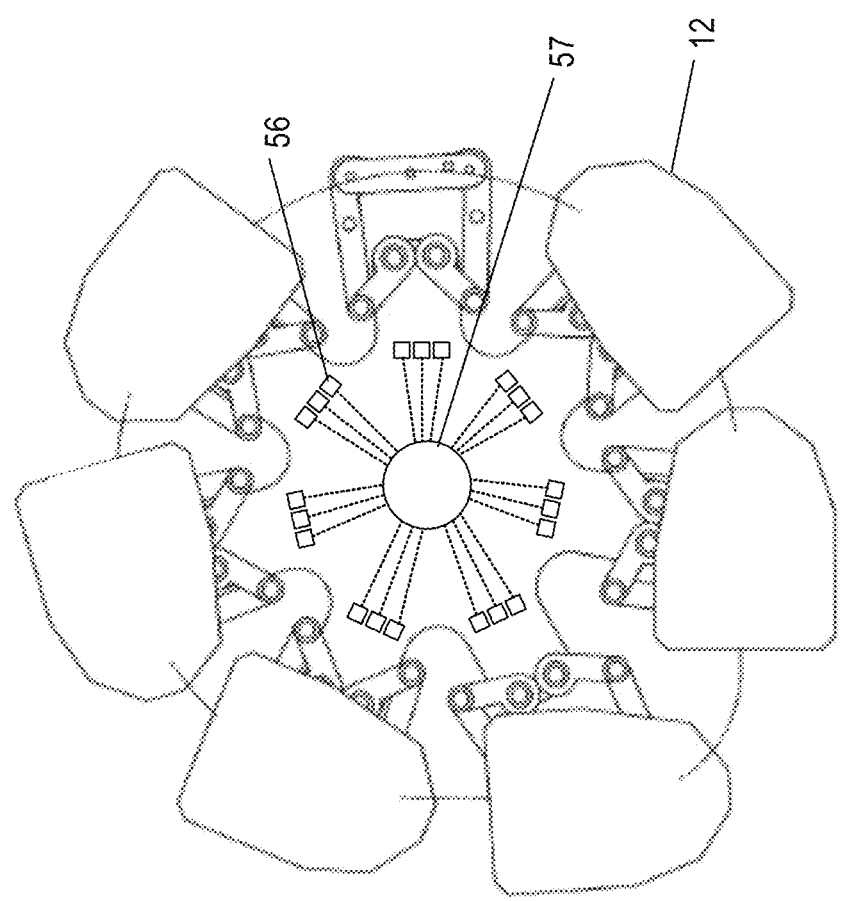
FIG. 18 is a schematic diagram illustrating electrical connections for electronically actuated valves according to one embodiment.

Each of the pneumatically actuated systems positioned within the vacuum chamber 14 may be controllable via one or more electronically actuated valves 56 (e.g., solenoid valves) corresponding to each of the pneumatically actuated systems. FIG. 18 is a schematic view of a portion of an apparatus 10 comprising a vacuum chamber 14 having a retractable upper heat seal bar 50 as described herein, a pneumatically actuated perforator system, and a pneumatically actuated cutter system as described herein. Each of these pneumatic systems are controllable via an electronically controlled valve 56 corresponding to the respective systems. Accordingly, the illustrated embodiment of FIG. 18 comprises at least three electronically actuated valves 56 corresponding to each of the vacuum chamber 14, each of which corresponds to a single package manipulation system.

Figure 19:
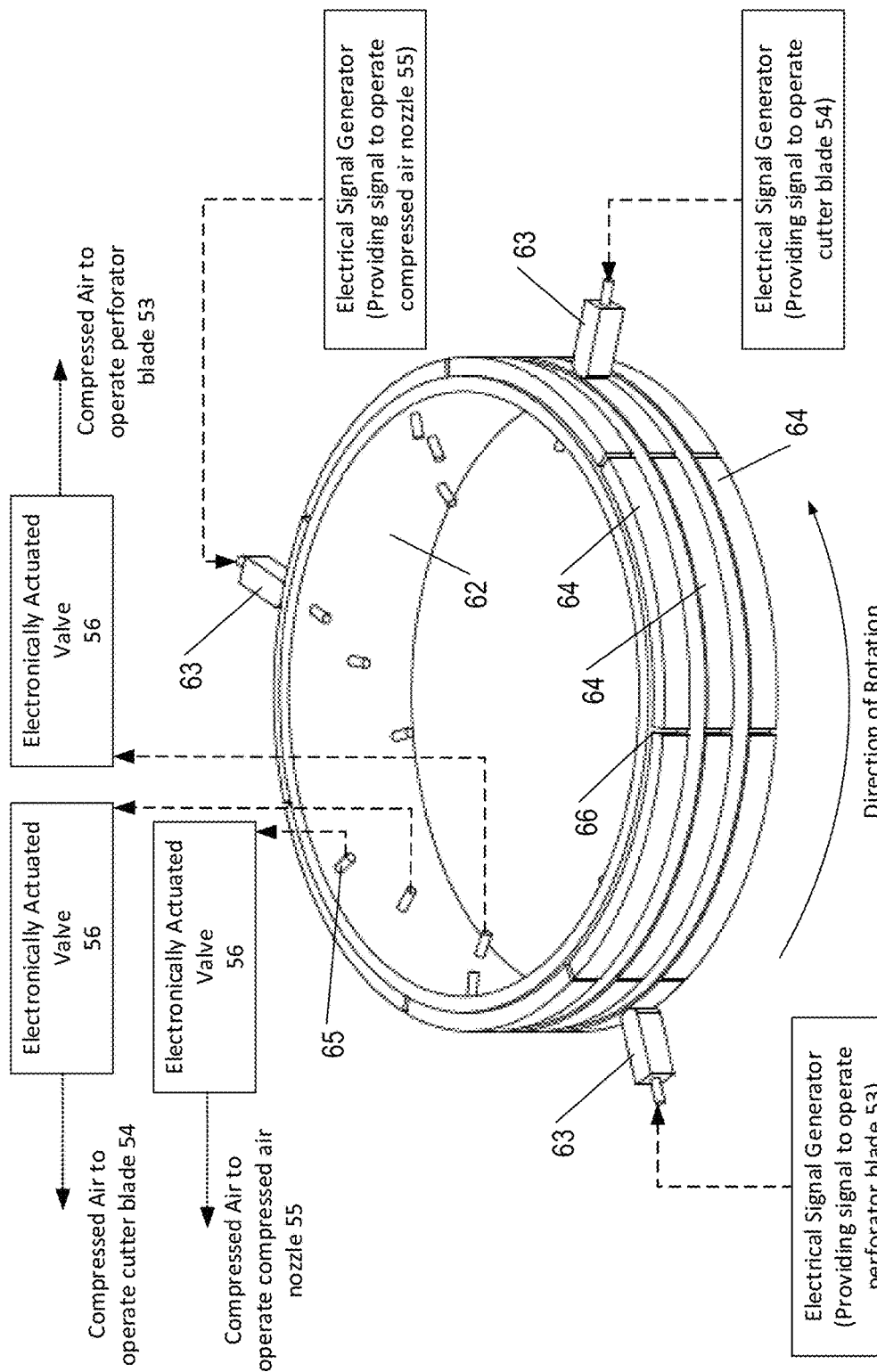
FIG. 19 is a perspective view of a slip ring according to one embodiment.

In various embodiments, each of the electronically actuated valves 56 are positioned on the carousel 16, and are accordingly configured to rotate with the carousel 16 to remain aligned with the corresponding vacuum chamber 14 (and corresponding package manipulation systems). Each of the electronically actuated valves 56 are configured to selectably receive electronic signals from a slip ring distributor 61 positioned on the apparatus 10 and to operate (e.g., open) upon receipt of the electronic signal such that compressed air may be directed to the corresponding systems. FIG. 19 illustrates a slip ring distributor 61 according to various embodiments.

As shown in FIG. 19, the slip ring distributor 61 comprises a rotating ring portion 62 and a plurality of stationary brushes 63 in contact with the rotating ring portion 62. The rotating ring portion comprises a plurality of sets of electrical contacts 64 in electrical contact with one or more electronically actuated valves via electrical pins 65. In the illustrated embodiment, each set of electrical contacts 64 comprises a single contact corresponding to and in electronic communication with a particular electronically actuated valve 56 corresponding to each vacuum chamber 14. As an example, for an apparatus 10 comprising 7 vacuum chambers 14, each set of electrical contacts 64 comprises 7 electrical contacts. Moreover, in the illustrated embodiment of FIG. 19, each set of electrical contacts 64 collectively defines a ring extending around the perimeter of the rotating ring portion 62. As shown in FIG. 19, each electrical contact in each set of electrical contacts 64 may have equal dimensions (e.g., extending an equal distance around the rotating ring portion 62). For example, for a set of electrical contacts 64 having 7 electrical contacts collectively extending around the rotating ring portion 62, each electrical contact may extend approximately 51 degrees around the ring.

Moreover, in the illustrated embodiment of FIG. 19, each electrical contact in each set of electrical contacts is separated from adjacent electrical contacts by a gap 66, such that each electrical contact is electrically isolated from adjacent electrical contacts. In various embodiments, each gap is filled with an electrically isolating material, such as an epoxy, a plastic, a wood, and/or the like.

Each set of electrical contacts 64 corresponds to a single brush 63 in electrical communication with an electronic signal generator (e.g., a computer controller). Accordingly, as shown in FIG. 19, when an electrical contact corresponding to a particular electronically actuated valve 56 is in contact with the brush 63, the electronically actuated valve 56 is in electronic communication with the electrical signal generator, such that the electronically actuated valve may receive a signal generated by the electrical signal generator. In various embodiments, the electrical signal generator is configured to generate and transmit a signal to an electronically actuated valve 56 for a portion of the period of time that the electrical signal generator is in electronic communication with the electronically actuated valve 56. For example, for an electronically actuated valve having a corresponding electrical contact having a length corresponding to 51 degrees around the perimeter of the rotating ring portion 62, the electrical signal generator may transmit a signal for a period of time during which between 0-51 degrees of the electrical contact passes the brush 63. As a specific example, the electrical signal generator may transmit a signal for a period of time during which between 10-20 degrees of the electrical contact passes the brush 63, and may not transmit a signal for the remaining period of time during which the brush remains in electrical communication with the electrical contact. The corresponding electronically actuated valve 56 may be actuated to operate a corresponding pneumatic mechanism (e.g., the cutter system, the perforator system, and/or the compressed air nozzle) during the period of time that the electrical signal generator is transmitting a signal.

Accordingly, because the electrical signal generator is transmitting a signal to an electronically actuated valve 56 for a portion of the total period of time during which a corresponding electrical contact is in communication with the brush 63, the timing for providing a signal from the electrical signal generator to the electronically actuated valve 56 may be adjusted within the amount of time that the corresponding electrical contact remains in contact with the brush 63. As an example, for an electronically actuated valve 56 operating the cutter blade 54 (as shown in FIG. 14), the timing of activating the cutter blade 54 to sever a portion of a package may be adjusted to occur at any time within the period of time that the corresponding electrical contact is in contact with the brush such that the electrical signal generator remains in electronic communication with the electronically actuated valve 56. Accordingly, the brush 63 may be positioned such that a corresponding electrical contact is in contact with the brush proximate the time at which the corresponding electronically actuated valve 56 will be actuated. For example, the brush 63 providing signals from the electrical signal generator to actuate the cutter blade 54 may be positioned such that an electrical contact is in contact with the brush simultaneously with the corresponding vacuum chamber 14 being positioned at a point in the angular chamber path at which the cutter blade 54 should be actuated to sever a portion of a package positioned within the vacuum chamber 14. Moreover, in the illustrated embodiment of FIG. 19, the brush 63 is configured to contact only a single electrical contact at any given time, such that only a single electronically actuated valve 56 is actuated simultaneously.

Moreover, in the illustrated embodiment of FIG. 19, the rotating ring portion 62 comprises a plurality of sets of electrical contacts 64, each set of electrical contacts configured to convey signals to operate a different pneumatic mechanism. For example, a first set of electrical contacts 64 may be configured to transmit signals to operate a perforator system, a second set of electrical contacts 64 may be configured to transmit signals to operate a cutter system, and a third set of electrical contacts 64 may be configured to transmit signals to operate a compressed air nozzle. Moreover, as illustrated in FIG. 17, each set of electrical contacts 64 is spaced apart from adjacent sets of electrical contacts 64 such that each set of electrical contacts 64 are electrically isolated from adjacent sets of electrical contacts 64.

In the illustrated embodiment of FIG. 19, each set of electrical contacts 64 is associated with a single brush 63, such that signals are transmitted from an electrical signal generator, through the corresponding brush 63, and to an electrical contact in contact with each corresponding brush 63.

In various embodiments, each brush 63 is positioned such that an electrical contact of the associated set of electrical contacts 64 is in contact with the associated brush 63 simultaneously with a corresponding vacuum chamber 14 being positioned at a point on the chamber travel path that a corresponding pneumatic system should be operated. For example, a first brush 63 corresponding to the first set of electrical contacts 64 and configured to transmit signals to operate a perforator system may be positioned at a first position, a second brush 63 corresponding to the second set of electrical contacts 64 and configured to transmit signals to operate a cutter system may be positioned at a second position downstream of the first position (as determined with reference to the direction of rotation of the rotating ring portion 62), and a third brush 63 corresponding to the third set of electrical contacts 64 and configured to transmit signals to operate a compressed air nozzle may be positioned at a third position downstream of the second position. Accordingly, as the rotating ring portion 62 rotates with the carousel 16 (and associated platens 12 and vacuum chambers 14 having associated packages positioned therewith shown in FIG. 1), first the perforator system is actuated to perforate the package, then the cutter system is actuated to sever a portion of the package (e.g., after the package is heat sealed), and finally the compressed air nozzle is actuated to blow the severed portion of the package off of the platen 12 (e.g., after the vacuum chamber 14 is raised away from the corresponding platen 12).

Although not shown, various embodiments comprise an electronically actuated valve 56 configured to selectably supply air to a pneumatic mechanisms (e.g., diaphragm 58 to operate the upper heat seal bar 48). In such embodiments, the rotating ring portion 62 may comprise an additional set of electrical contacts 64, and the slip ring 61 may additionally comprise an additional brush 63 in communication with an electrical signal generator. In such embodiments, the electrical signal generator may be configured to generate a signal to actuate the electronically actuated valves 56 to operate the pneumatic mechanism to move the upper heat seal bar 48 to the extended position.

Moreover, in various embodiments, the slip ring 61 may be configured to convey electrical signals to any of a variety of electrical devices, systems, and/or components rotating with the carousel 16 in accordance with the configuration described herein with reference to the electronically actuated valves 56. For example, alert systems (e.g., lights, sound emitters, displays, and/or the like) rotating with the carousel 16 may receive electrical signals transmitted from an electrical signal generator that is not rotating with the carousel 16 via a slip ring 61 as described herein. In various embodiments, the number of electrical contacts need not correspond to the number of vacuum chambers 14, and indeed there may be more or less contacts than the number of vacuum chambers 14.

Moreover, like other features, components, and/or systems described herein, the slip ring 61 and/or electronically actuated valves 56 may be operable with apparatuses in which the number of platens 12 does not equal (e.g., is greater than) the number of vacuum chambers 14. In such embodiments, the number of contacts in each set of electrical contacts 64 may correspond to the number of vacuum chambers 14, the number of platens 12, or neither the number of vacuum chambers 14 or the number of platens 12.

Overlapping Infeed and Outfeed Conveyors

Figure 20:
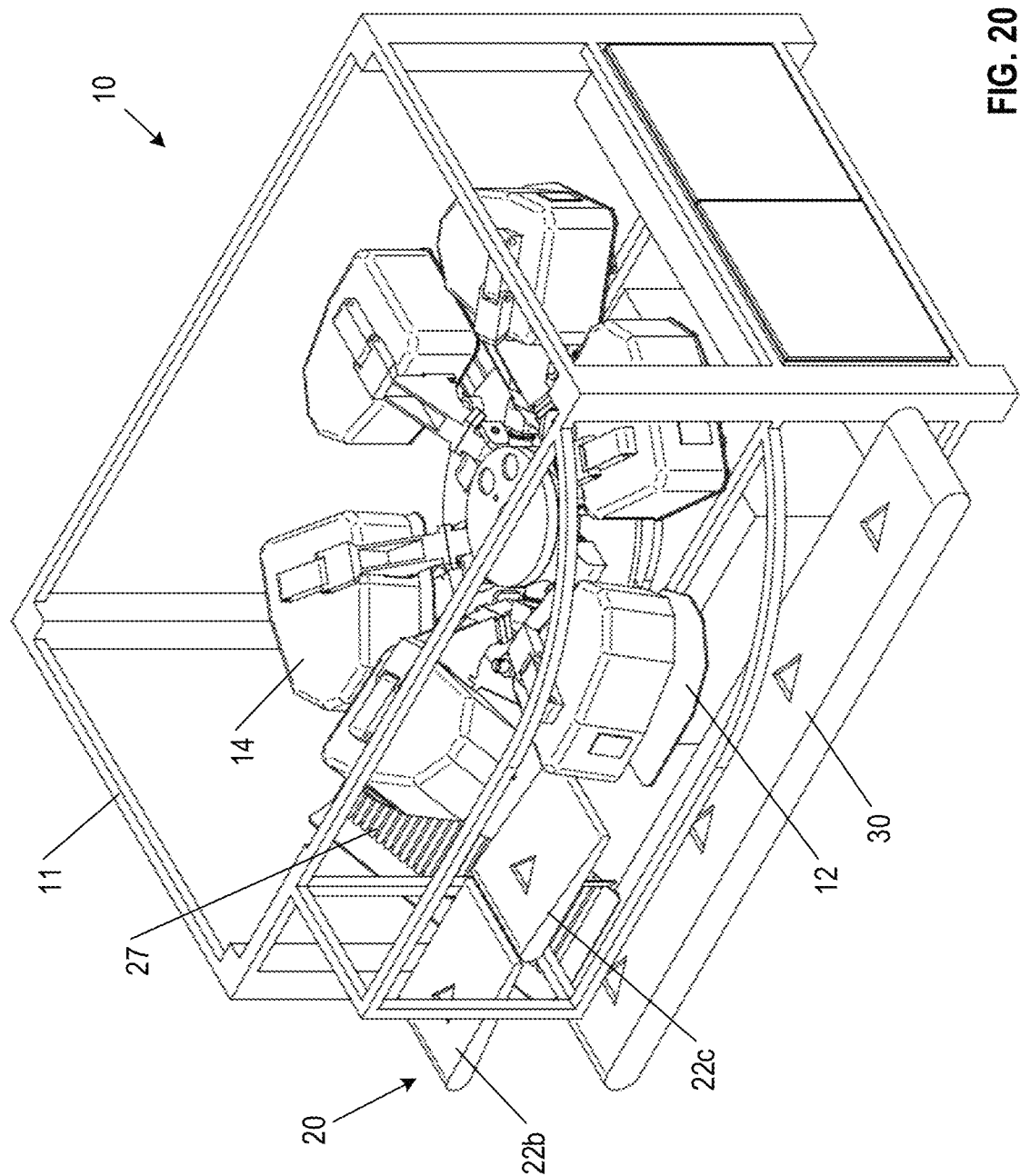
FIG. 20 is a perspective view of an apparatus for vacuumizing and heat sealing an apparatus according to one embodiment.

Referring now to FIG. 20, at least a portion of the infeed system 20, including infeed conveyors 22a-22c, and the outfeed conveyor 30 are positioned on a single side of the apparatus 10, such that at least a portion of the infeed system 20 and outfeed conveyor 30 are aligned within a single vertical plane. This overlapping orientation of at least a portion of the infeed system 20 and the outfeed conveyor 30 reduces the amount of floor space occupied by the infeed system 20 and outfeed conveyor 30, thereby reducing the overall footprint of the apparatus 10. By overlapping the position of the infeed system 20 and the outfeed conveyor 30, the apparatus 10 may provide an efficient use of floor space in a packaging facility. Although the apparatus is illustrated in FIG. 20 as having the infeed system 20 and the outfeed conveyor 30 on a first side of the apparatus 10, various embodiments may have the infeed system 20 and outfeed conveyor 30 on any side of the apparatus. Moreover, the infeed system 20 and outfeed conveyor 30 may be oriented relative to the apparatus 10 in order to accommodate either clockwise rotation of the plurality of platens 12 or counter-clockwise rotation of the plurality of platens 12 along the platen travel path.

For example, FIG. 1 illustrates an embodiment in which a portion of the infeed system 20 is on an opposite side of the apparatus 10 as a portion of the outfeed conveyor 30. Although such orientation of the infeed system 20 and the outfeed conveyor 33 occupies additional floor space in a packaging facility, such orientation may facilitate use of the apparatus 10 with existing mechanisms of the packaging facility (e.g., heat-shrink tunnels, conveying mechanisms, and/or the like).

Outfeed System

Referring to FIG. 20, in various embodiments, the outfeed conveyor 30 is positioned below at least a portion of the infeed system 20, such that the outfeed conveyor 30 and the infeed system 20 at least partially overlap and lie within the same vertical plane oriented at least substantially parallel to the direction of travel of the infeed conveyors 22a-22c of the infeed system 20. As noted previously, such orientation provides a smaller overall footprint of the apparatus 10, thereby saving floor space within a packaging facility.

In various embodiments, the outfeed conveyor 30 may comprise one or more conveying mechanisms (e.g., conveyor belts) configured to move vacuum packaged packages away from the apparatus 10 toward a downstream process (e.g., a heat shrink process to heat shrink the sealed bag around the contained product). In various embodiments, the outfeed conveyor 30 may operate continuously, such that it does not wait for a package to be located thereon before moving.

Although not shown, the outfeed conveyor 30, like the infeed conveyor 22, may comprise a plurality of separate conveying mechanisms configured to index packages thereon. For example, the outfeed conveyor 30 may comprise a plurality of individually operable conveying mechanisms configured to maintain a consistent spacing between packages placed on the outfeed conveyor 30 by selectably moving one or more packages between each of the individually operable conveying mechanisms. Moreover, various embodiments may operate with one or more sensors such as those described above with reference to the infeed system 20 in order to facilitate indexing of the packages.

Packages may be removed from the individual platens 12 when the platens 12 are positioned at an unloading position along the platen travel path 12t (e.g., along a linear portion L2 of the platen travel path shown in FIGS. 3A and 3B). The packages may be removed by any of a variety of unloading assemblies 26 (e.g., as shown in FIGS. 1-3A), including a stationary wall and/or vertical conveyor system blocking the travel path of the packages on the platens 12 while allowing the platens to pass thereunder. The stationary wall and/or vertical conveyor system may direct the packages toward the outfeed conveyor 30 as the packages contact the stationary wall and/or vertical conveyor system. Moreover, in such embodiments, the lower seal bar 48 may be moved into the retracted position before the platen 12 approaches the stationary wall and/or vertical conveyor system (e.g., before the unloading portion of the platen travel path) such that the platens 12 may pass the stationary wall and/or vertical conveyor such packages may be unloaded from the platen 12 and may pass over the lower seal bar 48 during unloading. As yet another example, the packages may be removed from the platens 12 by an actuated paddle configured to extend (e.g., linearly or by pivoting about a horizontal axis and/or pivoting about a vertical axis) to push a package off of the platen 12 when positioned in the unloading position. In such configurations, the paddle may be configured to move between a retracted position allowing packages to move into the unloading position, and an extended position at regular time intervals (e.g., corresponding to the movement speed of the platens 12), and/or may comprise a sensor system configured to detect the presence of a package at the unloading position (e.g., via one or more sensors, such as those described above in reference to the infeed system 20), and move to the extended position in response to detecting a package at the unloading position.

In various embodiments, the unloading assembly 26 may direct the packages onto one or more transition devices 27, such as a slide, roller system, conveyor, and/or the like, configured to move the packages from the platens 12 onto the outfeed conveyor 30 (e.g., via a stationary wall and/or a paddle assembly). In various embodiments, the unloading position of the platen travel path may not be adjacent to the outfeed conveyor 30. Accordingly, packages may first be directed onto the transition device 27 to direct the package onto the outfeed conveyor 30 located proximate a downstream end of the transition device.

As shown in FIG. 20, in various embodiments the outfeed conveyor 30 may not be aligned with the unloading portion of the platen travel path such that the outfeed conveyor 30 is aligned with at least a portion of the infeed system 20. As shown in FIG. 1, the outfeed conveyor 30 may extend around a portion of the apparatus 10 such that packages are conveyed away from the apparatus 10 on an opposite side of the apparatus from the infeed system 20.

Computer Control System

In various embodiments, the apparatus 10 may be controllable at least in part by a computer control system. For example, the computer control system may be configured to transmit signals to various components of the apparatus 10 in order to selectably operate such components (e.g., such that the various components may be operated when signals are received by the corresponding components). As specific and non-limiting examples, the computer control system may be configured to selectably activate and/or deactivate the one or more vacuum systems (e.g., vacuum sources and/or vacuum boosters), and or selectably provide electrical signals to the slip ring distributor 61 to operate the one or more electrically actuated valves described herein. Moreover, in various embodiments, the computer control system may be configured to receive user input (e.g., via a touch screen user interface or other user interface) and to selectably start and stop the movement of the platens around the axis of rotation by selectably activating the drive mechanism of the carousel 16. In various embodiments, the drive mechanism of the carousel 16 may comprise a pinion drive system configured to operably connect the carousel to a motor (e.g., a servo motor). In various embodiments, the pinion drive system comprises a drive gear configured to be driven by the motor, which in turn drives a pinion gear operably secured to the carousel 16, such that rotating the pinion drive system operates to rotate the carousel 16. In embodiments utilizing a servo-motor as the main drive motor, the computer control system may be configured to selectably move the plurality of platens 12 to selected positions. Accordingly, in various embodiments, the servo-motor may be indexed such that the computer control system may identify the rotational position of the motor at any given time. For example, the computer control system may be configured to receive user input requesting that the platens are moved to a particular position such that a particular platen 12 of the plurality of platens 12 is in the loading position, and the computer control system may accordingly move the plurality of platens 12 to the requested position.

The computer control system may, in various embodiments, provide signals to the infeed system 20 and/or the outfeed conveyor system 30 to move packages along the length of the respective infeed and/or outfeed conveyors 20, 30. Moreover, as mentioned previously, the computer control system may be configured to identify various components of one or more packages, such as the location of a product and/or a package patch of a particular package. For example, the computer control system may receive data generated by the various sensor systems of the infeed system 20, such as the gate sensor system, the infrared sensor system, and/or the fluorescence sensor system, in order to identify the location of a product within a package, the location of a patch of a package, and/or the like. In various embodiments, the computer control system may receive data from the one or more sensors, and identify a product trailing edge and/or the package patch of a particular package. For example, the computer control system may have one or more algorithms stored therein to convert the data received from each of these sensor systems into a determination of the location of the product trailing edge and/or the package patch. In various embodiments, the computer control system may receive data indicative of the speed of movement of the one or more conveying mechanisms and/or the position of the one or more conveying mechanisms of the infeed conveyor 22, and use this data in conjunction with the data received from the one or more sensor systems to identify the package trailing edge and/or the package patch of a package.

Based on the determined location of the package trailing edge and/or the package patch, the computer control system may determine a select heat seal location for the package. The computer control system may have stored therein one or more algorithms configured to determine the select heat seal location based on the location of the product trailing edge and/or the package patch. As a non-limiting example, the computer control system may be configured to identify the select heat seal location as being a predetermined distance upstream of the product trailing edge and/or the package patch of the package. In various embodiments, the select heat seal location may be identified based at least in part on a determination of whether the product trailing edge or the trailing edge of the package patch is more upstream of the package. For example, the computer control system may identify the select heat seal location as being a first distance away from the product trailing edge if the product trailing edge is more upstream than the trailing edge of the package patch (or if no package patch is detected), and may determine the select heat seal location as being a second distance away from the trailing edge of the package patch if the trailing edge of the package patch is more upstream than the product trailing edge.

Upon determining the select heat seal location for a particular package, the computer control system may be configured to selectably activate the one or more conveying mechanisms 22a-22c of the infeed system 20 in order to move a package onto a corresponding platen 12 such that the select heat seal location is positioned between the lower and upper heat seal bars (shown in FIG. 14) as the platen 12 is in the loading position. The computer control system may accordingly identify when a platen 12 is entering the loading position, and may activate a conveying mechanism (e.g., loading mechanism 22c) to move the package onto the platen 12 substantially simultaneously and/or shortly after the platen 12 begins entering the loading position. Such operation may thereby lay the package onto the corresponding platen 12 as the platen remains in motion such that the select heat seal location of the package is properly positioned relative to the platen 12.

Method of Operation

In various embodiments, the apparatus 10 is located downstream from a manual, semi-automatic, or fully automatic bagging machine. Unsealed packages are placed on the infeed system 20 (e.g., automatically placing the unsealed packages on an infeed conveyor 22a via a source conveyor from a bagging machine) such that the packages are oriented such that the unsealed portion of each package defines the overall trailing (upstream) end of the package.

The infeed system 20 is activated to place a package onto a corresponding platen 12 such that the trailing unsealed portion of the package is positioned on a portion of the platen 12 above the lower seal bar 48. In various embodiments, the infeed system 20 places the packages on the corresponding platens 12 such that the trailing edge of the product inside the package lies just beyond (downstream of) the heat seal assembly 34. The vacuum chamber 14 corresponding to the platen 12 is closed onto the platen 12, the vacuum chamber is depressurized by operation of the vacuum system to form a vacuum therein, package manipulation systems and the heat seal system 34 are activated to manipulate the open end of the package and to heat seal the package closed after a vacuum of a minimum vacuum level is formed within the vacuum chamber 14 (and consequently within the package). In various embodiments, the cutting mechanism transversely cuts the package between the heat seal and the edge of the bag mouth (upstream of the heat seal location). The heat seal bars 48, 50 are moved apart, and when the vacuum chamber 14 and platen 12 move to the unloading position, the vacuum chamber 14 is raised away from the corresponding platen 12, and the vacuumized and sealed package is unloaded from the platen 12 (e.g., by directing the package onto the outfeed conveyor 30.

Method of Positioning a Package

In packaging a series of packages (e.g., bagged fresh meat products, bagged ready-to-eat products, and/or the like) by vacuumizing and heat sealing each of the packages, identifying the location of the package relative to a seal location permits the heat seal to be located at a desired location on each package. For example, the seal location may be placed proximate a product placed within the package in order to minimize the amount of unused bag material extending away from the product after the packaging procedures (e.g., vacuumizing, heat sealing, heat shrinking, and/or the like) are complete. Excess bag material around the product may be unsightly to potential consumers, who may find packaging without excessive packaging around the product to be aesthetically pleasing. In addition to providing an aesthetically pleasing packaging for products, minimizing the amount of excess packaging material around a product may provide for a product less sensitive to temporary changes in external temperature. For example, consider a package having sizeable bag ears (excess packaging between the product and the heat seal location, typically resulting from forming a linear heat seal proximate a non-linearly shaped product) proximate the product. Because the package is a bag sealed by a heat seal, these bag ears are in fluid communication with the remainder of the package in which the product is located. While the product is located within the package, fluid (e.g., blood and other fluids seeping from the product) may seep into the vacuumized bag ears, where the fluid may quickly heat up to a temperature conducive to bacteria growth when the package is exposed to high environmental temperatures for a short period of time. Because the bag ears are vacuumized, fluid seeping into the bag ears is spread thin through the bag ear, thus making the fluid susceptible to quick changes in temperature during short exposures to higher temperature environments. Accordingly, ensuring the heat seal is located as close to the product as possible may improve the shelf-life of vacuumized and sealed products by minimizing opportunities for bacteria growth within the vacuumized package.

Accordingly, methods of positioning a package on a platen 12 for vacuumizing and sealing the package comprise steps for locating a select heat seal location such that the package is placed on the platen 12 to facilitate heat sealing in the select heat seal location.

In various embodiments, package bags are loaded with products (e.g., fresh meat products, poultry products, ready-to-eat products, non-food products, and/or the like) to form packages upstream of a vacuumization and sealing apparatus 10. The apparatus receives the packages on the infeed system 20 (e.g., via an operator manually providing the packages to an infeed conveyor 22a-22c of the infeed system 20, via an automatically operated source conveyor, and/or the like). The packages received by the infeed system 20 are oriented such that the open end of the package defines the trailing (upstream) end of the package.

The infeed system 20 advances the package from a receiving position proximate the upstream end of the infeed system 20 to a loading position proximate the downstream end of the infeed system 20. The infeed system 20 may be configured to hold each received package stationary at one or more intermediate positions between the receiving position and the loading position of the infeed system 20 in order to index the packages such that consecutive packages are loaded onto consecutive platens 12. While conveying the package between the receiving position and the loading position of the infeed system 20, various sensor systems of the infeed system 20 may generate data indicative of various characteristics of the package. In various embodiments, the infeed system 20 comprises one or more gate sensors as discussed herein for identifying the location of the leading edge and/or the trailing edge of the package and/or the product located within the package. Moreover, the infeed system 20 may comprise one or more infrared sensing systems as discussed herein for identifying the trailing edge of a product located within the package. In various embodiments, the infeed system 20 may comprise one or more fluorescence sensor systems for identifying the trailing edge of a bag patch of the package. In various embodiments, the infeed system 20 may comprise one or more of the gate sensor systems, the infrared sensor system, and/or the fluorescence sensor system in order to identify various combinations of characteristics of the package. For example, the sensors may identify both the trailing edge of a bag patch of a package and the trailing edge of a product loaded into the package. In various embodiments, the sensors may transmit the collected data to a computer control system, which identifies a select heat seal location for the package as being a distance away (e.g., upstream) from the product and/or the bag patch of the package. In various embodiments, the distance may be a predefined distance or it may be identified based upon data indicative of the one or more identified package characteristics. Moreover, upon identifying the location of a trailing edge of a product and/or a trailing edge of bag patch, the infeed system 20 may be configured to track the location of the trailing edge of the product and/or the trailing edge of the bag patch, for example, by monitoring the distance the package travels along the infeed conveyors 22a-22c (e.g., by tracking the distance of advancement of the infeed conveyors 22a-22c after the location of the trailing edge of the product and/or the trailing edge of the bag patch is determined) such that the infeed system 20 may convey the package onto a corresponding platen 12 to align the identified seal location with a sealing mechanism 34 of the platen 12.

Once the package reaches the loading position of the infeed system 20, the infeed system 20 may temporarily hold the package at the loading position until a corresponding platen 12 reaches a corresponding loading position adjacent to and below the infeed system 20. Upon the corresponding platen 12 reaching the corresponding loading position, the infeed system 20 conveys the package onto the platen 12 (e.g., in response to a signal received from the computer control system) while the platen 12 continues moving along the linear portion L1 of the platen travel path. The computer control system may identify the appropriate timing for beginning to convey the package onto the corresponding platen 12 based upon the identified select heat seal location and the tracked location of the package on the infeed system 20. Accordingly, the infeed system 20 begins to convey the package onto the platen 12 such that the select heat seal location is positioned between the lower heat seal bar 48 and the upper heat seal bar 50 when the package is completed loaded onto the platen 12. In various embodiments, the computer control system may identify the appropriate timing for beginning to convey the package onto the platen 12 based at least in part on the speed of the platen 12 travelling along the platen travel path, the speed of the infeed conveyors 22a-22c, the length of the product, the location of the trailing edge of the product and/or the trailing edge of the patch, and/or the like. In various embodiments, the infeed system 20 is configured to convey the package onto the corresponding platen 12 at a speed at least substantially equal to the speed of travel of the platen 12.

As previously noted, the platens 12 may travel along a linear travel path during the loading process. Because the infeed conveyor 22 conveys the packages in a linear direction when loading the packages onto the corresponding platens 12, moving the platens 12 along a corresponding linear travel path facilitates orienting the packages on the platens 12 such that the select heat seal location (which may extend transversely across the package) is aligned with the heat seal mechanism 34.

During and/or after loading a first package onto a corresponding platen, the infeed system 20 may begin preparing a second consecutive package for loading onto a subsequent platen 12 according to the methods described herein. As noted previously, the infeed system 20 may comprise a plurality of individually operable conveying mechanisms 22a-22c, such that packages at various stages of preparation may be positioned along the length of the infeed system 20 while the infeed system 20 maintains proper indexing of the packages such that packages are placed on corresponding platens 12 when conveyed off of the infeed system 20.

Method of Vacuumizing and Sealing a Package

Once a package has been placed on a corresponding platen 12, the platen 12 may travel along the platen travel path, and may be vacuumized and heat sealed as the package travels along the platen travel path. In various embodiments, the platen 12 travels continuously along the platen travel path, and accordingly loading a package onto the platen 12 and/or vacuumizing and heat sealing the package occurs while the corresponding platen 12 continues to travel along the platen travel path.

Accordingly, a platen 12 receives a package (e.g., from the infeed system 20) such that the determined select heat seal location is positioned between the lower heat seal bar 48 and the upper heat seal bar 50. As discussed herein, the platen 12 may travel along a linear portion of the platen travel path during the loading process in order to facilitate placement of the package onto the platen 12. Shortly after the loading process is complete and the package is positioned on the top surface of the platen 12, the platen may return to an angular travel path around the axis of rotation 18. As described above, the platen may travel along a linear portion of the travel path occupying approximately between 30-50 degrees of the angular path of rotation around the axis of rotation 18 during the loading process, and may return to the angular travel path upon completion of the linear travel path portion.

Moreover, during the loading process in which the platen 12 receives the package from the infeed system 20, the platen 12 may pass under the infeed system 20 such that the upper surface of the platen (or the lift platform 13) is proximate the lower surface of an infeed conveyor 22c of the infeed system 20 such that the distance the package is required to drop from the top surface of the infeed conveyor 22c onto the top surface of the platen 12 is minimized. Accordingly, the lower heat seal bar 48 may be in a retracted position relative to the top surface of the platen 12 while the package is being loaded onto the platen 12. After the loading process is complete, the lower heat seal bar 48 may be configured to rise through an opening defined in the platen 12 to an extended position. In various embodiments, the lower seal bar 48 may be configured to rise to the extended position after the platen 12 returns to the angular travel path. However, in various embodiments, the lower seal bar 48 may be configured to rise to the extended position while the platen is traveling along the linear portion of the platen travel path, shortly after the lower heat seal bar 48 has passed the downstream end of the infeed system 20 such that the lower heat seal bar 48 does not contact the infeed system 20 while moving to the extended position.

In various embodiments, after (or substantially simultaneously with) the platen 12 has returned to the angular travel path, a corresponding vacuum chamber 14 is lowered onto the platen 12 to define an air-tight enclosure around the package. In various embodiments, the corresponding vacuum chamber 14 rotates synchronously around the axis of rotation 18 with the platen 12 such that the vacuum chamber 14 maintains the same angular position relative to the axis of rotation 18 as the corresponding platen 12, even while the vacuum chamber 14 is raised and the platen is moving through the one or more linear portions of the platen travel path. In various embodiments, the lowering of the vacuum chamber 14 onto the platen 12 may be synchronized with the raising of the lower seal bar 48 to the extended position. With reference to the cam/cam follower configurations described herein, the lowering of the vacuum chamber 14 and the raising of the lower seal bar 48 may be synchronized based on the location of the raised and lowered portions of the respective cam followers.

For example, the lowering of the vacuum chamber 14 may be timed such that the vacuum chamber 14 reaches the lowered position at substantially the same time that the lower seal bar 48 reaches the extended position. By timing the raising of the lower seal bar 48 and the lowering of the vacuum chamber 14 to occur at least substantially simultaneously, the amount of time during which the package is positioned within an air tight enclosure may be maximized. This is particularly the case where the components begin movement toward forming the air tight enclosure after the platen 12 returns to an angular portion of the platen travel path. In embodiments in which the upper seal bar 50 is operable between a retracted and extended position (e.g., via a pneumatic diaphragm 58 operable via an electronically actuated valve), the upper seal bar 50 may be configured to reach the extended position at substantially the same time that the lower seal bar 48 reaches the extended position and/or the vacuum chamber 14 reaches the lowered position.

However, in various embodiments, the lowering of the vacuum chamber 14 and the raising of the lower seal bar 48 (and/or the extending of the upper seal bar 50) may be synchronized to occur sequentially. For example, the lower heat seal bar 48 may be raised to the extended position while the platen 12 travels along the linear travel path, and the vacuum chamber 14 may only be lowered after the platen 12 returns to the angular portion of the platen travel path. In such instances, the upper seal bar 50 may be extended before or after the vacuum chamber 14 is lowered. For example, the upper seal bar 50 may be extended after performing one or more of the package manipulation processes described below such that the portion of the package located between the lower seal bar 48 and the upper seal bar 50 is substantially flat and free from wrinkles and/or creases before the upper seal bar 50 is extended to compress the package between the upper seal bar 50 and the lower seal bar 48.

After forming an air-tight enclosure around the package, one or more package manipulation processes may be performed. In various embodiments, a perforator blade 53 may be extended away from the vacuum chamber 14 to puncture one or more holes in the package between the heat seal location (the portion of the package bag positioned between the lower seal bar 48 and the upper seal bar 50) and the open trailing (upstream) end of the package. The one or more punctured holes formed by the perforator blade 53 ensure that the interior of the package is in fluid communication with the interior of the air-tight enclosure, such that air within the package is evacuated when the air within the air-tight enclosure is evacuated.

Moreover one or more spreaders and/or grippers may be configured to smooth the package at the heat seal location to minimize the number of wrinkles and/or creases in the package bag at the heat seal location to facilitate forming a strong and air-tight seal when heat sealing the package.

After forming an air-tight enclosure around the package, the air within the air-tight enclosure is evacuated from within the air-tight enclosure (e.g., via a vacuum conduit formed at least in part through a support arm 36 for the vacuum chamber 14) to form a vacuum therein. As discussed above, two or more vacuum chambers 14 may be cross-vented therebetween at corresponding points during the vacuumization process. For example, a first sealed enclosure approaching the lift position for the corresponding vacuum chamber 14 may be briefly cross vented with a second sealed enclosure for which the corresponding vacuum chamber 14 was recently lowered onto the corresponding platen 12. Thus, the pressure within the second air-tight enclosure is lowered before applying a vacuum pressure thereto, and the pressure within the first air-tight enclosure is raised before releasing and raising the corresponding vacuum chamber 14.

In various embodiments, the vacuum pressure formed within the air-tight enclosure may be at least 1.5 torr. In various embodiments, the vacuum pressure formed within the air-tight enclosure may be at least 2 torr. The apparatus 10 may be configured to maintain the vacuum pressure within the air-tight enclosure for a minimum predetermined amount of time before heat sealing the package. As a non-limiting example, the apparatus 10 may be configured to maintain the vacuum pressure within the air-tight enclosure for at least 2 seconds before the heat seal mechanism 34 seals the package closed. By maintaining the vacuum pressure for at least the minimum amount of time, air trapped within the product (e.g., within the fresh red meat product) is permitted to escape from within the product before the package is heat sealed. In various embodiments, the speed of rotation of the platens 12 and the vacuum chambers 14 may be determined such that the packages remain subject to the minimum vacuum level for at least the minimum amount of time.

In various embodiments, the amount of time during which the package is subject to a vacuum pressure within the air-tight enclosure is limited by the amount of time that the vacuum chamber 14 may remain lowered onto the surface of the platen 12. This, in turn is limited by the speed of the platen 12 and the corresponding vacuum chamber 14 (determined based at least in part on the angular velocity of rotation of the carousel 16), and the length of the angular portion of the platen travel path. In various embodiments, the angular portion of the platen travel path may be between 260-300 degrees of rotation around the axis of rotation 18. In various embodiments, the package may be subject to a vacuum pressure within the air-tight enclosure during substantially the entire amount of time during which the platen 12 is traveling along the angular portion of the platen travel path.

After the package has been exposed to the vacuum pressure within the air-tight enclosure for at least the minimum amount of time and/or upon the air-tight enclosure reaching a particular angular position relative to the axis of rotation 18, the heat seal mechanism 34 heats the package bag (e.g., via one or more impulse sealing wires in at least one of the lower sealing bar 48 and/or the upper sealing bar 50) to at least partially melt the package bag to form a heat seal to maintain the vacuum pressure within the package after reintroducing air to the environment surrounding the package. In various embodiments, a current is provided across the impulse sealing wire to heat the impulse sealing wire while the impulse sealing wires are pressed against the package at the heat seal location. In various embodiments, both the lower seal bar 48 and the upper seal bar 50 comprise impulse sealing wires, such that heat is applied to the package to form a heat seal from both the lower seal bar 48 and the upper seal bar 50. As previously mentioned, by providing heat to the package from both the lower seal bar 48 and the upper seal bar 50, the heat seal mechanism 34 may be configured to provide a heat seal through wrinkles and/or creases that may be formed in the package at the heat seal location.

In various embodiments, a current may be supplied to the impulse sealing wires for a predetermined amount of time (e.g., 2 seconds) and the lower seal bar 48 and the upper seal bar 50 may continue to compress a portion of the package therebetween for a predetermined amount of time after the current is no longer being supplied to the impulse sealing wires. Accordingly, the heat sealed package is permitted to cool before removing the lower seal bar 48 and/or upper seal bar 50 from the surface of the package in order to minimize the possibility of forming a leak through the heat seal.

Moreover, after forming the heat seal in the package, the cutting mechanism may be configured to sever the bag tail from the package (e.g., between the holes formed by the perforator and the heat seal location). The bag tail may be severed from the package while the heat seal mechanism 34 is compressing the package between the lower seal bar 48 and the upper seal bar 50.

After forming the heat seal and allowing the heat seal to cool, the air-tight enclosure may be cross-vented to another air-tight enclosure as discussed previously. Cross-venting the air-tight enclosure introduces air into the air-tight enclosure to lower the vacuum pressure therein. The vacuum chamber 14 is raised off of the surface of the platen 12 to fully expose the vacuumized package to environmental conditions. In various embodiments, the lower seal bar 48 may retract at least substantially simultaneously with the raising of the vacuum chamber 14. However, in various embodiments, the lower seal bar 48 may be retracted either before or after the vacuum chamber 14 is raised.

After the vacuum chamber 14 is raised, the platen 12 may enter an unloading portion of the platen travel path during which the package is removed from the platen 12. In various embodiments, the unloading portion of the platen travel path may comprise a linear portion of the platen travel path in order to facilitate unloading of the packages from the platens 12.

During the unloading portion of the platen travel path, one or more unloading assemblies 26 may operate to remove the package from the platen 12 and direct the package to an outfeed conveyor 30, which may be located below at least a portion of the infeed conveyor 22.

In various embodiments, the unloading portion of the platen travel path may be proximate the loading portion of the platen travel path. For example, the unloading portion of the platen travel path may comprise a portion of the angular distance around the axis of rotation 18 (e.g., 47.5 degrees), and the loading portion may comprise an adjacent portion of the angular distance around the axis of rotation 18. Accordingly, the amount of distance travelled by the platen 12 between the point at which a package is unloaded and the point at which a subsequent package is loaded onto the same platen 12 is minimized.

CONCLUSION

Although the invention has been described primarily with respect to packaging meat products, it should be understood that the foregoing apparatus and methods may be used to package a variety of products, both edible and non-edible.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for vacuumizing and sealing one or more packages, the apparatus comprising:
   a plurality of platens operably secured to a rotating carousel configured to rotate about a single axis of rotation, wherein the plurality of platens are configured to travel along a platen travel path comprising an angular portion of the platen travel path and one or more linear portions of the platen travel path around the single axis of rotation and wherein each of the plurality of platens is operably secured to the carousel by a linear motion mechanism configured to enable each of the platens to travel in a linear direction during at least one portion of the angular platen travel path;
   a plurality of vacuum chambers configured to selectably engage a corresponding platen to form an air-tight enclosure therebetween and operably secured to the rotating carousel such that the plurality of vacuum chambers travel along an angular chamber travel path synchronously with the plurality of platens such that each vacuum chamber is aligned with the corresponding platen relative to the single axis of rotation;
   an automated loading system configured to convey packages in a linear direction parallel to one of the one or more linear portions of the platen travel path toward the plurality of platens, wherein the automated loading system is configured to load at least one package onto a top surface of a platen of the plurality of platens while the platen is travelling along the one of the one or more linear portions of the platen travel path; and
   a vacuumization and sealing system configured to evacuate air from within the packages to form a vacuum therein and to seal the packages to maintain the vacuum within the packages.

2. The apparatus of claim 1, further comprising a conveying mechanism comprising:
   a motor; and
   a pinion drive system operably connecting the motor and the carousel.

3. The apparatus of claim 2, wherein the motor is an indexed servo-motor.

4. The apparatus of claim 1, wherein the linear motion mechanism comprises a mechanical linkage configured to extend and retract during each of the one or more linear portions of the platen travel path.

5. The apparatus of claim 1, wherein the angular portion of the platen travel path and the one or more linear portions of the travel path collectively defines one full rotation around the single axis of rotation.

6. The apparatus of claim 1, wherein each of the plurality of platens remain aligned with a corresponding radial section of the carousel extending radially outward from the single axis of rotation during the entire platen travel path.

7. The apparatus of claim 1, wherein each linear portion of the platen travel path corresponds to between 30-50 degrees of rotation of the carousel around the single axis of rotation.

8. The apparatus of claim 1, wherein the vacuum chambers are in the lowered position while the corresponding platens are not travelling along a linear portion of the platen travel path.

9. The apparatus of claim 1, wherein one of the one or more linear portions of the angular platen travel path comprises an unloading portion, wherein packages are removed from the corresponding platens during the unloading portion of the platen travel path.

10. The apparatus of claim 1, wherein each platen further comprises a cam follower configured to engage a cam surface corresponding to the platen travel path to guide the corresponding platen along the platen travel path.

\* \* \* \* \*